US010037044B2

(12) United States Patent
Laberge et al.

(10) Patent No.: US 10,037,044 B2
(45) Date of Patent: Jul. 31, 2018

(54) USER INTERFACE FOR SPECIAL PURPOSE CONTROLLER

(71) Applicant: Honeywell International Inc., Morris Plains, NJ (US)

(72) Inventors: Jason C. Laberge, Lauderdale, MN (US); Sinan C. Goknur, Minneapolis, MN (US); Jakub Andrzejewski, Minneapolis, MN (US); Jacqueline Lee Belleau, Minneapolis, MN (US); Dan Clements, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/835,183

(22) Filed: Aug. 25, 2015

(65) Prior Publication Data

US 2015/0362929 A1    Dec. 17, 2015

Related U.S. Application Data

(63) Continuation of application No. 11/751,882, filed on May 22, 2007, now abandoned.

(51) Int. Cl.
*G05D 23/19*    (2006.01)
*H04L 12/28*    (2006.01)

(52) U.S. Cl.
CPC ..... *G05D 23/1917* (2013.01); *G05D 23/1931* (2013.01); *H04L 12/2816* (2013.01)

(58) Field of Classification Search
None
See application file for complete search history.

(56) References Cited

U.S. PATENT DOCUMENTS

| 4,386,649 A | 6/1983 | Hines et al. |
| 4,621,336 A | 11/1986 | Brown |
| 4,644,320 A * | 2/1987 | Carr ............ H02J 13/0006 340/12.37 |

(Continued)

FOREIGN PATENT DOCUMENTS

EP    1260886 A2 *  11/2002

OTHER PUBLICATIONS

Enerfoil Magnum Ltd., "Magnum E Control," 6 pages, Mar. 1, 2004.

(Continued)

*Primary Examiner* — Yongjia Pan
(74) *Attorney, Agent, or Firm* — Seager Tufte & Wickhem LLP

(57) ABSTRACT

A temperature controller for controlling the temperature of an inside space that is serviced by one or more pieces of HVAC equipment. The temperature controller may include a controller having a control algorithm for controlling one or more pieces of HVAC equipment as well as a user interface that may be configured to display a hierarchical menu structure and to permit a user to traverse the menu structure. The user interface may be configured to display breadcrumbs that provide an indication to the user of the current location within a hierarchical menu structure, and in some cases, provide instructional information in a designated or common display area that helps instruct the user in using a particular menu or menu option. These and other features may help make the special purpose controller more intuitive to set up, program and operate.

18 Claims, 56 Drawing Sheets

(56) References Cited

U.S. PATENT DOCUMENTS

| | | | | |
|---|---|---|---|---|
| 4,771,392 | A * | 9/1988 | Hall | G05D 23/20 165/238 |
| 4,799,176 | A * | 1/1989 | Cacciatore | F23N 5/203 165/254 |
| 4,828,016 | A * | 5/1989 | Brown | G05D 23/20 165/239 |
| 4,829,779 | A * | 5/1989 | Munson | F24F 11/0009 236/51 |
| 4,843,084 | A * | 6/1989 | Parker | G05D 23/1917 165/205 |
| 5,086,385 | A * | 2/1992 | Launey | G06F 3/04847 340/6.11 |
| 5,189,412 | A * | 2/1993 | Mehta | G05B 19/108 340/12.24 |
| 5,218,196 | A * | 6/1993 | Dogul | G01V 8/20 250/221 |
| 5,348,078 | A | 9/1994 | Dushane et al. | |
| 5,400,246 | A * | 3/1995 | Wilson | G06F 3/023 340/12.53 |
| 5,482,209 | A | 1/1996 | Cochran et al. | |
| 5,572,438 | A * | 11/1996 | Ehlers | G01R 21/133 307/37 |
| 5,590,831 | A | 1/1997 | Manson et al. | |
| 5,673,850 | A * | 10/1997 | Uptegraph | F24F 11/006 165/268 |
| 5,818,428 | A * | 10/1998 | Eisenbrandt | G05B 19/0426 345/173 |
| 5,873,519 | A | 2/1999 | Beilfuss | |
| 5,905,442 | A * | 5/1999 | Mosebrook | G05B 19/0423 |
| 5,937,942 | A | 8/1999 | Bias et al. | |
| 6,104,399 | A | 8/2000 | Volkel | |
| 6,121,593 | A * | 9/2000 | Mansbery | A47J 27/62 219/495 |
| 6,129,284 | A * | 10/2000 | Adams | F24H 9/2035 236/21 R |
| 6,275,166 | B1 * | 8/2001 | del Castillo | H04L 12/2803 340/10.1 |
| 6,297,724 | B1 * | 10/2001 | Bryans | H05B 37/0254 307/38 |
| 6,453,687 | B2 * | 9/2002 | Sharood | G05B 19/00 62/127 |
| 6,502,758 | B2 | 1/2003 | Cottrell | |
| 6,542,846 | B1 | 4/2003 | Miller et al. | |
| 6,741,915 | B2 | 5/2004 | Poth | |
| 6,824,069 | B2 | 11/2004 | Rosen | |
| 6,891,838 | B1 * | 5/2005 | Petite | H04L 12/2825 340/870.02 |
| 6,920,148 | B1 * | 7/2005 | Kato | H04Q 11/0478 370/337 |
| 6,997,390 | B2 | 2/2006 | Alles | |
| 6,998,976 | B2 | 2/2006 | Kawai et al. | |
| 7,000,849 | B2 | 2/2006 | Ashworth et al. | |
| 7,047,092 | B2 * | 5/2006 | Wimsatt | G05B 15/02 345/173 |
| 6,993,417 | B2 | 6/2006 | Osann, Jr. | |
| 7,222,800 | B2 | 5/2007 | Wruck | |
| 7,302,642 | B2 | 11/2007 | Smith et al. | |
| 7,343,568 | B2 | 3/2008 | Jiang | |
| 7,383,150 | B2 | 6/2008 | Angelini et al. | |
| 7,415,310 | B2 * | 8/2008 | Bovee | H04L 12/282 700/9 |
| 7,432,477 | B2 * | 10/2008 | Teti | F24D 19/1009 219/491 |
| 7,475,559 | B2 * | 1/2009 | Gleeson | B60H 1/00585 307/10.1 |
| 7,523,872 | B2 | 4/2009 | Masui et al. | |
| 7,549,961 | B1 * | 6/2009 | Hwang | A61B 8/14 600/301 |
| 7,555,364 | B2 | 6/2009 | Poth et al. | |
| 7,556,207 | B2 | 7/2009 | Mueller et al. | |
| 7,693,591 | B2 | 4/2010 | Hoglund et al. | |
| 7,755,506 | B1 * | 7/2010 | Clegg | G08C 17/02 340/12.3 |
| 7,818,683 | B2 | 10/2010 | Sorin et al. | |
| 7,831,930 | B2 * | 11/2010 | Dresti | G06F 3/0481 715/714 |
| 7,861,941 | B2 | 1/2011 | Schultz et al. | |
| 2002/0152298 | A1 * | 10/2002 | Kikta | H04L 12/2803 709/223 |
| 2004/0059815 | A1 * | 3/2004 | Buckingham | H04L 12/2803 709/224 |
| 2004/0083128 | A1 * | 4/2004 | Buckingham | H04L 12/10 709/223 |
| 2004/0117330 | A1 * | 6/2004 | Ehlers | F24F 11/0012 705/412 |
| 2004/0245352 | A1 * | 12/2004 | Smith | G05D 23/1904 236/94 |
| 2004/0260411 | A1 | 12/2004 | Cannon | |
| 2005/0125083 | A1 * | 6/2005 | Kiko | G05B 15/02 700/19 |
| 2005/0246408 | A1 * | 11/2005 | Chung | H04L 12/2803 709/200 |
| 2005/0270151 | A1 | 12/2005 | Winick | |
| 2006/0004492 | A1 | 1/2006 | Terlson et al. | |
| 2006/0020969 | A1 | 1/2006 | Utsuki et al. | |
| 2006/0147003 | A1 * | 7/2006 | Archacki, Jr. | H04L 12/2803 379/102.01 |
| 2006/0241838 | A1 | 10/2006 | Mongiardo et al. | |
| 2007/0300168 | A1 | 12/2007 | Bosma et al. | |
| 2008/0211779 | A1 * | 9/2008 | Pryor | G01C 21/3664 345/173 |
| 2008/0295030 | A1 | 11/2008 | Laberge et al. | |

OTHER PUBLICATIONS http://www.amazon.com/s?rh=n%3A1045568%2Csort%Apmrank, Printout of Amazon.com Apparel Men's Dress & Formal Pants webpages, 5 pages, printed Feb. 11, 2008.

http://www.walmart.com/catalog/catalog.gsp?cat=415347, Printout of Walmart.com Apparel: Jeans, webpages, 4 pages, printed Feb. 11, 2008.

"FAMIS Capital Projects for Financial Managers, Lesson 3," Board of Trustees of the University of Illinois, 97 pages, Jul. 2005.

Honeywell S7340A System User Interface, Installation Instructions, 4 pages, 1999.

Honeywell 57340A System User Interface, Specification Data, 2 pages, 1999.

Honeywell T7525/T7526 Thermostat Touchpad, User Guide, 12 pages, 1995.

Rogers et al., "Breadcrumb Navigation: Further Investigation of Usage," Usability News 5.2, 2003, 9 pages, printed May 3, 2007.

* cited by examiner

USER INTERFACE FOR SPECIAL PURPOSE CONTROLLER

This is a continuation of U.S. patent application Ser. No. 11/751,882, filed May 22, 2007, and entitled "USER INTERFACE FOR SPECIAL PURPOSE CONTROLLER", which is incorporated herein by reference.

TECHNICAL FIELD

The disclosure relates generally to controllers and more particularly to special purpose controllers.

BACKGROUND

Special purpose controllers are commonly used today to control and manage a wide variety of equipment and systems. Unlike general-purpose computer systems, such as personal computers, special purpose controllers are designed and used for specific applications. Special purpose controllers can include, for example, traffic light controllers, factory equipment controllers, building controllers such as HVAC controllers, security system controllers, lighting controllers, and other types of application specific controllers or systems. Some special purpose controllers are completely encapsulated by or dedicated to the devices or systems that they control.

Special purpose controllers can be difficult to set up, program and operate, as they frequently have relatively small displays and/or a menu structures that are not very intuitive. As a result, many users get frustrated when interacting with such special purpose controllers, and ultimately, often fail to take advantage of many of their features and/or capabilities. Thus, a need remains for a special purpose controller that is more intuitive and easy to set up, program and/or operate.

SUMMARY

The present disclosure relates to a special purpose controller that includes a user interface that is easy to set up, program and/or operate. In one illustrative embodiment, a special purpose controller, such as a temperature controller, is provided that includes a controller and a user interface. The controller has a control algorithm for controlling one or more pieces of equipment that are located remotely from the controller, such as one or more pieces of HVAC equipment. The user interface is configured to display a hierarchical menu structure on the display, and permits a user to traverse the hierarchical menu structure. In some cases, the user interface may be configured to display a number of programming menus that display and/or solicit changes to one or more programmable parameters.

In some instances, the special purpose controller may be configured to display one or more breadcrumbs that provide an indication to the user of a current location within the hierarchical menu structure. This may help prevent the user from becoming lost or confused as to where he/she is within the hierarchical menu structure.

Alternatively, or in addition, the special purpose controller may be configured to display instructional information that relates to a particular programming parameter to be entered or selected. The instructional information may provide instructions on how to respond to a corresponding menu option. In some instances, all menus that solicit a value or a selection from a user display instructional information in a common or fixed area of the display. Also, and in some cases, the instructional information may be presented in a consistent or common format. By providing the instructional information in a common or fixed area of the display and/or in a consistent format, a more intuitive look and feel may be achieved, making the user interface easier to understand and follow.

In some cases, the user interface may include a number of buttons that can be used in conjunction with the menus. The particular arrangement of the buttons, along with interaction of the buttons with the menus, also can make the user interface more intuitive to use.

The above summary is not intended to describe each disclosed embodiment or every implementation of the present invention. The Figures and Detailed Description that follow more particularly exemplify these embodiments.

BRIEF DESCRIPTION OF THE FIGURES

The disclosure may be more completely understood in consideration of the following detailed description of various embodiments of the invention in connection with the accompanying drawings, in which.

Figure 1:
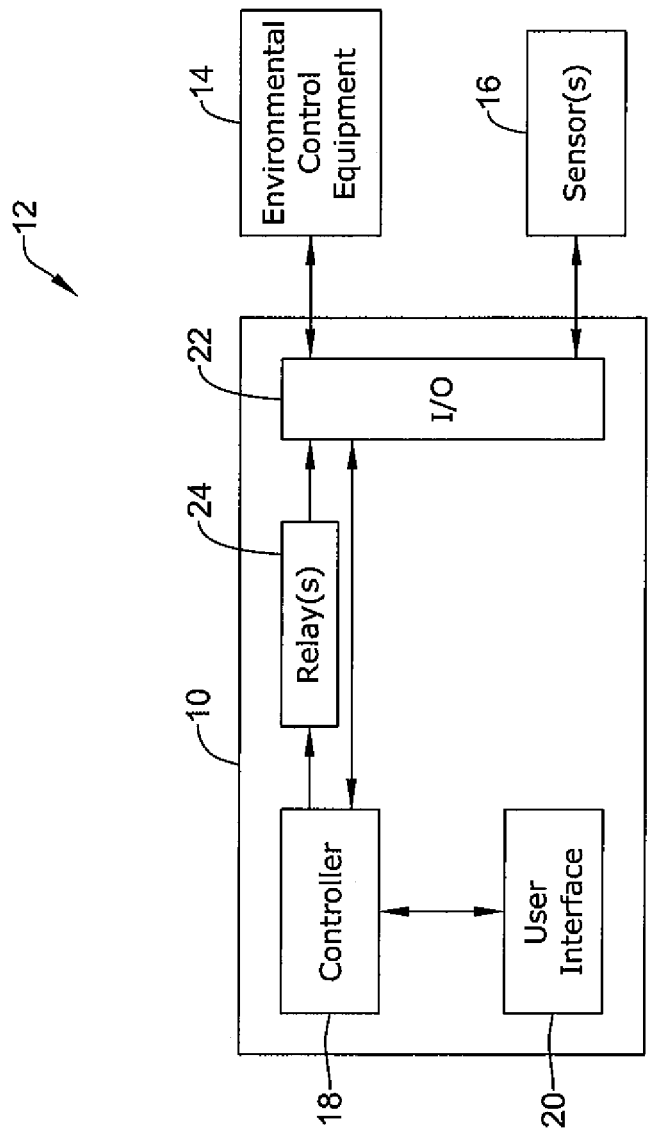
FIG. 1 is a block diagram of an environmental control system including an illustrative but non-limiting environmental control device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The present invention relates to special purpose controllers. For illustrative purposes, some features are discussed herein with respect to an environmental control system. However, this is not to be limiting. It should be understood that the present invention is equally applicable to a wide variety of special purpose controllers that are adapted to control a wide variety of devices or equipment.

An environmental control system may be used to control one or more environmental conditions of a space, such as temperature, humidity, ventilation, lighting, and the like. A space may include, for example, a building or a portion of a building, an office, a barn or similar structure, water in a swimming pool, and the like. Such an environmental control system may include one or more environmental control devices. The environmental control devices may include a control algorithm that is adapted to control, for example, a swimming pool heater, a ventilator, a furnace, an air conditioner, a boiler system, a security system, lighting or any other type of device or equipment. In many cases, the equipment that is controlled by the environmental control device may be located remotely from the environmental control device, but this is not required in all embodiments. In some instances, the environmental control device may be an HVAC controller, such as a temperature controller (e.g. a thermostat).

FIG. 1 is a block diagram of an environmental control system 12 including an illustrative but non-limiting environmental control device 10. Environmental control device 10 may be in communication with environmental control equipment 14 and/or sensors 16. Environmental control equipment 14 may include any equipment that is or can be configured to condition or otherwise alter or detect the environmental conditions within a space. Environmental control equipment 14 may include, for example, HVAC equipment such as heating, cooling and/or ventilating equipment, or perhaps security and/or lighting equipment.

Sensors 16 may be any sensor or sensors that can sense or otherwise detect environmental conditions within a space and communicate this information to environmental control device 10. Examples of suitable sensors 16 include temperature sensors, humidity sensors, motion sensors, light detectors, etc. In some cases, sensors 16 may include safety-related sensors such as, for example, carbon monoxide sensors. As illustrated, sensors 16 are in communication with environmental control device 10. In some cases, sensors 16 may instead, or in addition, be in communication directly with environmental control equipment 14, if desired.

In some instances, environmental control device 10 may include or be composed of several elements that may be combined within a single housing or structure or may, if desired, be disposed within two or more distinct housings. In the illustrative embodiment, environmental control device 10 includes a controller 18 and a user interface 20. An I/O segment 22 may provide electrical connections or otherwise permit communication between environmental control device 10 and external elements such as environmental control equipment 14 and/or sensors 16. In some cases, environmental control device 10 may also include a relay segment 24 that can, through I/O segment 22, selectively provide power to externally located devices such as environmental control equipment 14.

Controller 18 may be configured to display appropriate prompts on user interface 20, and to accept user inputs from user interface 20. While not expressly illustrated, controller 18 may include memory for storing menus, parameters and other operational data, as well as for storing programming instructions. Controller 18 may include flash memory or other types of memory, as known.

Along with operating user interface 20, controller 18 may have a control algorithm for controlling one or more pieces of equipment, such as environmental control equipment 14. The control algorithm may provide appropriate commands for operating environmental control equipment 14 as well as accepting sensor input from sensors 16. In some cases, controller 18 may provide command signals directly to I/O segment 22 that are then transmitted to environmental control equipment 14. In other cases, controller 18 may transmit command signals to relay segment 24 that, in turn, selectively provide power or other control signals to one or more devices within environmental control equipment 14.

User interface 20 may take a wide variety of different forms. User interface 20 can include, for example, one or more of an alpha-numeric display, a graphical display, and/or a key pad having one or more keys or buttons. In some cases, user interface 20 can include a touch screen that can be used to both display appropriate information to the user, as well as to accept information from the user, as desired. In some instances, user interface 20 may include a display screen and one or more tactile buttons separate from the display screen. A display screen may be an LED display, an LCD display, or any other suitable display format discernible to the human eye. Buttons, if included, may be used to scroll through menus that are displayed on the display screen, increase parameter values, decrease parameter values, select values, and the like, as will be discussed in more detail with respect to subsequent Figures.

Figure 2:
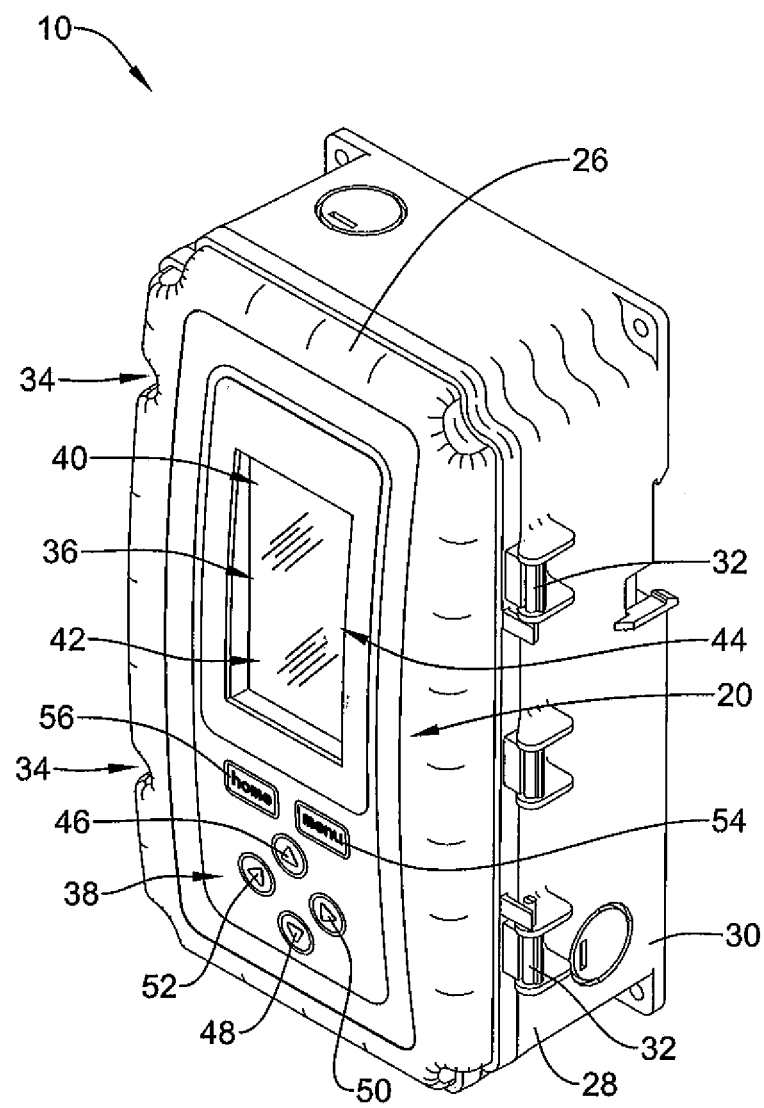
FIG. 2 is a perspective view of an illustrative but non-limiting environmental control device such as might be used in FIG. 1.

FIG. 2 is a perspective view of an illustrative but non-limiting environmental control device 10. The illustrative environmental control device 10 includes a housing 26. In some cases, and as illustrated, housing 26 may include a front housing portion 28 and a rear housing portion 30. Front housing portion 28 may have a height that is at least about twice its width, or may have a height that is about three times its width, but this is not required. In some instances, one or more hinges 32 disposed along one side of housing 26 may hingedly secure front housing portion 28 to rear housing portion 30. If desired, one or more apertures 34 may be disposed along a side of housing 26 and may accommodate fasteners such as screws or bolts (not shown) to help fasten front housing portion 28 to rear housing portion 30. In other instances, front housing portion 28 may, for example, simply snap or otherwise engage rear housing portion 30.

The illustrative environmental control device 10 includes a display 36 and a control pad 38. In some instances, display 36 and control pad 38 may be considered, in tandem, a user interface 20 (FIG. 1). In some cases, control pad 38 may be disposed vertically below display 36, but this is not required. The display 36 may consume 10%, 20%, 30%, 40% or more of the front surface area of the housing, and may have a vertical height that is at least 1.5 times as great as its width. In this, relative vertical position merely refers to the illustrated orientation, as environmental control device 10 may function in any particular orientation. Display 36 may be used to display, for example, a variety of alphanumeric characters, icons, or any other type of information, as desired. In some cases, display 36 may be considered as including an upper portion 40 and a lower portion 42.

In some operating conditions, alphanumeric characters such as letters and numbers may be displayed on display 36, and the information may be displayed on all or substantially all of display 36. In some operating or programming conditions, upper portion 40 and/or lower portion 42 may be reserved or dedicated to displaying particular information pertaining to the operating or programming condition that environmental control device 10 is currently in.

For example, in some circumstances, upper portion 40 of display 36 may be used to display breadcrumb information. Controller 18 (see FIG. 1) may be programmed to display a hierarchical menu structure on display 36, and may also display one or more breadcrumbs on the upper portion 40 of display 36. The breadcrumbs may provide an indication to the user of a current location within the hierarchical menu structure, as will be illustrated further in subsequent Figures. In some instances, the breadcrumb information may provide a hierarchical path of a current location within the hierarchical menu structure, which may, if desired, include a designator or label for each hierarchical level down to the current level within the hierarchical menu structure.

Each designator or label may be displayed vertically one above the other within upper portion 40 of display 36, but this is not required in all embodiments. For example, if three successive levels of a hierarchical menu structure are available, a first level breadcrumb may be displayed within upper portion 40 of display 36. Once a second level has been selected, a second level breadcrumb may be displayed within upper portion 40 of display 36, vertically below the first level breadcrumb. Once a third level has been selected, a third level breadcrumb may be displayed within upper portion 40 of display 36, vertically below the second level breadcrumb. Thus, and in this illustrative example, a user may see how they reached a particular portion or level within a hierarchical menu structure, and may have ready access to the current menu location within the hierarchical menu structure. In some cases, upper portion 40 of display 36 may accommodate a total of one, two, three, four, five or more breadcrumbs.

In some instances, lower portion 42 may be used to display instructional information pertaining to operating environmental control device 10. For example, a user may be at a point within the menu structure in which a particular parameter is to be set or selected. In this situation, controller 18 (FIG. 1) may display instructional information within lower portion 42 that tells a user what parameter is being set or selected and/or how to set and/or select the parameter. By always providing the instructional information in the same region of the display, the user may quickly understand where to look for help or guidance when operating the operating environmental control device 10. However, it should be recognized that in some embodiments the instructional information need not always be displayed in the same region of the display.

In some instances, controller 18 may include a control algorithm that uses a number of programmable control parameters. The controller 18 may be adapted to display two or more programming menus that each solicit from a user changes to one or more of the programmable control parameters. Each programming menu may include one or more user instructions that may be displayed within the lower portion 42 of display 36. That is, and in some cases, the lower portion 42 of the display may be dedicated to displaying instructional information that relates to the particular programming parameter to be entered or selected for that menu.

In some cases, the instructional information may provide instructions on how to respond to a corresponding menu option. In some instances, all menus that solicit a value or a selection from a user display instructional information in a common or fixed area of the display, such as lower portion 42. In some cases, the instructional information may be presented in a consistent or common format, such as "SELECT [A] FOR [B]" or "ENTER [A] FOR [B]", where [A] describes the parameter and [B] describes what part of the environment control device the selection applies. By providing the instructional information in a common or fixed area of the display, such as lower portion 42, and/or in a consistent format, a more consistent look and feel may be achieved, making the user interface more intuitive to use.

In some instances, at least one of the programming menus may solicit a selection between two or more displayed choices, and the instructional information displayed within lower portion 42 of display 36 may ask the user to make a selection. On other instances, at least one of the programming menus may solicit a parameter value, and the instructional information displayed within lower portion 42 of display 36 may instruct the user to enter a parameter value.

In some instances, upper portion 40 of display 36 may be reserved for displaying breadcrumb information while lower portion 42 of display 36 may be reserved for displaying instructional information, at least for some menus of the hierarchical menu structure. It will be recognized, however, that in some cases lower portion 42 of display 36 may be used for breadcrumb information while upper portion 40 of display 36 may be used for instruction information. In some instances, display 36 may include an intermediate portion 44 that may, in some cases, be used to display breadcrumb information and/or instruction information, if desired. In some cases, it is contemplated that intermediate portion 44 of display 36 may provide additional display space for either the breadcrumb information displayed in upper portion 40 of display 36 or the instructional information displayed in lower portion 42 of display 36, if so desired.

Control pad 38 may include one or more buttons such as electromechanical buttons. In some cases, control pad 38 may include an up button 46 and a down button 48. A next button 50 and a back button 52 may also be included in control pad 38. In some cases, a program menu button 54 that may be configured to initiate a programming mode may be disposed within control pad 38. Control pad 38 may include a home button 56 that may be configured to display a home page(s) on display 36. In some cases, the home page(s) may display a value of one or more control parameters, a value of a set point, a sensor input value and/or a control output value, as well as other information as desired. In some instances, up button 46, down button 48, next button 50, back button 52, program menu button 54 and home button 56 may be the only buttons present on the front of environmental control device 10, but this is not required in all embodiments.

In some cases, up button 46 is positioned above down button 48, and next button 50 is positioned to the right of back button 52. In some instances, next button 50 is positioned to the right of up button 46 and down button 48, and back button 52 is positioned to the left of up button 46 and down button 48. In some embodiments, up button 46, down button 48, next button 50 and back button 52 may be collectively laterally centered within control pad 38 and/or with respect to the housing of the environmental control device 10. Home button 56 may be positioned within an upper left portion of control pad 38 while program menu button 54 may be positioned within an upper right portion of control pad 38 as shown.

As noted above, environmental control device 10 may provide a hierarchical menu structure that includes a number of hierarchical menus. In some cases, one or more of the menus may, in a programming mode, query a user to enter a value or make a selection. One or more of up button 46, down button 48, next button 50 and/or back button 52 may be used to enter the requested value or make the requested selection.

In some instances, at least one of the menus includes, in the programming mode, a first indicator for identifying a current active menu on display 36 and one or more second indicators for identifying currently available or selected sub-menus. The current active menu may include a first indicator associated with the first menu label for indicating that a menu immediately above the current active menu may be activated by depressing back button 52. A second indicator may be associated with a currently selected sub-menu for indicating that the currently selected sub-menu may be activated by depressing the next button 50, as will be further described below.

Figure 3:
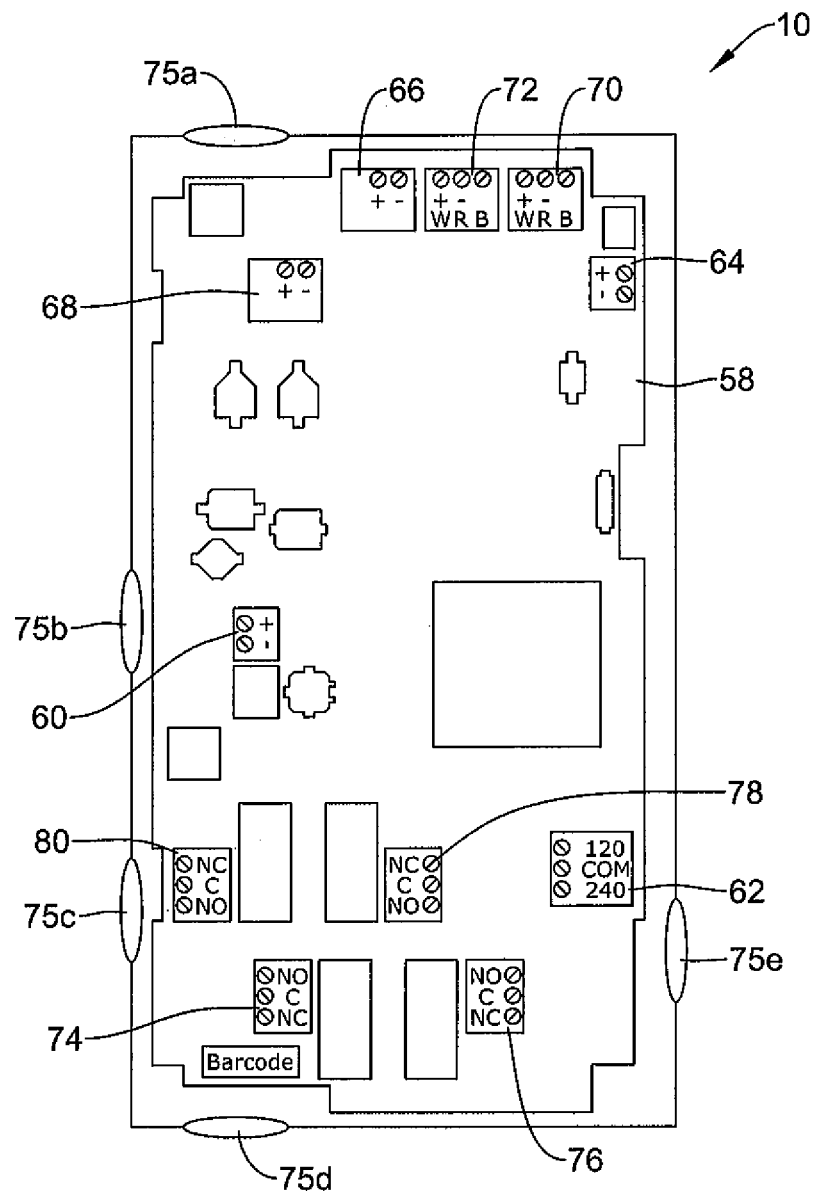
FIG. 3 is back view showing the electrical connections of the illustrative environmental control device 10.

FIG. 3 is back view showing the electrical connections of the illustrative environmental control device 10. It is contemplated that the illustrative environmental control device 10 may be adapted to provide a degree of flexibility in its application. For example, environmental control device 10 may be configured such that it can be powered either using line voltage (120/240 volts), or a low voltage (24 volts) commonly associated with HVAC and other control systems without requiring distinctly different control devices. As shown in FIG. 3, environmental control device 10 may include both a 24 volt power connection 60 as well as a 120/240 volt power connection 62. Depending on the specific environmental control equipment 14 (FIG. 1) that environmental control device 10 is to control, an installer may make the appropriate power connections to environmental control device 10. In some cases, both power sources may be used.

The illustrative environmental control device 10 is also configured to include a digital input 64. In some cases, environmental control device 10 may not include a time keeping function, and thus it may be advantageous to be able to connect an external time clock or similar timer. Digital input 64 may provide a connection for providing communication between an external time clock (not illustrated) and controller 18 (FIG. 1). Alternatively, or in addition, other digital input signals may be provided to controller 18 via digital input 64. It is contemplated that more that one digital inputs may be provided, if desired.

In some instances, environmental control device 10 may be configured to include a sensor A input 66 and a sensor B input 68. Sensor A input 66 and/or sensor B input 68 may be used to connect one or more external sensors such as sensors 16 (FIG. 1) to environmental control device 10. In some cases, environmental control device 10 may also include a mod 1 (modulating output) connector 70 and a mod 2 (modulating output) connector 72. Mod 1 connector 70 and/or mod 2 connector 72 may be used to connect expansion modules to environmental control device 10, as desired or needed for a particular application.

The illustrative environmental control device 10 may also includes an output relay 1 connector 74, an output relay 2 connector 76, an output relay 3 connector 78 and an output relay 4 connector 80. Output relay 1 connector 74, output relay 2 connector 76, output relay 3 connector 78 and/or output relay 4 connector 80 may be used to provide connections between one or more relays internal to the environmental control device 10 and equipment within environmental control equipment 14 (FIG. 1). In some instances, the relays may be located within housing 26, while in other instances one or more of the relays may be disposed externally to housing 26 such as at the remote equipment of environmental control equipment 14.

While not required, the illustrative environmental control device 10 may also include a number of knock-outs 75*a*-75*e* that may be selectively removed, or knocked out, by the installer to provide access openings to allow wires to pass into the housing. Various wires from the environmental control equipment 14 and/or sensors 16 may pass through the access openings to connect to the various terminals shown in FIG. 3. In some embodiments, access openings are provided through the housing, without the corresponding knock-outs 75*a*-75*e*.

Figure 4:
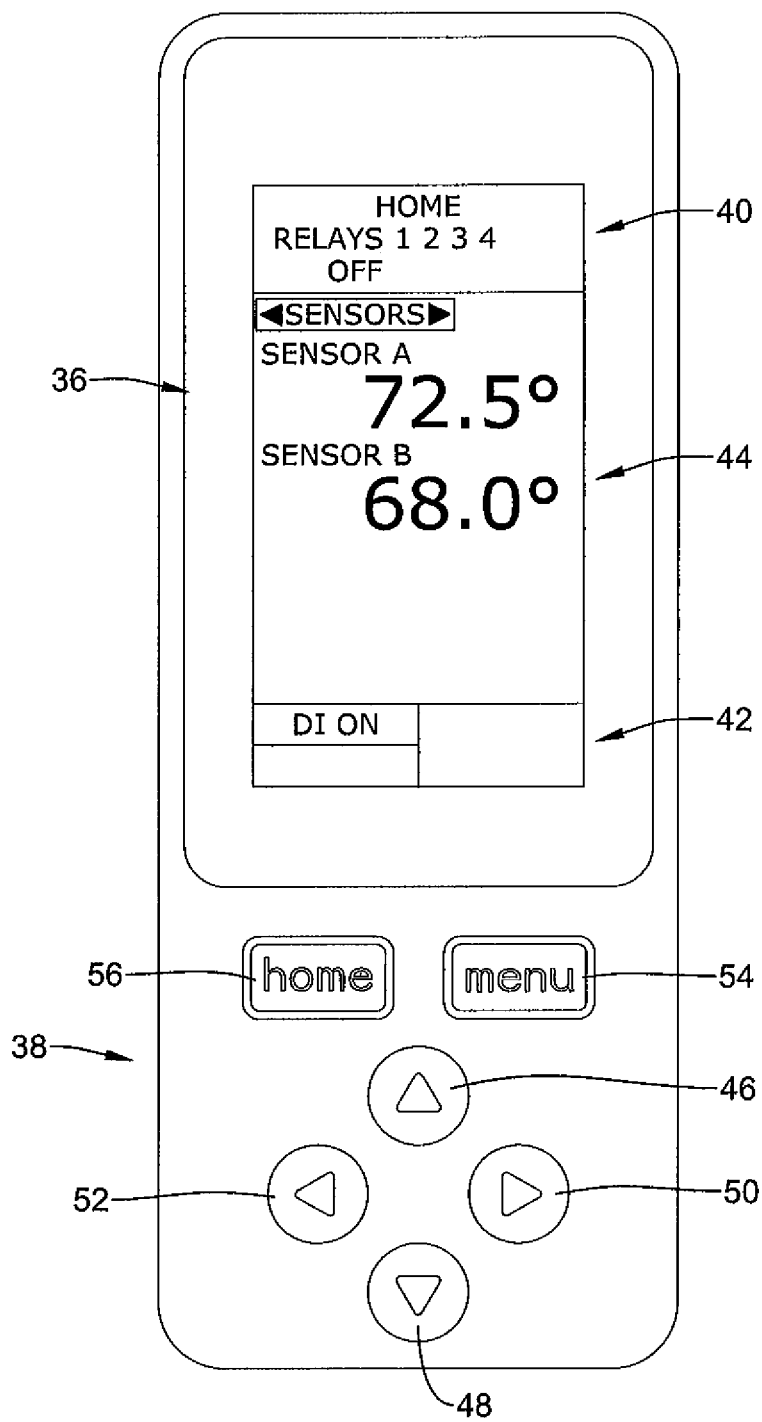
FIGS. 4 through 56 are diagrammatic front views of a portion of the illustrative environmental control device of FIG. 2, showing aspects of its operation.
Figure 5:
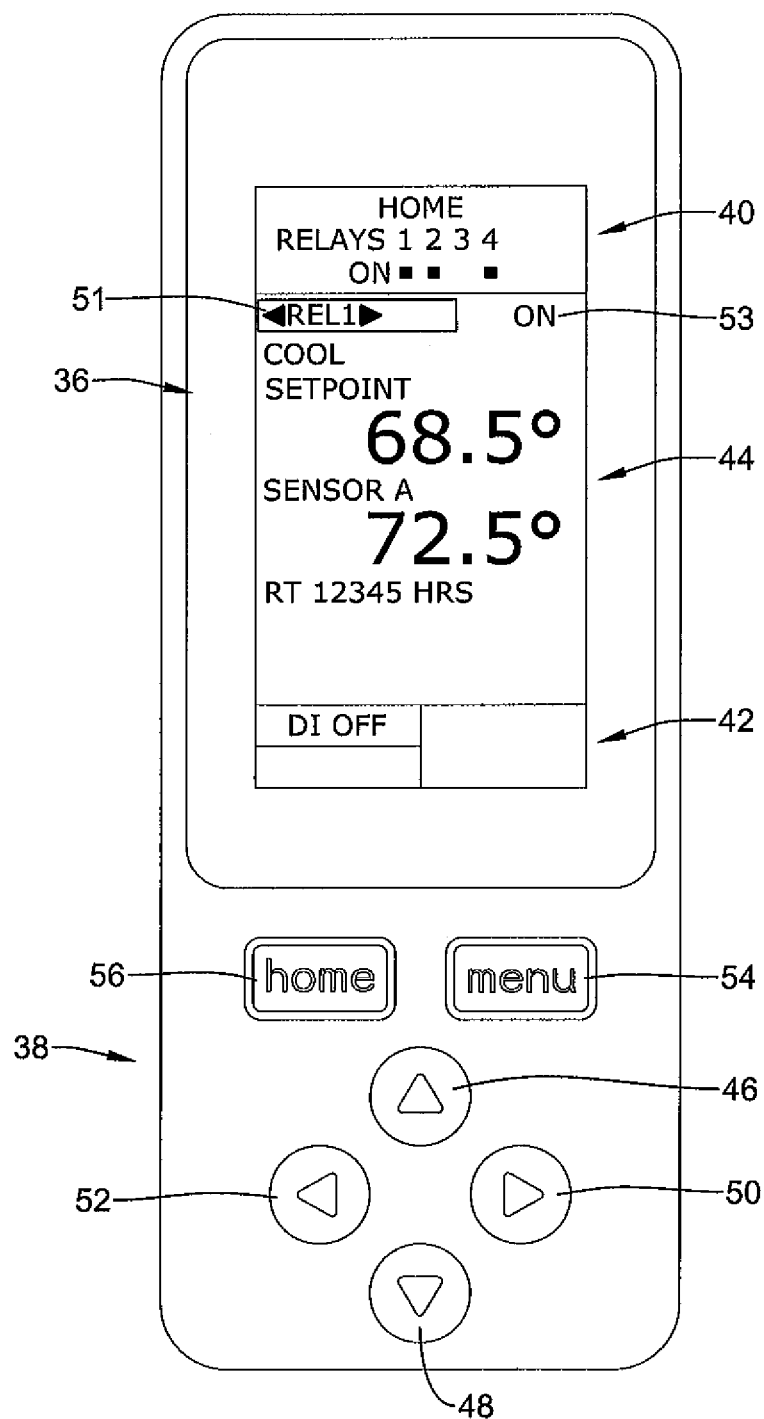
Figure 6:
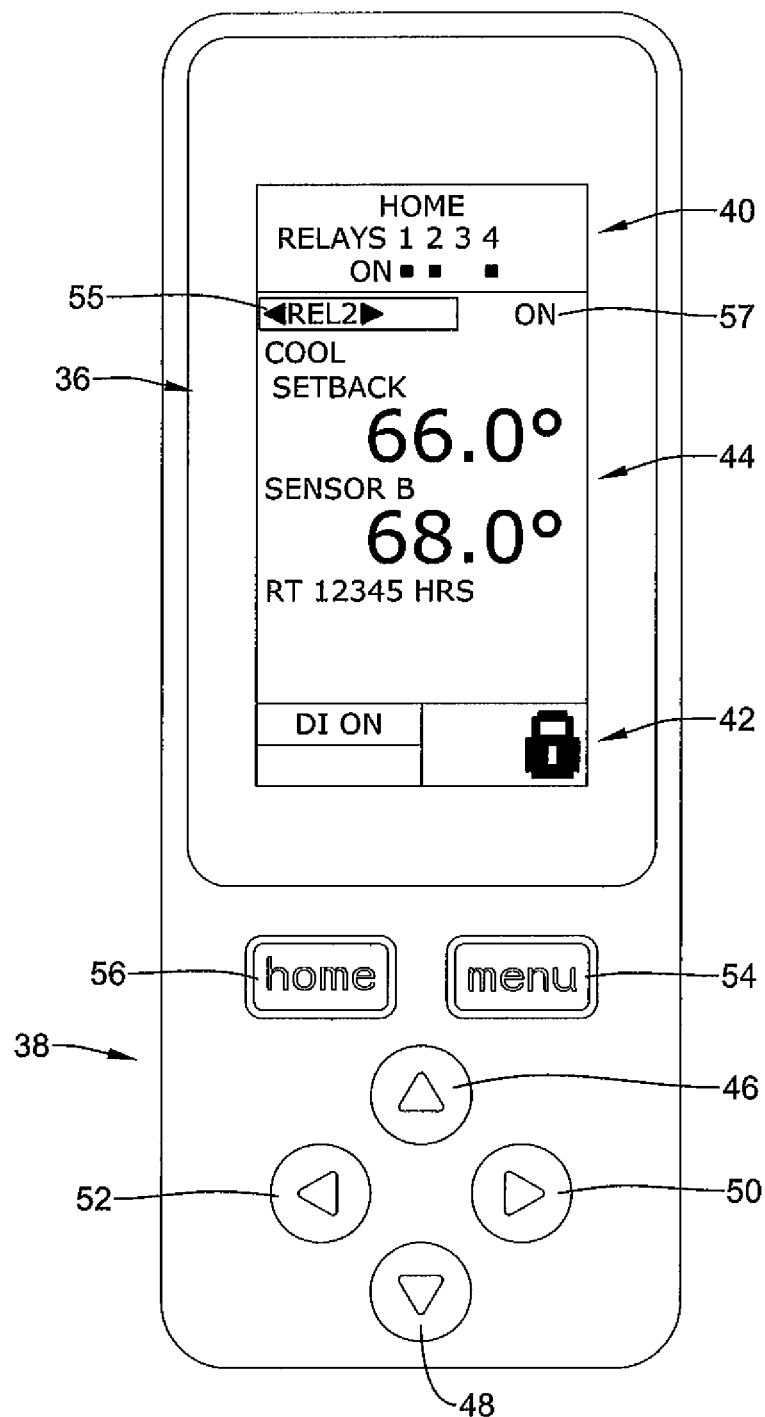
Figure 56:
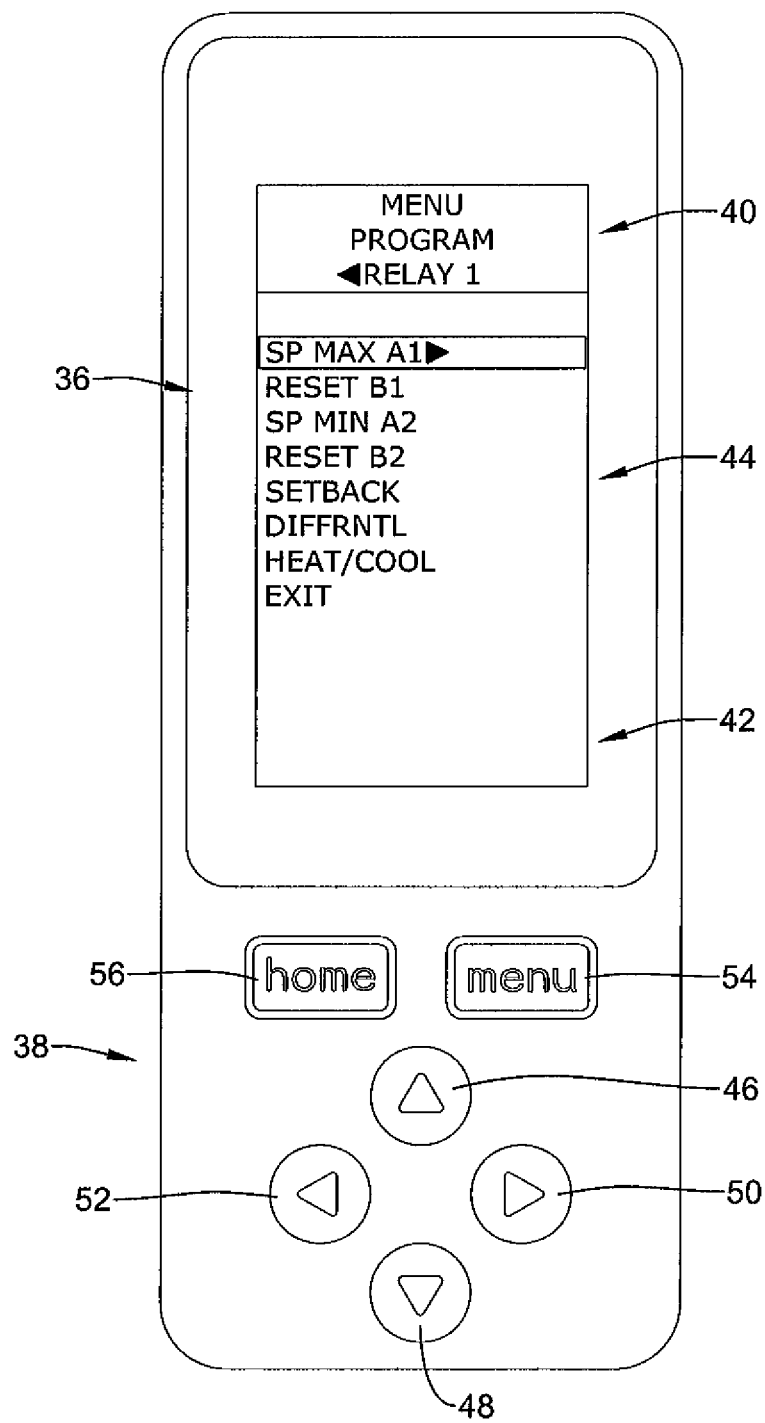

FIGS. 4 through 56 are diagrammatic front views of a portion of the illustrative environmental control device of FIG. 2, showing aspects of its operation. FIGS. 4, 5 and 6 provide illustrative but non-limiting examples of different information that may be displayed on a home page(s). The specific information shown in each of FIGS. 4, 5 and 6 may be accessed by scrolling using next button 50 and/or back button 52 as appropriate. In FIG. 4, the relays are shown turned off, as displayed within upper portion 40 of display 36. In this particular illustration, environmental control device 10 (FIG. 1) is shown as including or being connected to a total of four relays. In some instances, environmental control device 10 may include or be connected to less than four relays, or may be include or be connected to more than four relays, as desired.

In FIG. 4, intermediate portion 44 of display 36 is displaying information regarding sensor A and sensor B. The information displayed may be actual ambient temperatures currently being sensed by sensor A and sensor B, respectively. In this example, sensor A is detecting a temperature of 72.5° Fahrenheit while sensor B is detecting a temperature of 68.0° Fahrenheit. Lower portion 42 of the illustrative display 36 includes a DI ON icon, meaning that there is an external time clock or other device connected to digital input 64 (FIG. 3) and/or that the external time clock or other device is operational.

FIG. 5 provides an example of a home page in which relays 1, 2 and 4 are turned on and relay 3 is either turned off or is not connected. It will be recognized that each of the relays may be connected to and/or otherwise control specific equipment within environmental control equipment 14 (FIG. 1). Information is displayed regarding relay 1, as shown at 51. It can be seen that the equipment controlled by relay 1 includes cooling equipment, because a cooling setpoint is displayed. The current temperature setpoint for this equipment is 68.5° Fahrenheit while sensor A is detecting an actual temperature of 72.5° Fahrenheit. The status of relay 1 is shown as "on", as can be seen at 53. Controller 18 (FIG. 1) is displaying an illustrative run time for relay 1 of 12345 hours. In this illustration, either no external time clock or other digital equipment is connected to digital input 64 (FIG. 3), or the external time clock or other digital equipment is off or otherwise not running, as evidenced by the DI OFF icon.

FIG. 6 provides an example of a home page in which relays 1, 2 and 4 are turned on and relay 3 is either turned off or is not connected. It will be recognized that each of the relays may be connected to and/or otherwise control specific equipment within environmental control equipment 14 (FIG. 1). Information is displayed regarding relay 2, as shown at 55. It can be seen that the equipment controlled by relay 2 includes cooling equipment, because a cooling setpoint is displayed. The current temperature setback temperature is 66.0° Fahrenheit, while sensor B is detecting an actual temperature of 68.0° Fahrenheit. The status of relay 2 is shown as "on", as can be seen at 57. Controller 18 (FIG. 1) is displaying an illustrative run time for relay 2 of 12345 hours. In this illustration, either no external time clock or other digital equipment is connected to digital input 64 (FIG. 3), or the external time clock or other digital equipment is off or otherwise not running, as evidenced by the DI OFF icon.

In the illustrative screen, a lock icon is displayed within lower portion 42 of display 36. This may be used to indicate that control pad 38 has been locked, i.e., frozen, so that an individual may be prevented from either accidentally or intentionally entering data or making changes to environmental control device 10. In some cases, control pad 38 may be locked by pressing a particular key or combination of keys and may be unlocked via a similar key pattern. For example, control pad 38 may be locked by simultaneously pressing and holding the home button 56 and menu button 54 for five seconds. Once locked, control pad 38 may be unlocked by once again simultaneously pressing and holding home button 56 and menu button 54 for a period of time. Any combination of keys may be used to lock and unlock control pad 38, as desired and as programmed into controller 18 (FIG. 1). In some cases, the home screen shown in FIG. 6 may be accessed by hitting the next button 50 shown in FIG. 5.

Figure 7:
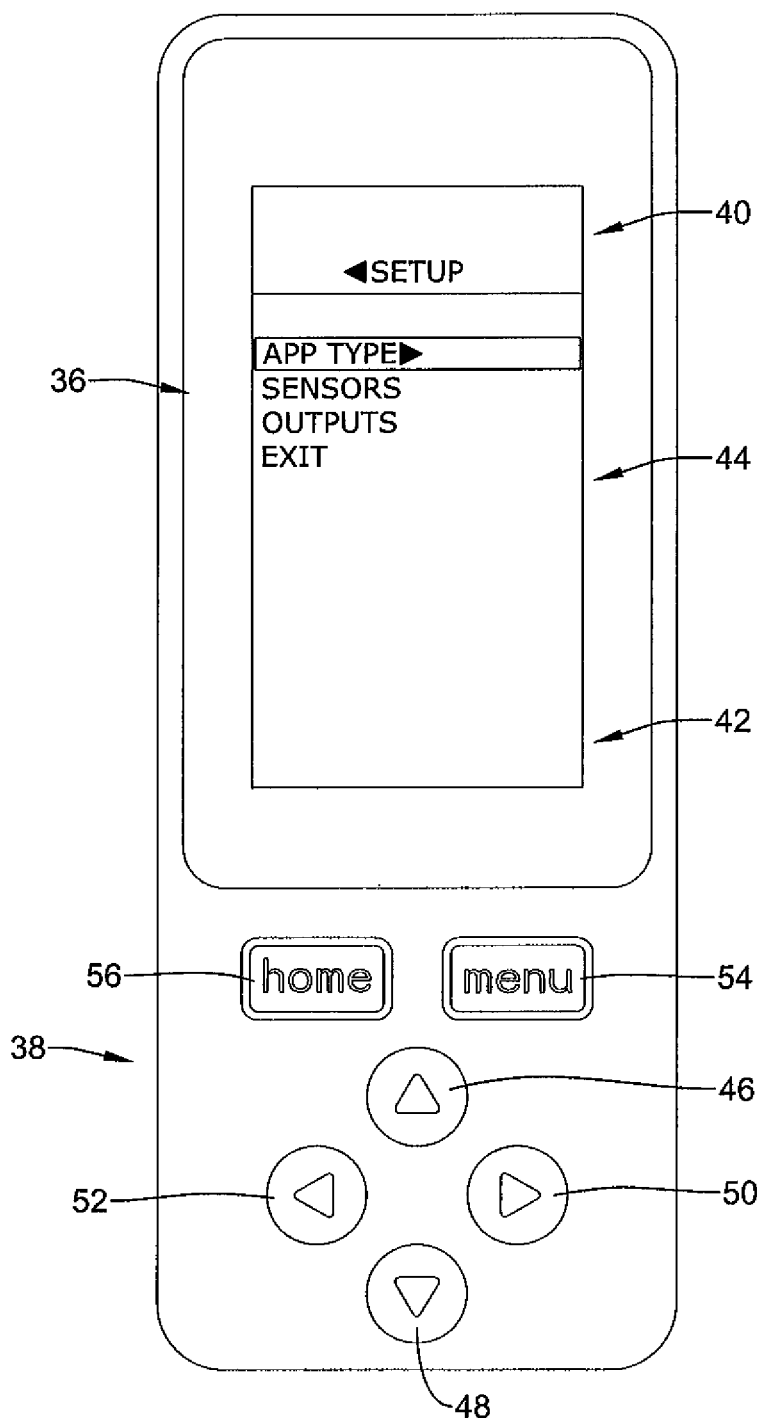

FIG. 7 shows the beginning of a setup sequence in which a user may select (as displayed in intermediate portion 44 of display 36) between setting information pertaining to application type, information pertaining to sensors, and/or information pertaining to outputs. A user may, if desired, toggle or scroll through these options by pressing up button 46 and/or down button 48, as appropriate. Exiting is also an option. In some instances, selecting EXIT will cause controller 18 (FIG. 1) to revert to a previous menu or programming menu level in the hierarchical menu structure. In some cases, a user may loop through, i.e., pressing down button 48 when EXIT is highlighted will cause controller 18 (FIG. 1) to scroll back up to APP TYPE. A particular option may be selected by pressing next button 50, if desired. In the illustrated view, an indicator such as a right-facing arrow is displayed next to APP TYPE, indicating that this option may be selected by pressing next button 50.

Upper portion 40 of display 36 may display breadcrumbs providing a user with information as to the current menu location within the hierarchical menu structure of controller 18, and/or how they got to a particular menu or programming screen within the hierarchical menu structure. In FIG. 7, a SETUP breadcrumb is displayed, indicating that a user got to the displayed menu location by selecting SETUP in a previous menu, such as perhaps a programming menu reached by pressing menu button 54. In the illustrative embodiment, an indicator such as a left-facing arrow is displayed next to the SETUP breadcrumb, indicating that a user may return to the previous menu by pressing back button 52.

Figure 8:
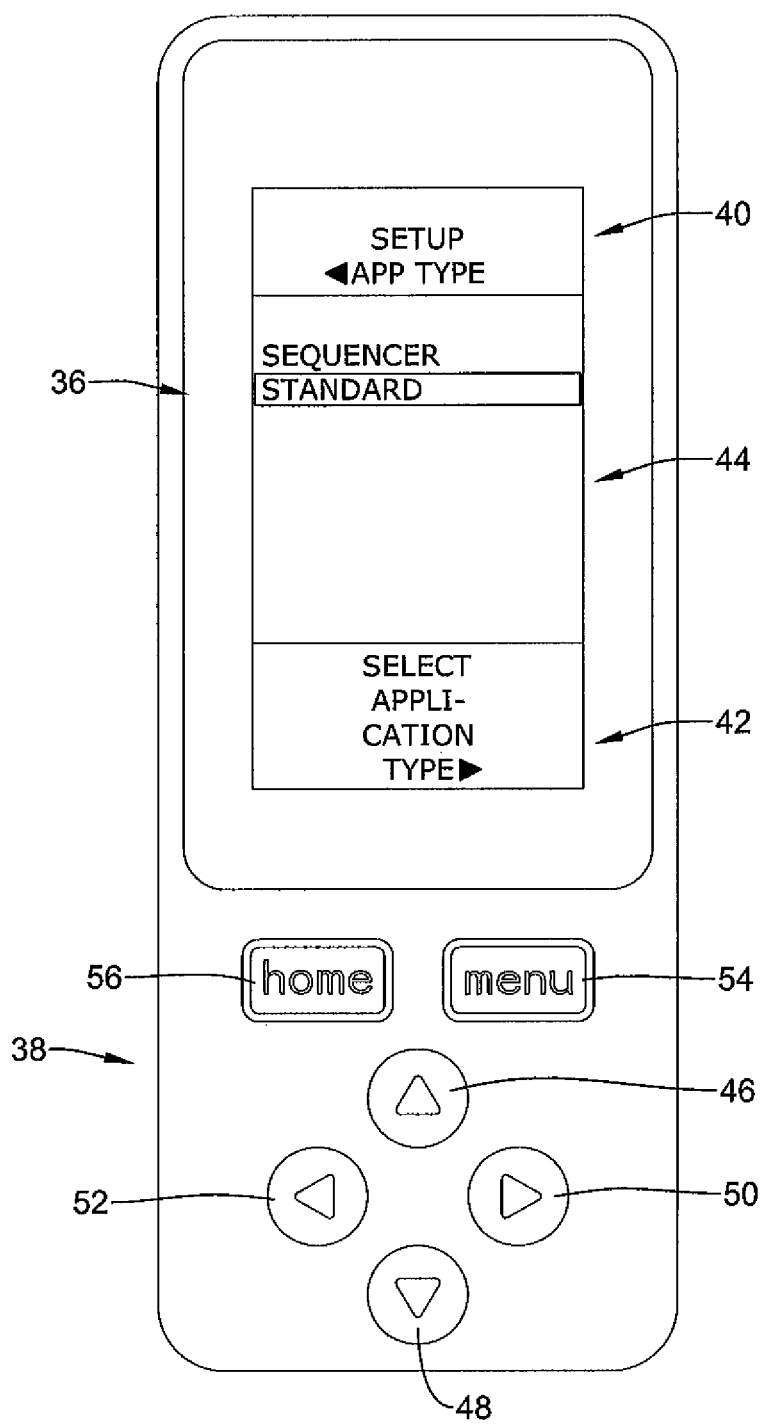

In moving to FIG. 8, it can be seen that a user has selected the APP TYPE option in FIG. 7, and a second breadcrumb APP TYPE has been displayed within upper portion 40 of display 36. An indicator such as a left-facing arrow may be displayed next to the APP TYPE breadcrumb to indicate that a user may, if desired, return to the previous hierarchical menu screen by pressing back button 52. Intermediate portion 44 of display 36 displays available application type options. A user may toggle or scroll through these options using up button 46 and/or down button 48. While only two application type options are displayed in FIG. 8, it will be recognized that the number and particular application type options may be at least partially a function of the specific equipment installed as part of environmental control equipment 14 (FIG. 1).

Lower portion 42 of display 36 may include instructional information pertaining to the selection that the user is being asked to make. In the particular example of FIG. 8, the user is being asked to select the application type. A label such as a right-facing arrow is displayed within lower portion 42 of display 36, next to the instructional information, to indicate that the user may select a particular application type by pressing next button 50 once the particular application type is highlighted using the up button 46 and/or down button 48, as appropriate.

Figure 9:
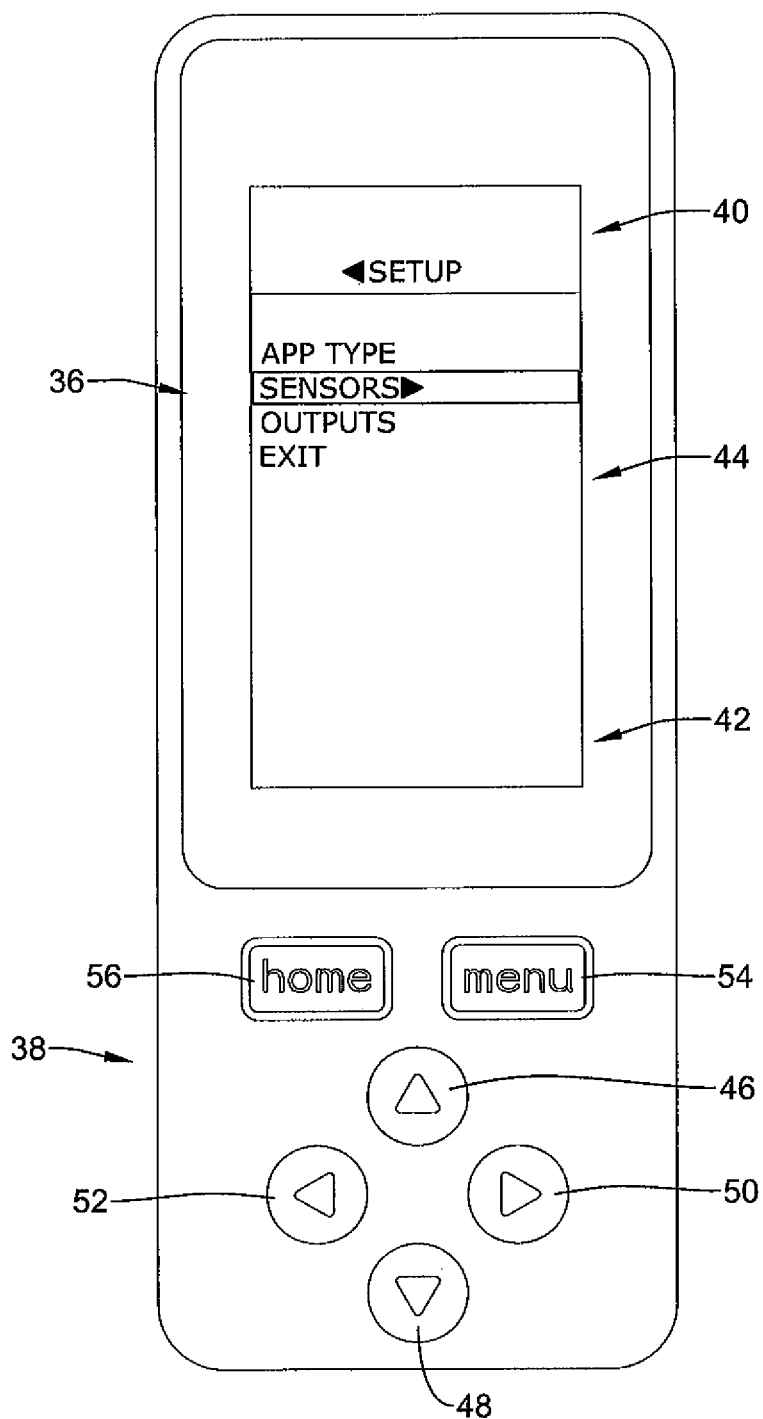

In FIG. 9, a user has returned to the SETUP menu, as indicated by the SETUP breadcrumb displayed in upper portion 40 of display 36. A label such as a left-facing arrow is displayed next to the breadcrumb information, indicating that a user may return to the previous menu by pressing back button 52. In FIG. 9, a user has scrolled down to the SENSORS option in order to provide controller 18 (FIG. 1) with information pertaining to the sensor or sensors that are or will be connected to environmental control device 10.

Figure 10:
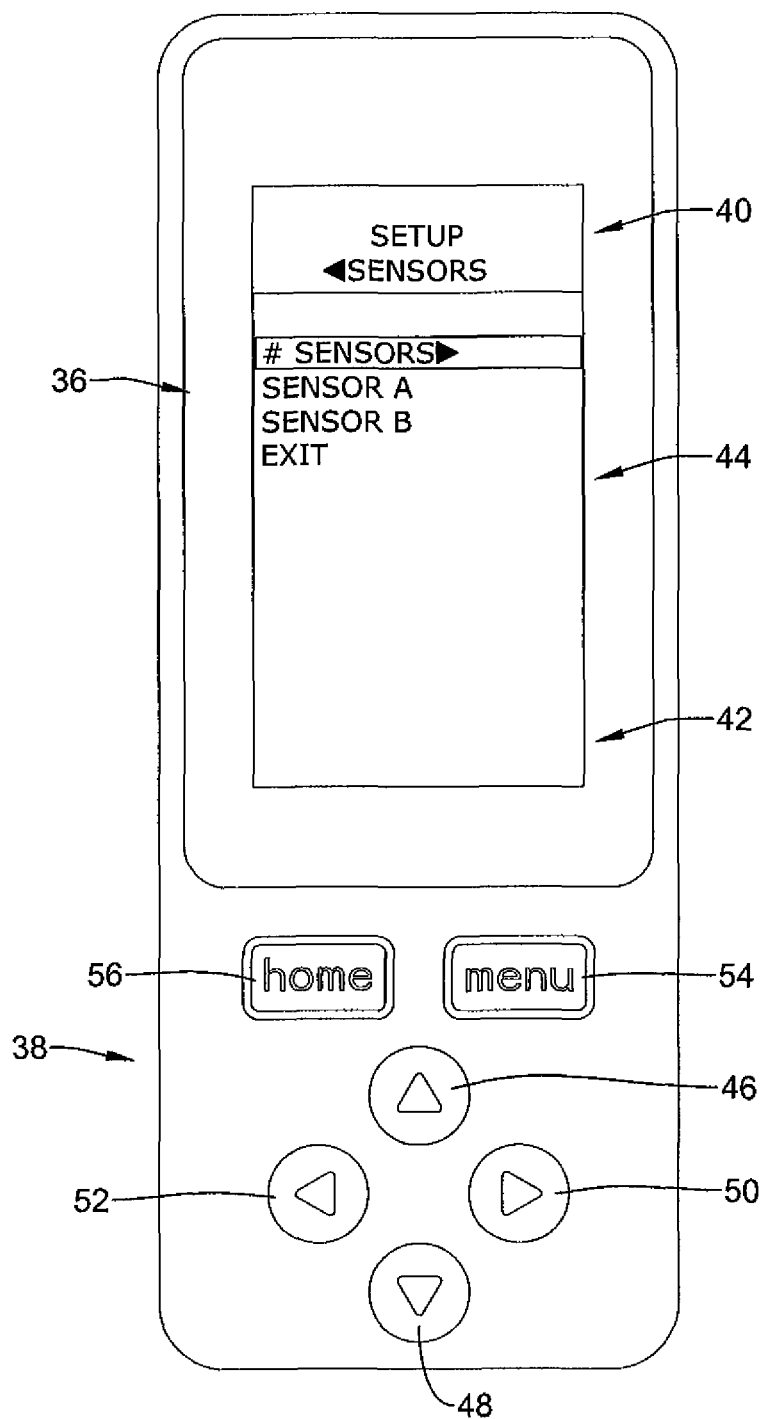

Moving to FIG. 10, it can be seen that a user has selected the SENSORS option in FIG. 9, as indicated by the SENSORS breadcrumb displayed within upper portion 40 of display 36. The SENSORS breadcrumb is vertically blow the SETUP breadcrumb, showing the current menu position or path in the hierarchical menu structure of the controller 18. The left-facing arrow displayed next to the SENSORS breadcrumb indicates that the user may return to the previous screen (i.e. the SETUP menu) by pressing back button 52. In this particular menu screen, a user may choose between specifying a number of sensors, information regarding sensor A or information regarding sensor B. It can be seen that the user has highlighted # SENSORS by using up button 46 and/or down button 48, as necessary.

Figure 11:
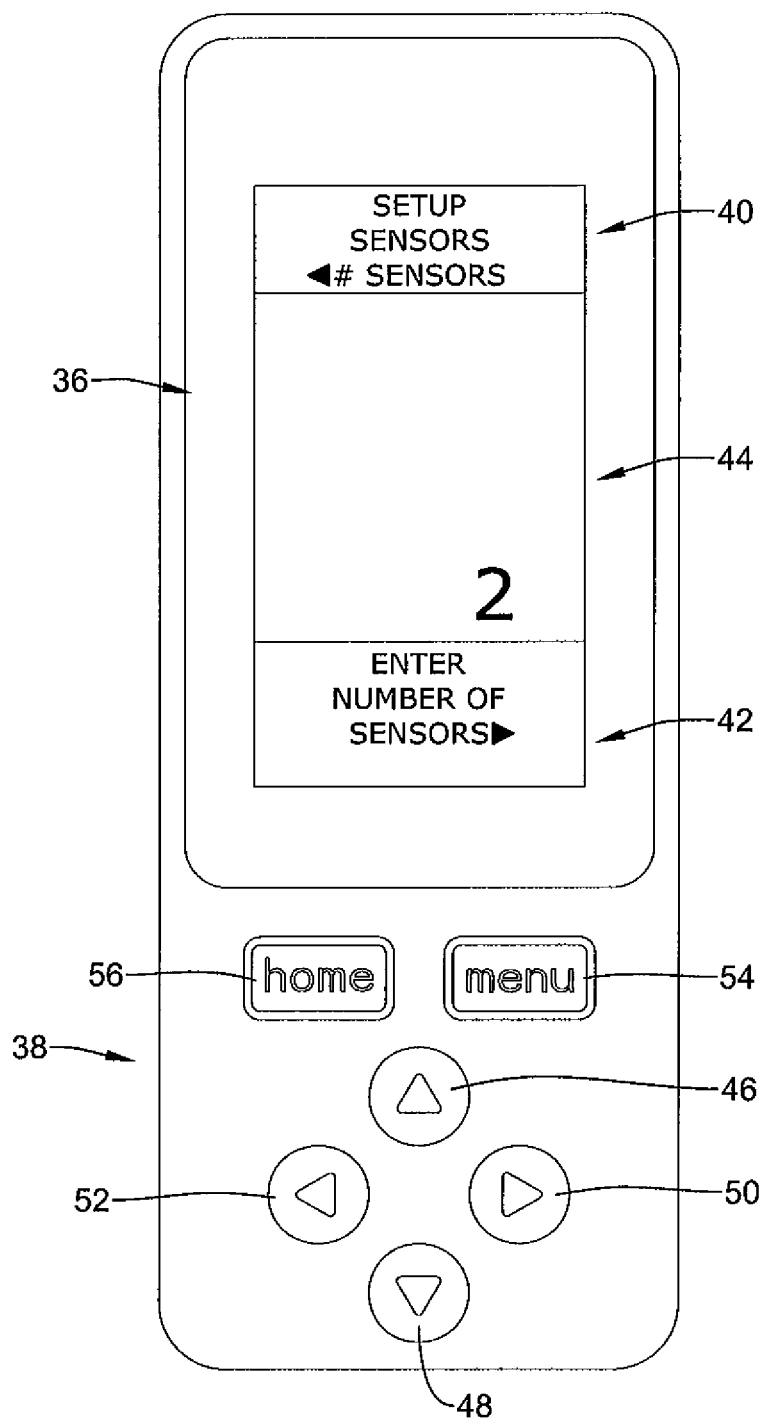

In FIG. 11, a #SENSORS breadcrumb and accompanying left-facing arrow has been displayed within upper portion 40 of display 36, confirming that the user had (with reference to FIG. 10) selected the # SENSORS option by pressing next button 50. The #SENSORS breadcrumb is shown vertically below the SENSORS breadcrumb, which is shown vertically blow the SETUP breadcrumb, thereby providing a path to the current menu position within the hierarchical menu structure of the controller 18.

A number "2" is displayed within intermediate portion 44 of display 36, and instructional information is displayed within lower portion 42 of display 36. The instructional information asks the user to enter the number of sensors. In some cases, the user may increment the number of sensors up or down using up button 46 and/or down button 48. Once the number of sensors has been entered, a user may return to the sensor setup page (as shown in FIG. 10) by either pressing back button 52 (not saving the entered value) or pressing next button 50.

Figure 12:
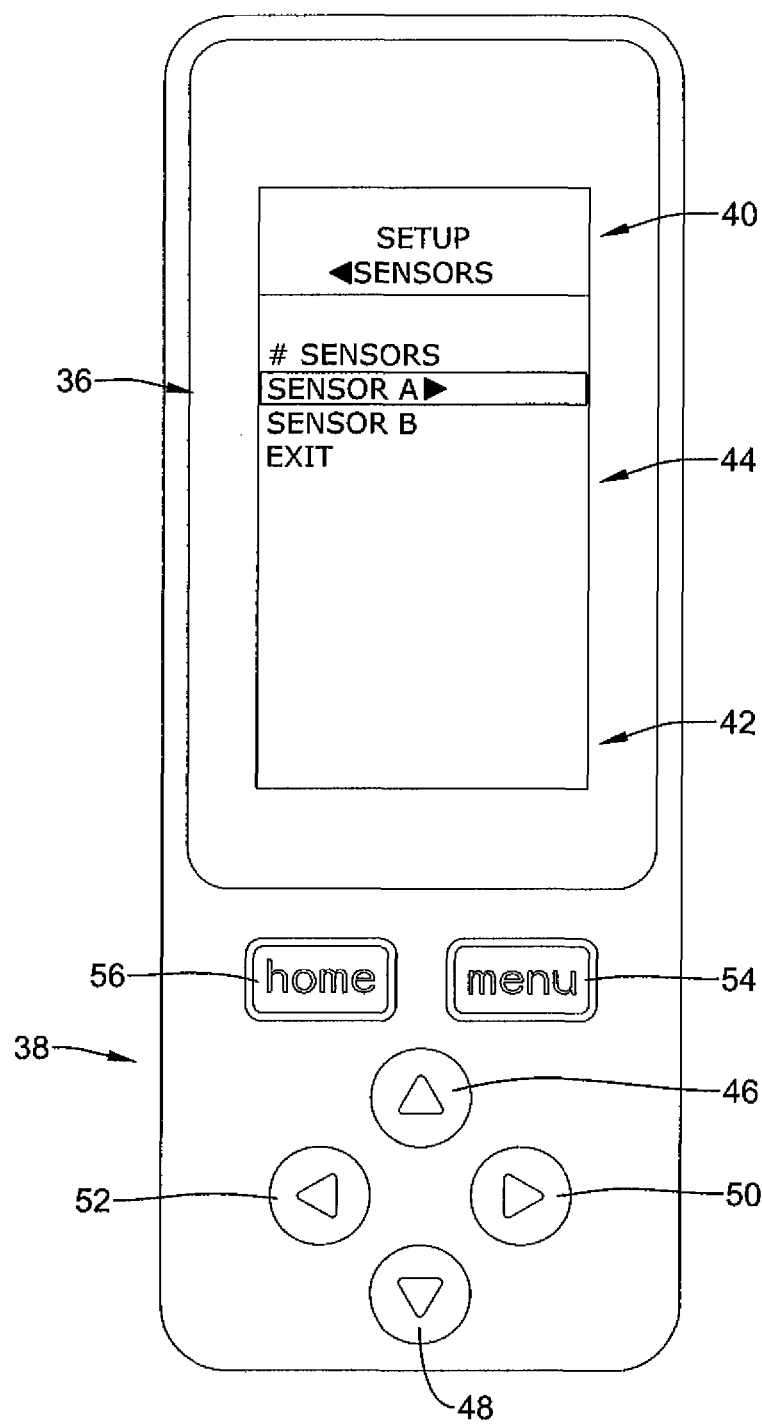
Figure 13:
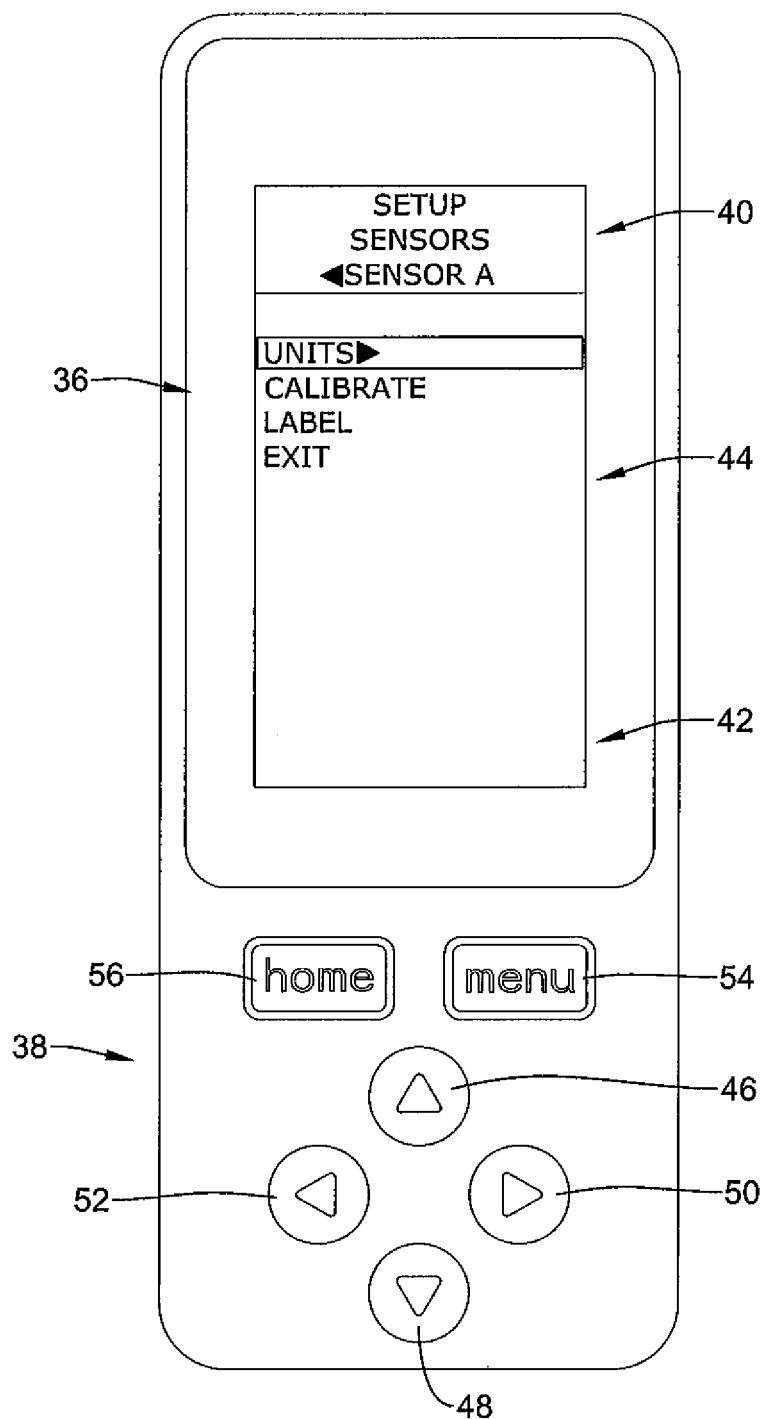

In FIG. 12, it can be seen that the user has toggled or scrolled down to the SENSORS A option of FIG. 10. It should be noted that the breadcrumb information displayed within upper portion 40 of display 36 is the same in FIG. 10 as in FIG. 12. Moving to FIG. 13, it can be seen that the user did (with reference to FIG. 12), select SENSOR A, as a SENSOR A breadcrumb is now displayed within upper portion 40 of display 36 along with a left-facing arrow. Within intermediate portion 44 of display 36, controller 18 (FIG. 1) is displaying options that the user may select from using up button 46 and/or down button 48, as appropriate. In FIG. 13, a user has scrolled or toggled to the UNITS option.

Figure 14:
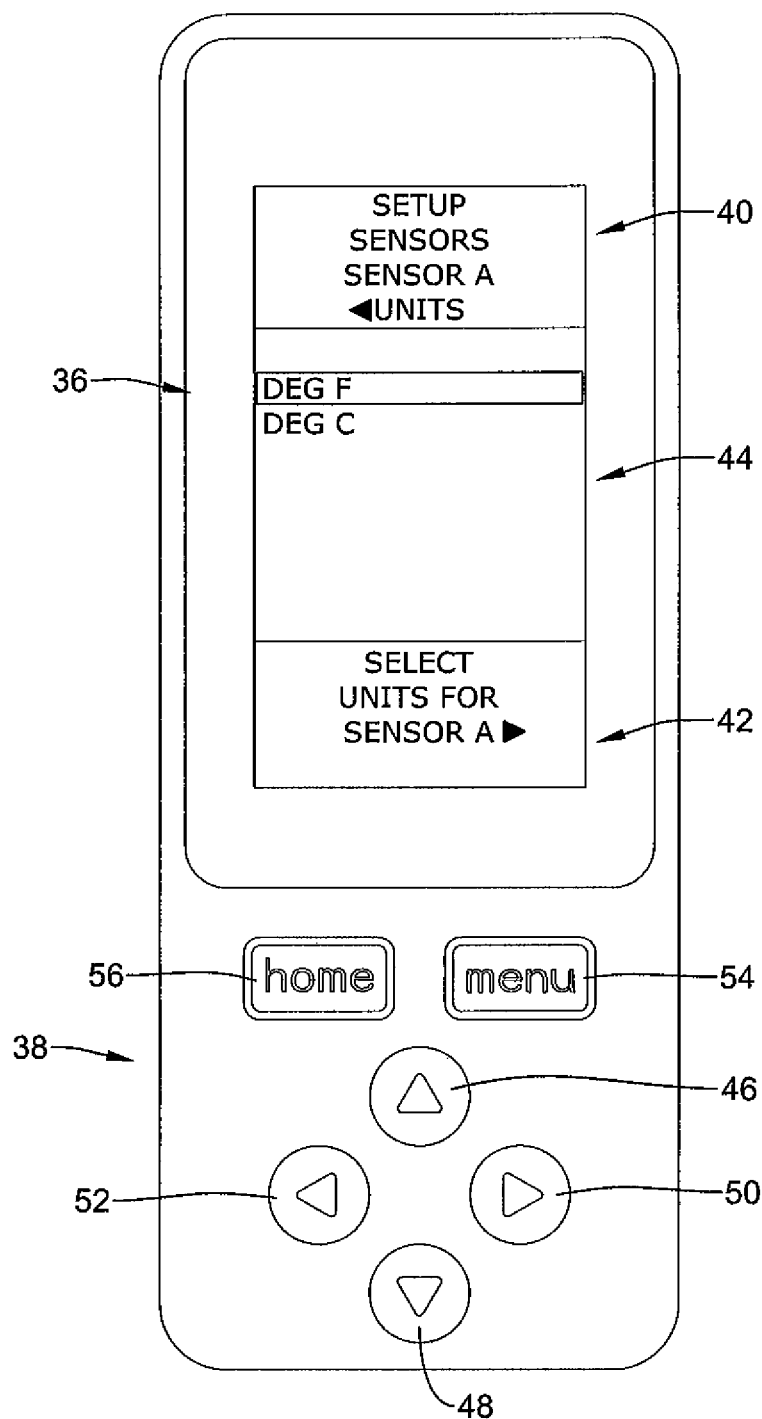

In FIG. 14, it can be seen that the user selected UNITS, as a UNITS breadcrumb and accompanying left-facing arrow has been added to upper portion 40 of display 36. Intermediate portion 44 of display 36 provides UNIT options for selection by the user, while lower portion 42 of display 36 provides corresponding instructional information. The user is able to select from degrees Fahrenheit or degrees Celsius for sensor A. The user has toggled or scrolled to DEG F, as this can be seen as being highlighted. To select Fahrenheit for the units for sensor A, the user can press next button 50, as indicated by the right facing arrow provided with instructional information in lower portion 42.

Figure 15:
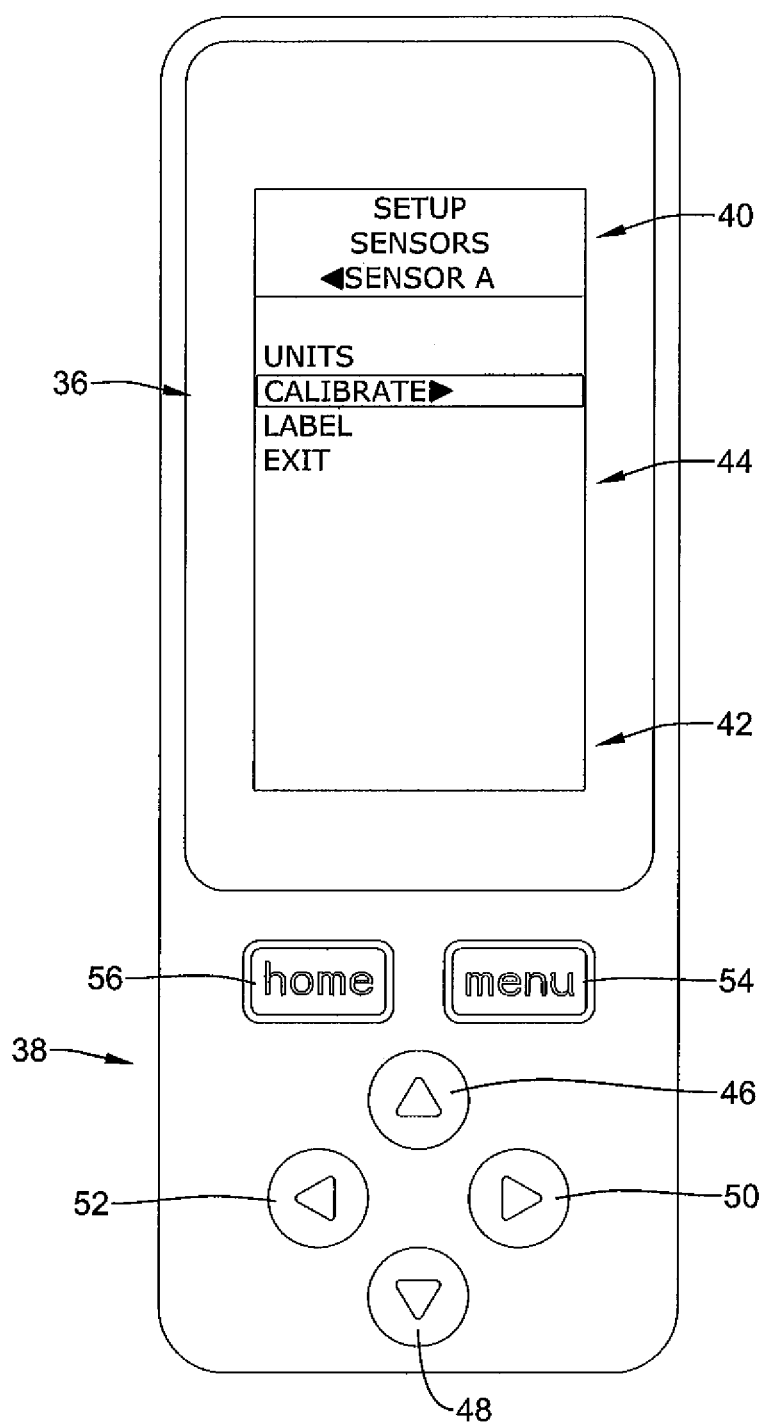

In FIG. 15, the user has returned to the menu screen shown in FIG. 13, as demonstrated by the SENSOR A breadcrumb displayed within upper portion 40 of display 36. In this case, the user has toggled or scrolled down to CALIBRATE, which can be selected, as indicated by the right-facing arrow displayed next to the CALIBRATE option, by pressing next button 50.

Figure 16:
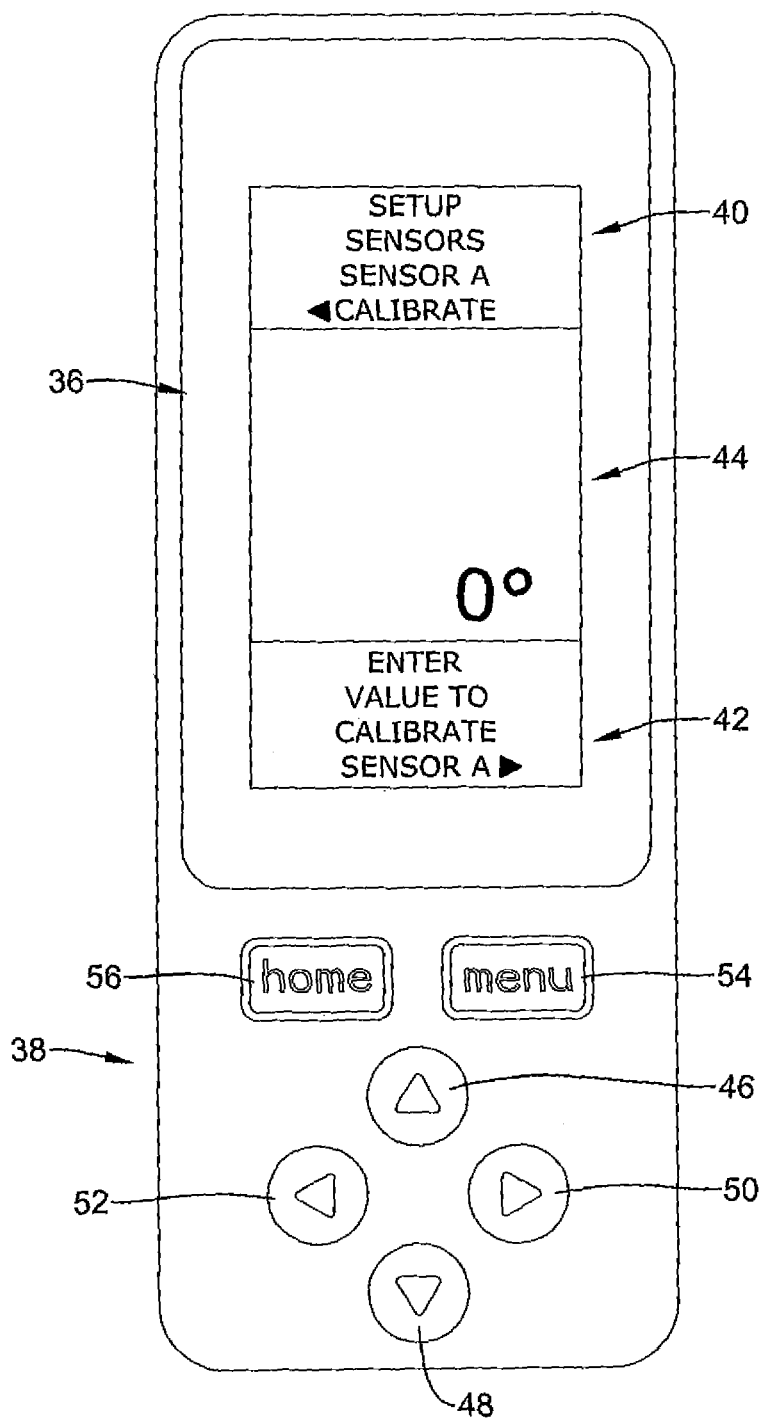

Moving to FIG. 16, it can be seen that the user selected the CALIBRATE option in FIG. 15, as a CALIBRATE breadcrumb and accompanying left-facing arrow has been added to upper portion 40 of display 36. Intermediate portion 44 of display 36 displays a calibration value. The calibration value may be increased or decreased by pressing up button 46 and/or down button 48, as appropriate. The lower portion 42 of display 36 displays instructional information asking the user to enter a calibration value for sensor A. The right-facing arrow next to the instructional information tells the user that they may accept the value by pressing next button 50.

Figure 17:
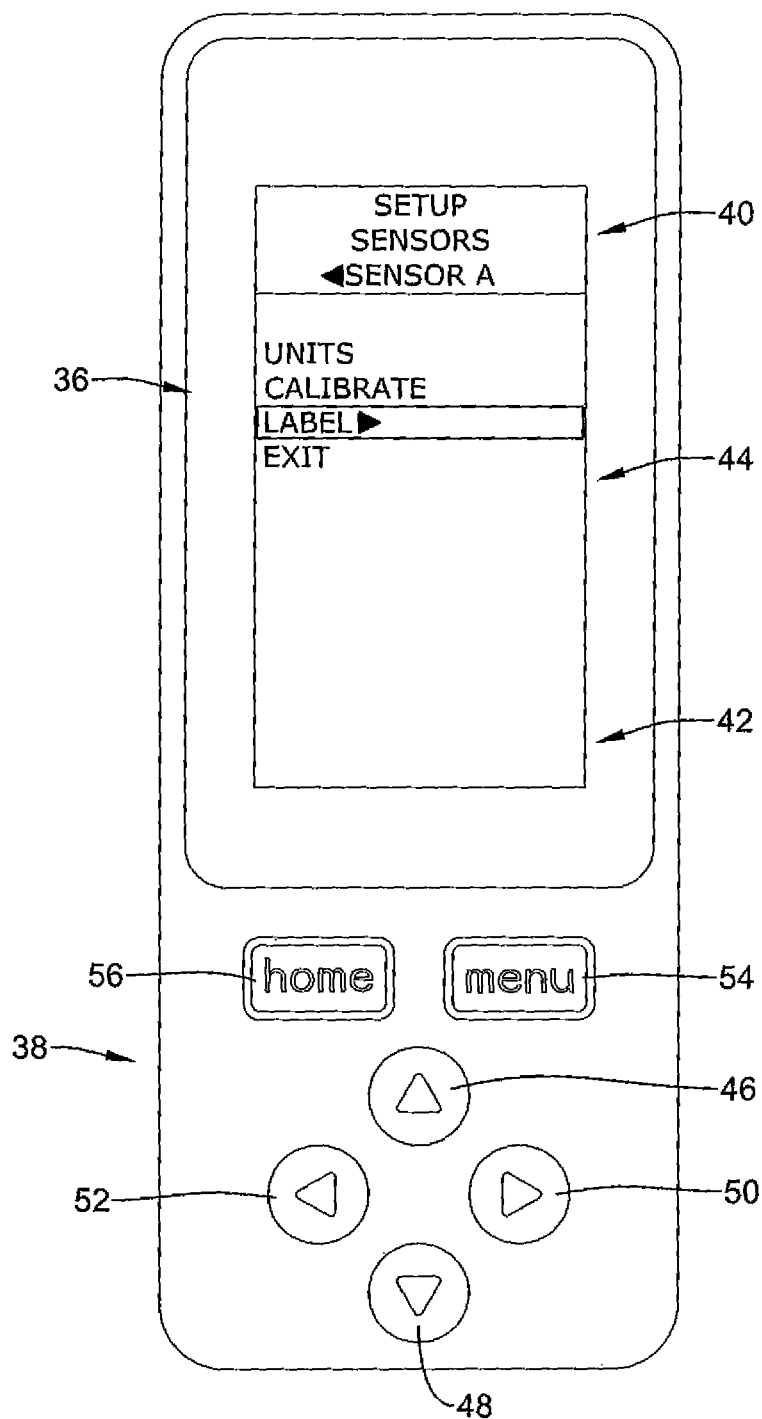

In FIG. 17, the user has returned to the menu screen shown in FIG. 15, as demonstrated by the SENSOR A breadcrumb displayed within upper portion 40 of display 36. In this case, the user has toggled or scrolled down to LABEL, which can be selected, as indicated by the right-facing arrow displayed next to LABEL option, by pressing next button 50.

Figure 18:
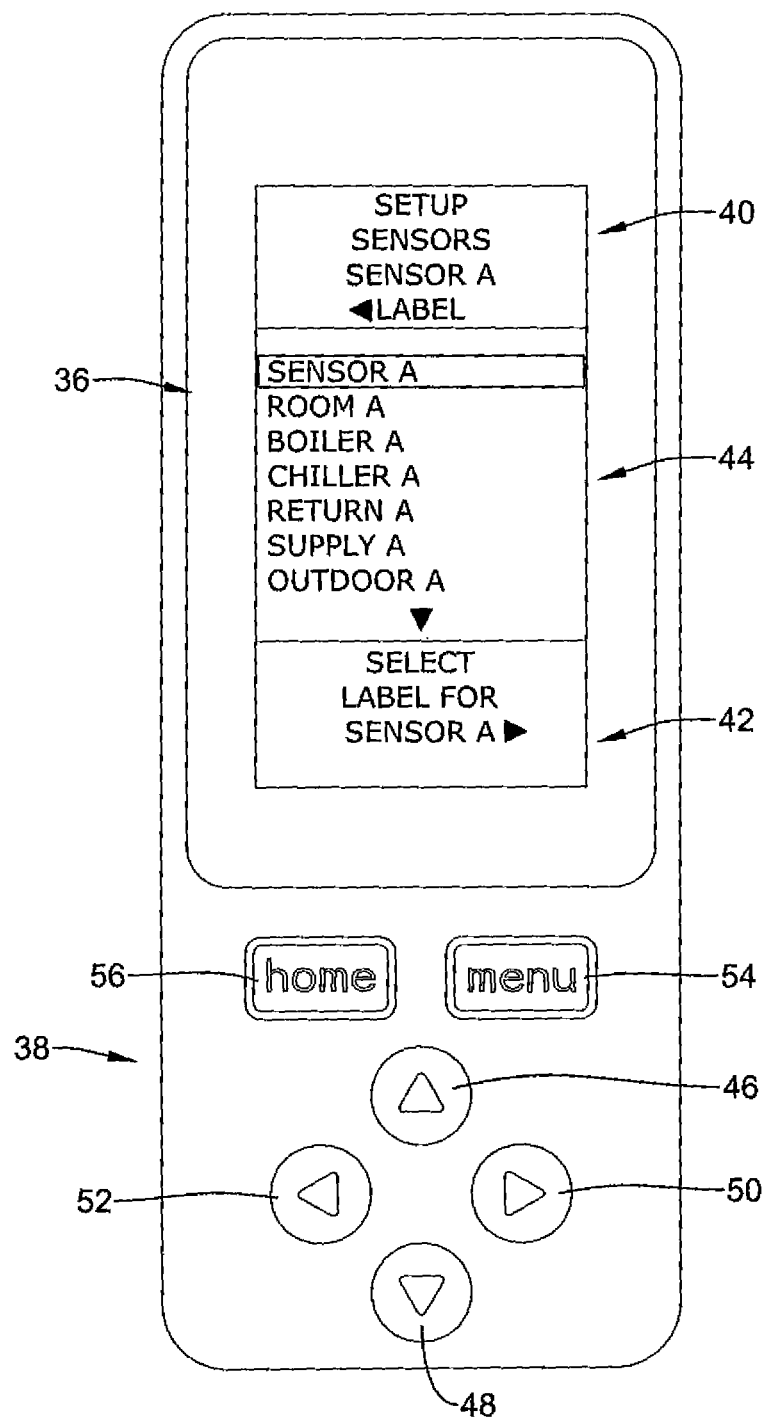

Moving to FIG. 18, it can be seen that the user selected the LABEL option in FIG. 17, as a LABEL breadcrumb and accompanying left-facing arrow has been added to upper portion 40 of display 36. Intermediate portion 44 of display 36 displays a list of labels for SENSOR A. The user may scroll or toggle through the list by pressing up button 46 and/or down button 48, as appropriate. The lower portion 42 of display 36 displays instructional information asking the user to select a desired label for sensor A. The right-facing arrow next to the instructional information tells the user that they may accept the selection by pressing next button 50.

Figure 19:
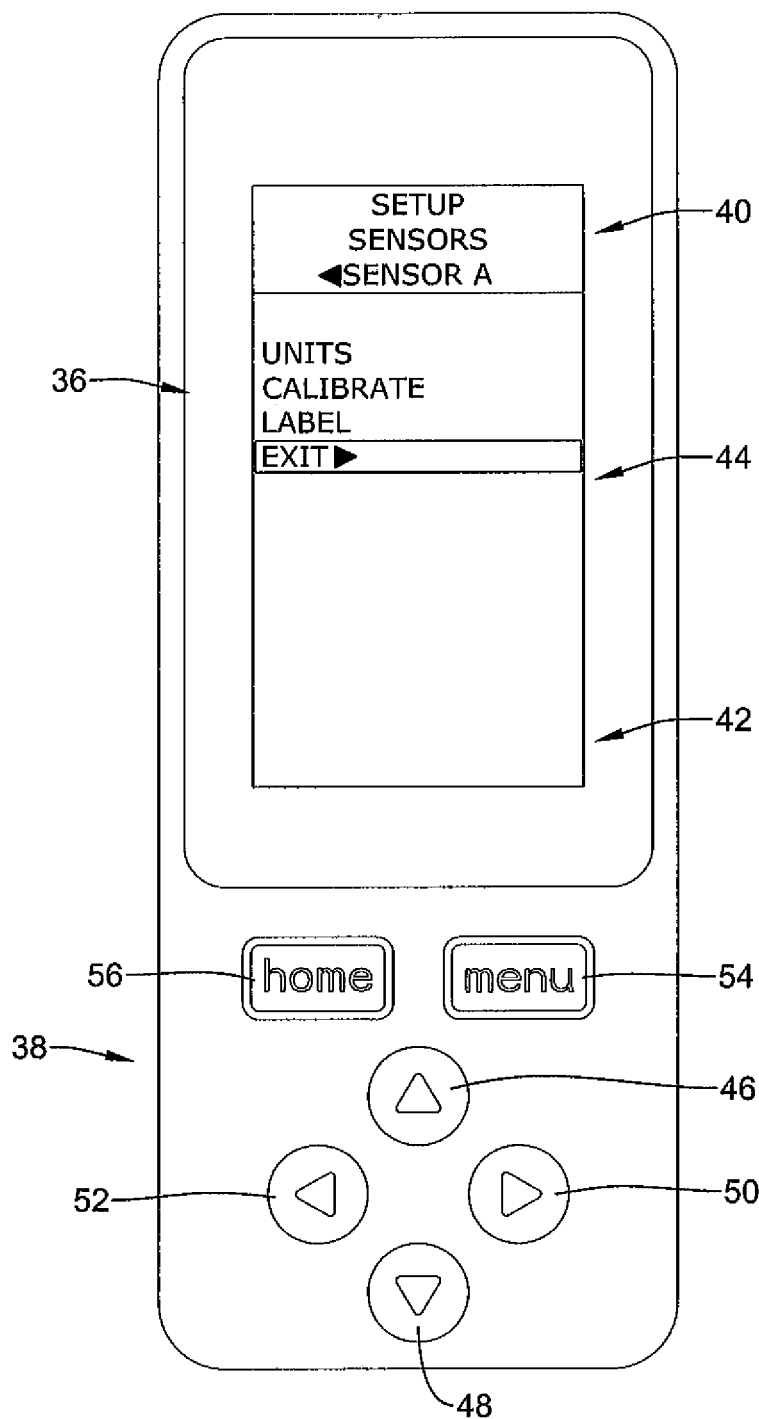

In FIG. 19, the user has returned to the menu screen shown in FIG. 15, as demonstrated by the SENSOR A breadcrumb displayed within upper portion 40 of display 36. In this case, the user has toggled or scrolled down to EXIT, which can be selected, as indicated by the right-facing arrow displayed next to the EXIT option, by pressing next button 50.

Figure 20:
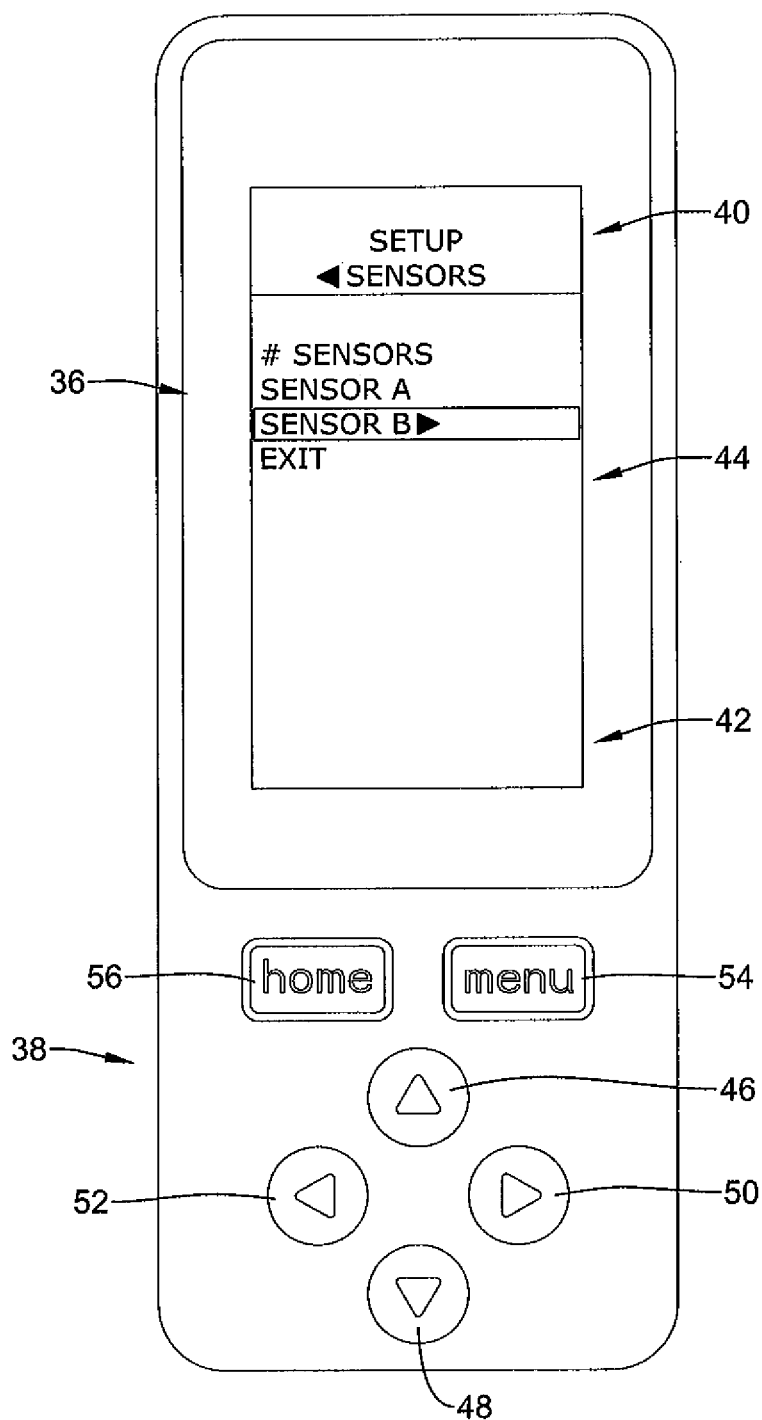
Figure 21:
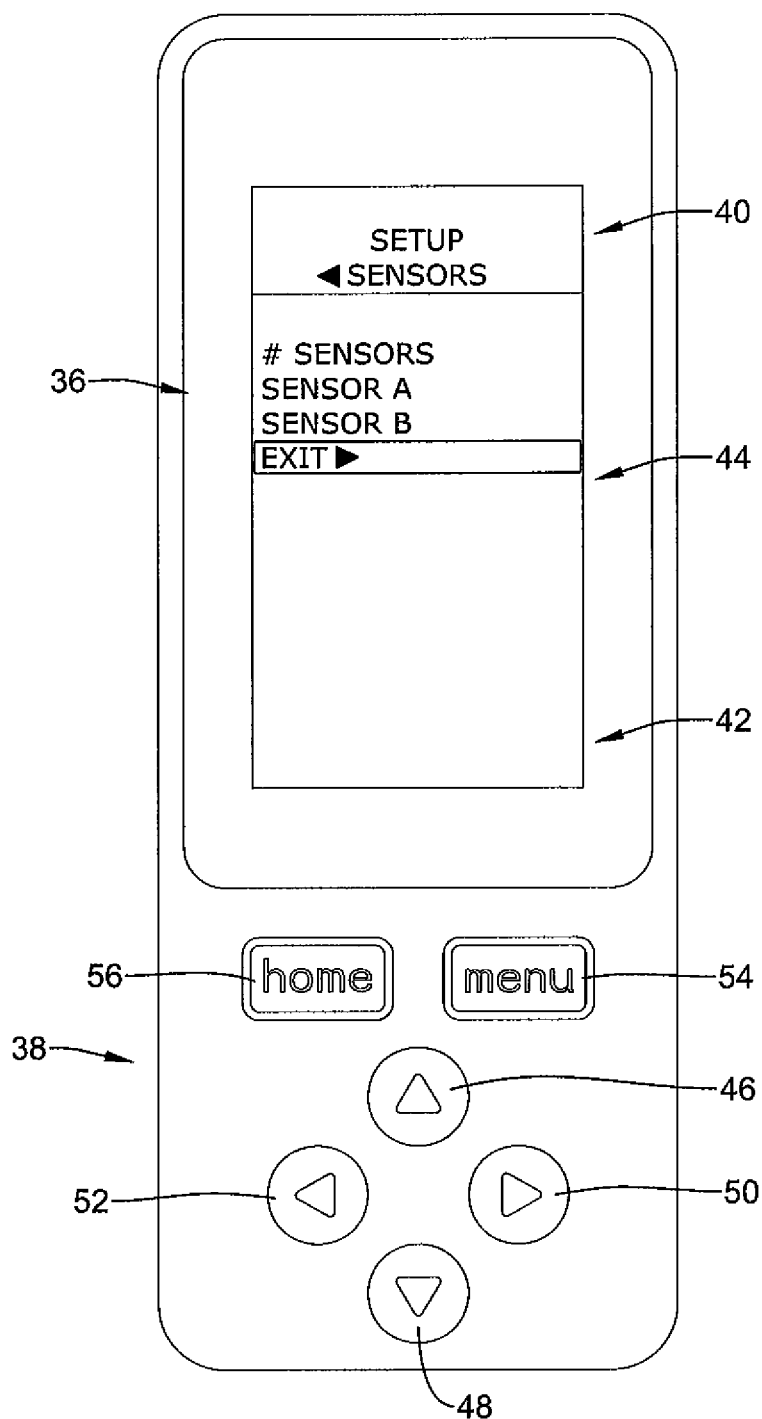

In FIG. 20, the user has returned to the menu screen shown in FIG. 12, as demonstrated by the SENSORS breadcrumb displayed within upper portion 40 of display 36. In this case, the user has toggled or scrolled down to the SENSOR B option, which can be selected by pressing next button 50, as indicated by the right-facing arrow displayed next to the SENSOR B option. The user may then, if desired, move through a variety of menu screens to set various options and parameters for sensor B, similar to that illustrated above for sensor A. In FIG. 21, the user has toggled or scrolled down to the EXIT option, which can be selected by pressing next button 50, as indicated by the right-facing arrow displayed next to EXIT.

Figure 22:
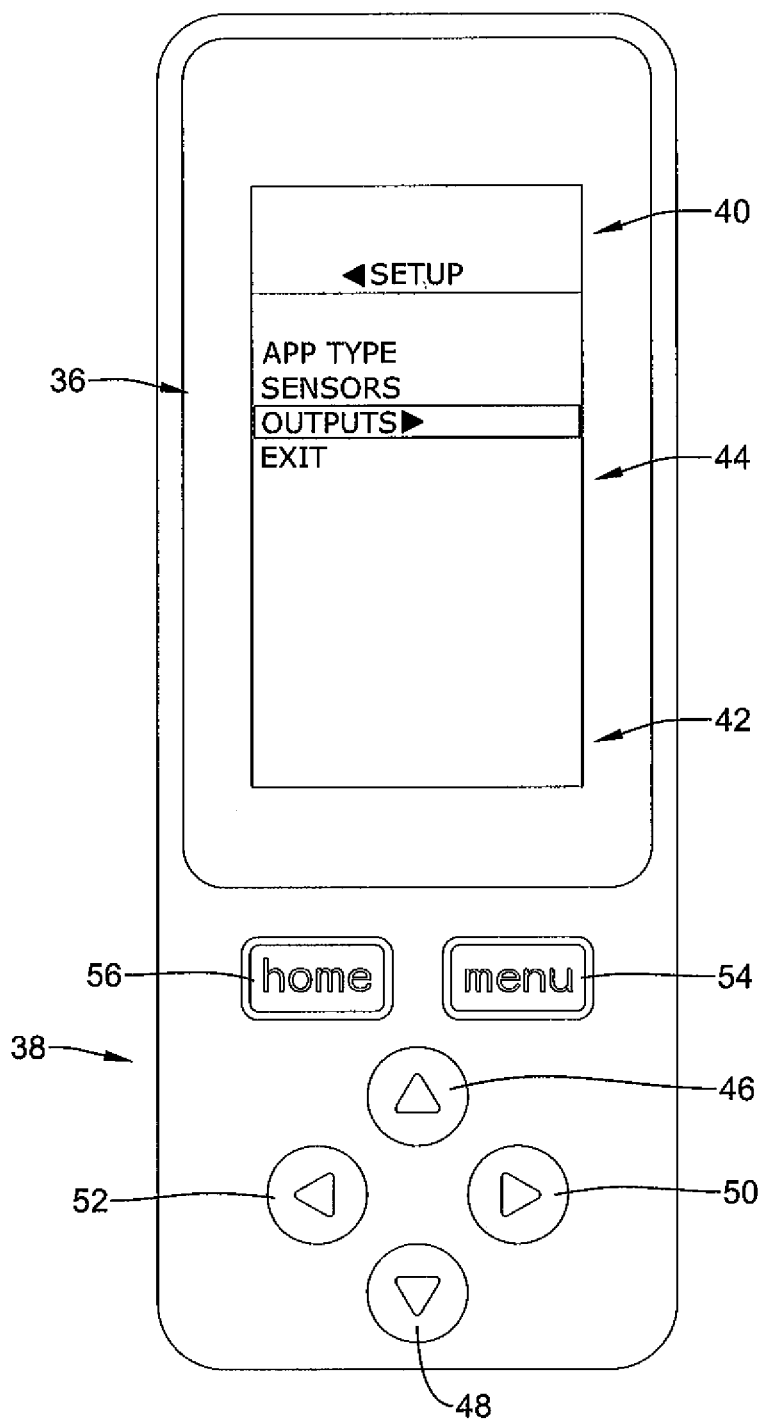

In FIG. 22, the user has returned to the menu screen shown in FIG. 9, as demonstrated by the SETUP breadcrumb displayed within upper portion 40 of display 36. In this case, the user has toggled or scrolled down to the OUTPUTS option, which, as evidenced by the right-facing arrow displayed next to the OUTPUTS option, may be selected by pressing next button 50.

Figure 23:
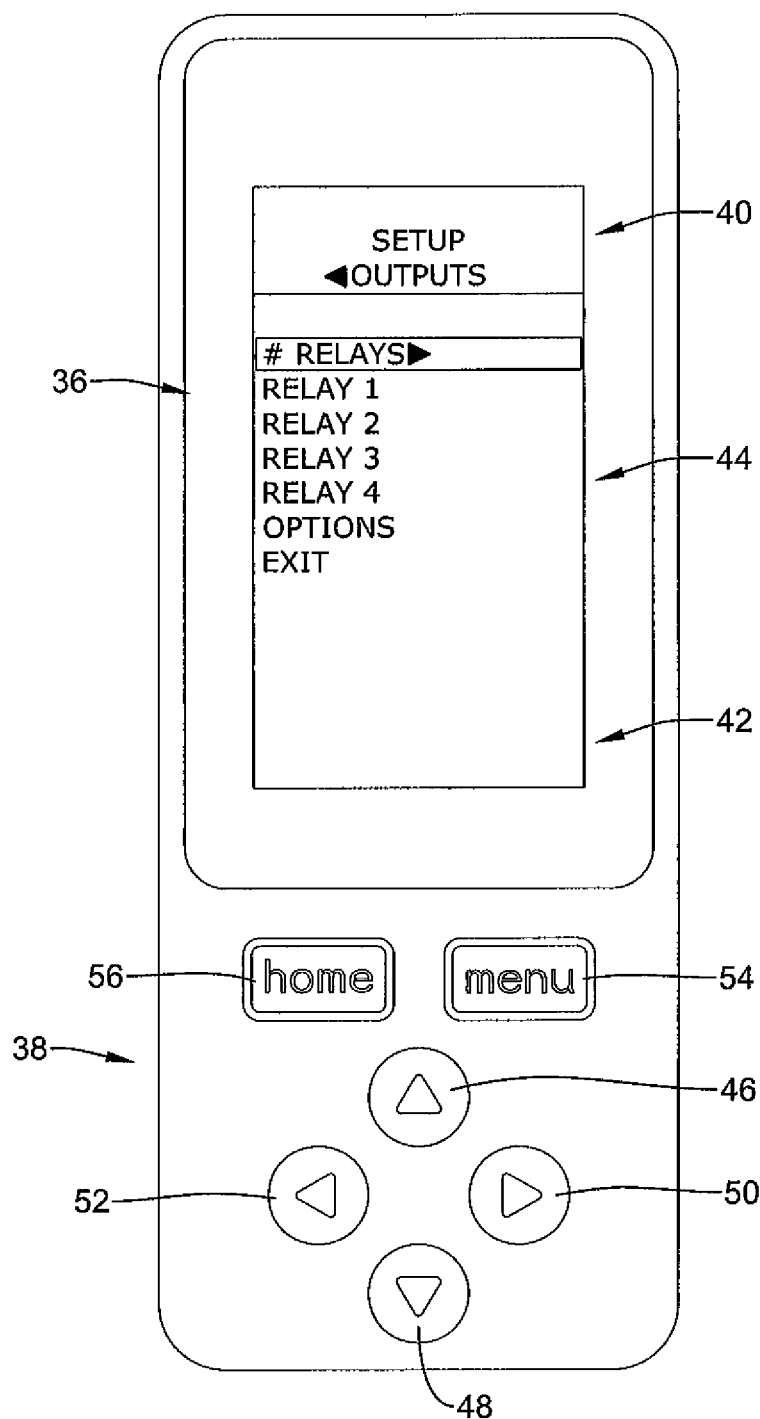

Moving to FIG. 23, it can be seen that a user has selected the OUTPUTS option in FIG. 22, as indicated by the OUTPUTS breadcrumb displayed within upper portion 40 of display 36. The left-facing arrow displayed next to the OUTPUTS breadcrumb indicates that the user may return to the previous SETUP screen by pressing back button 52. In this particular menu screen, a user may choose between specifying a number of relays or specifying information regarding a particular relay. It can be seen that the user has highlighted the # RELAYS option by using up button 46 and/or down button 48, as necessary.

Figure 24:
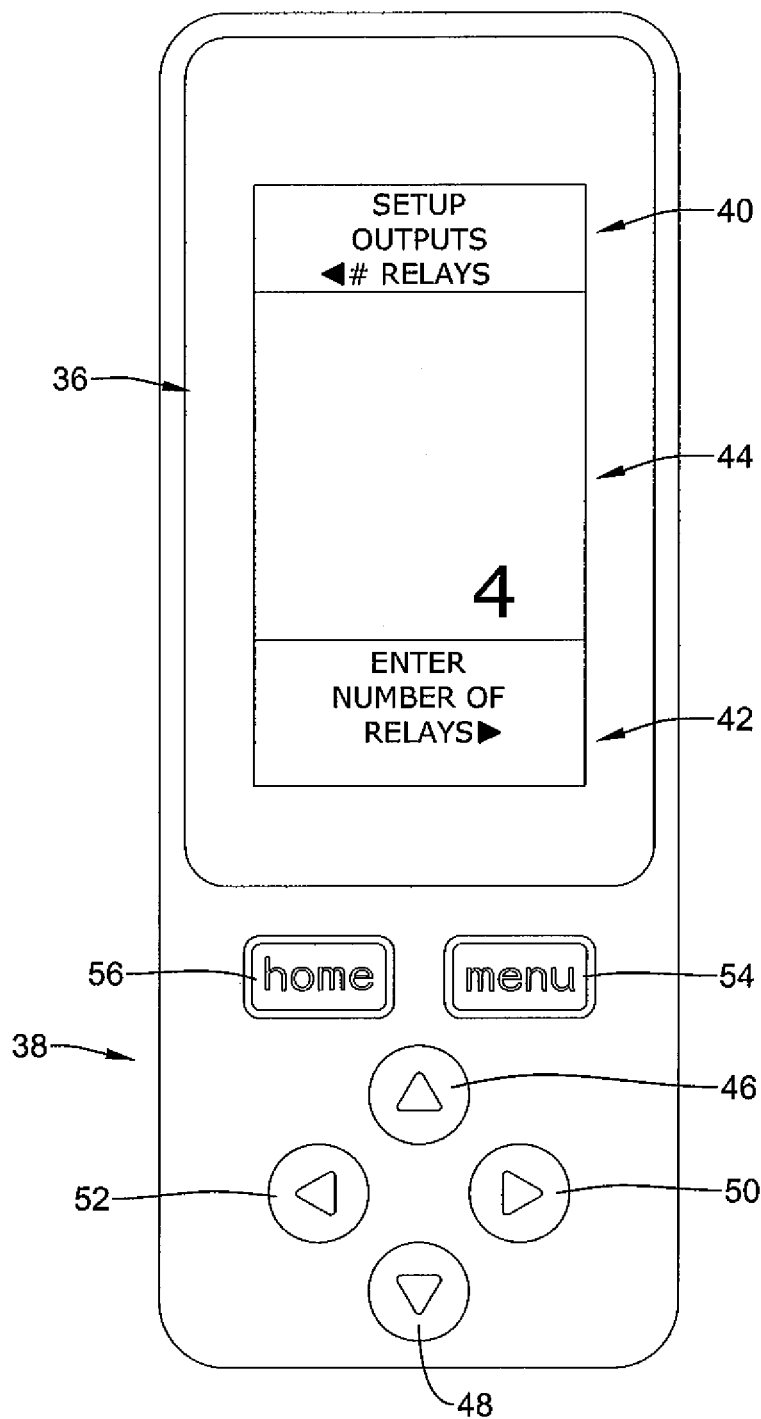

In FIG. 24, a # RELAYS breadcrumb and accompanying left-facing arrow has been displayed within upper portion 40 of display 36, confirming that the user had (with reference to FIG. 23) selected the # RELAYS option by pressing next button 50. A number "4" is displayed within intermediate portion 44 of display 36, and instructional information is displayed within lower portion 42 of display 36. The instructional information asks the user to enter the number of desired relays. In some cases, the user may increment the number of relays up or down using up button 46 and/or down button 48.

Figure 25:
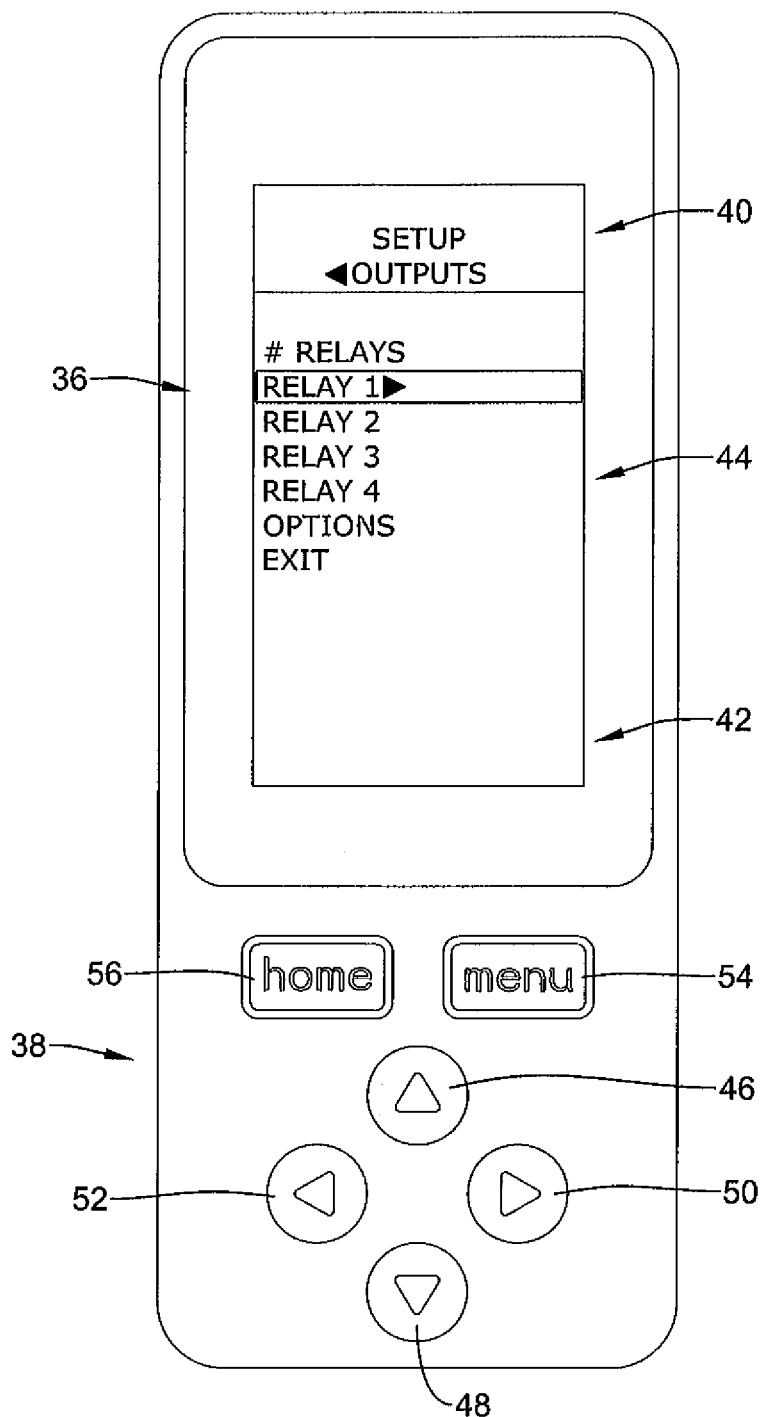
Figure 26:
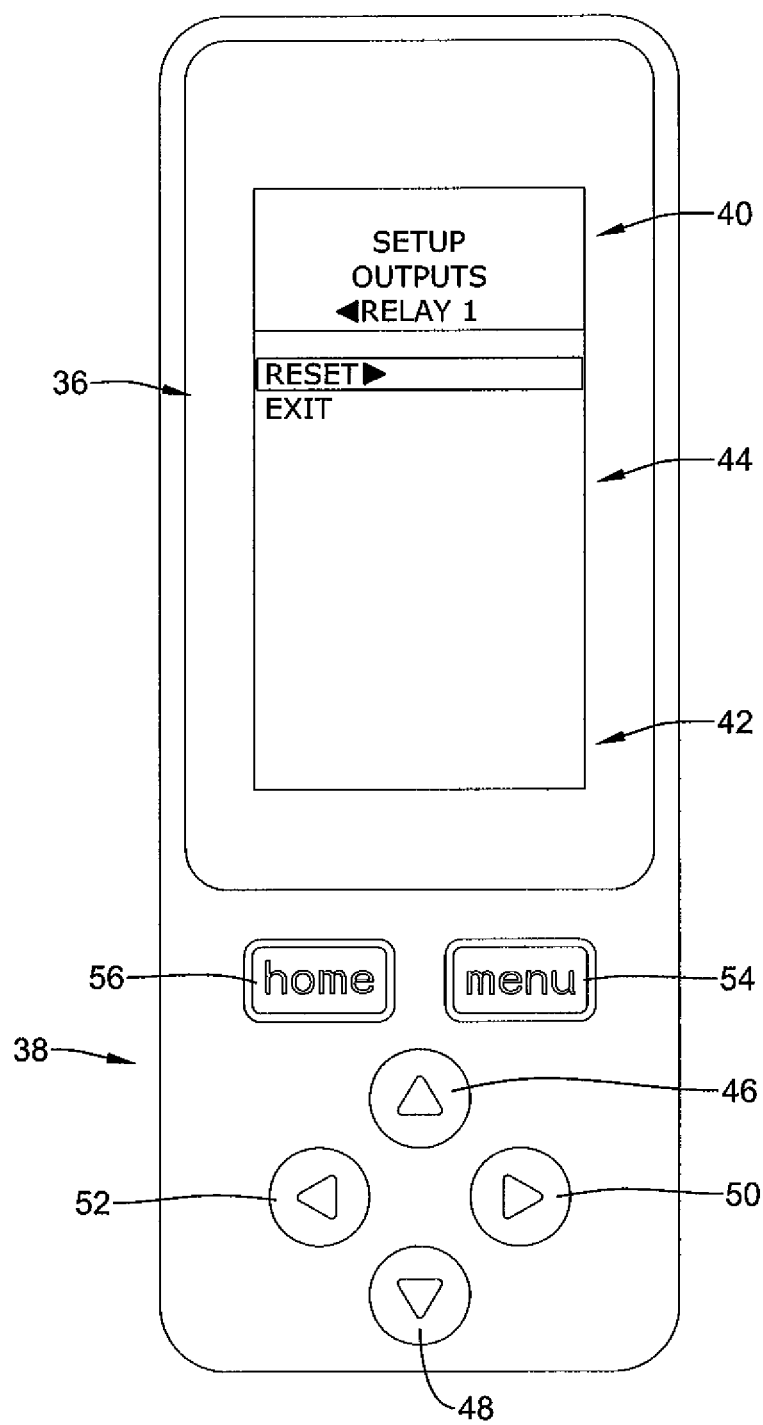
Figure 27:
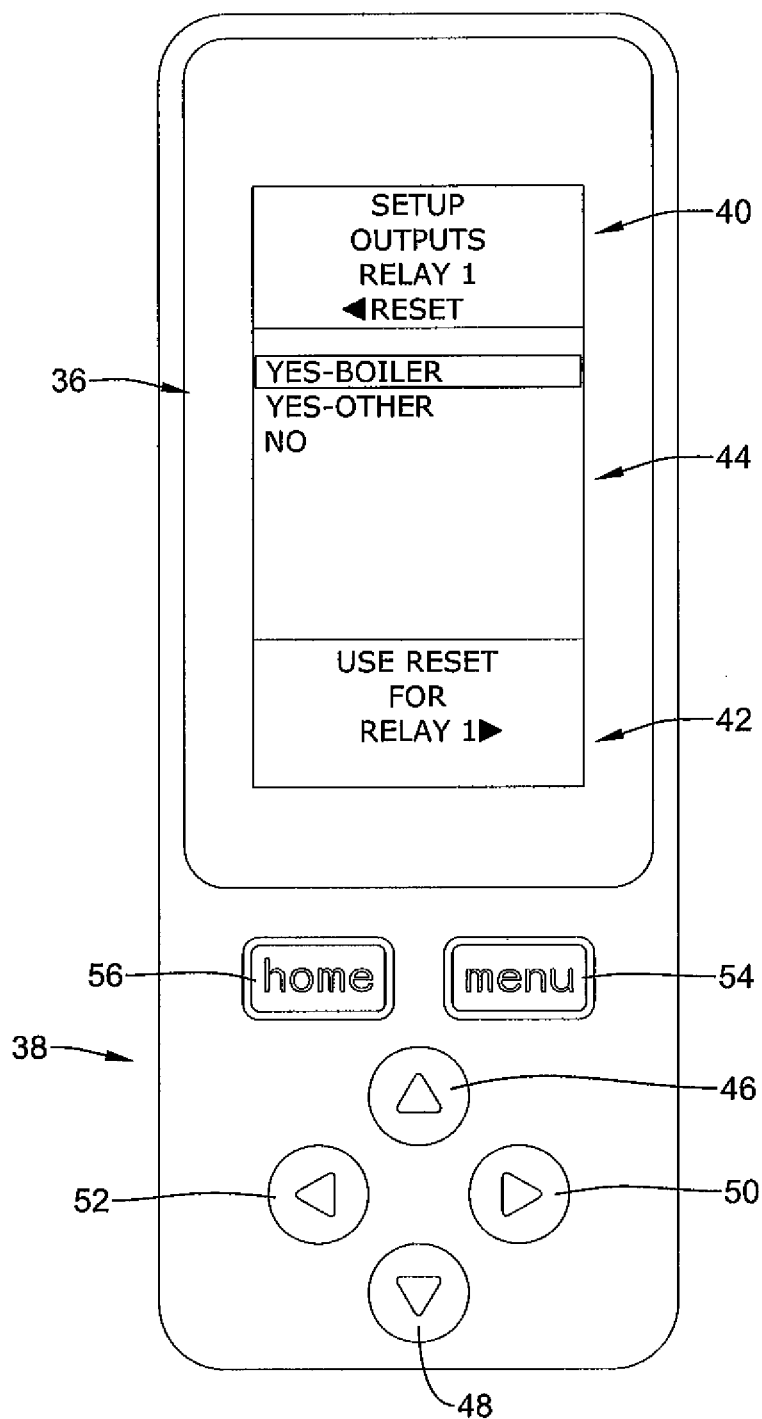

Once the number of relays has been entered, a user may return to the sensor setup page (as shown in FIG. 23) by pressing back button 52 (i.e. not saving the entered value) or pressing the next button 50 (saving the entered value). In FIG. 25, it can be seen that the user has toggled or scrolled down to RELAY 1 in the menu screen of FIG. 23. Moving to FIG. 26, the RELAY 1 breadcrumb displayed within upper portion 40 of display 36 confirms that the user selected the RELAY 1 option in FIG. 23. In the menu screen shown in FIG. 26, the user is able to choose between a RESET and an EXIT option by toggling or scrolling via up button 46 and/or down button 48. In FIG. 27, it can be seen that the user selected the RESET option by pressing next button 50, as evidenced by the RESET breadcrumb displayed within upper portion 40 of display 36. Intermediate portion 44 of display 36 provides selection options, while lower portion 42 of display 36 provides instructional information.

Figure 28:
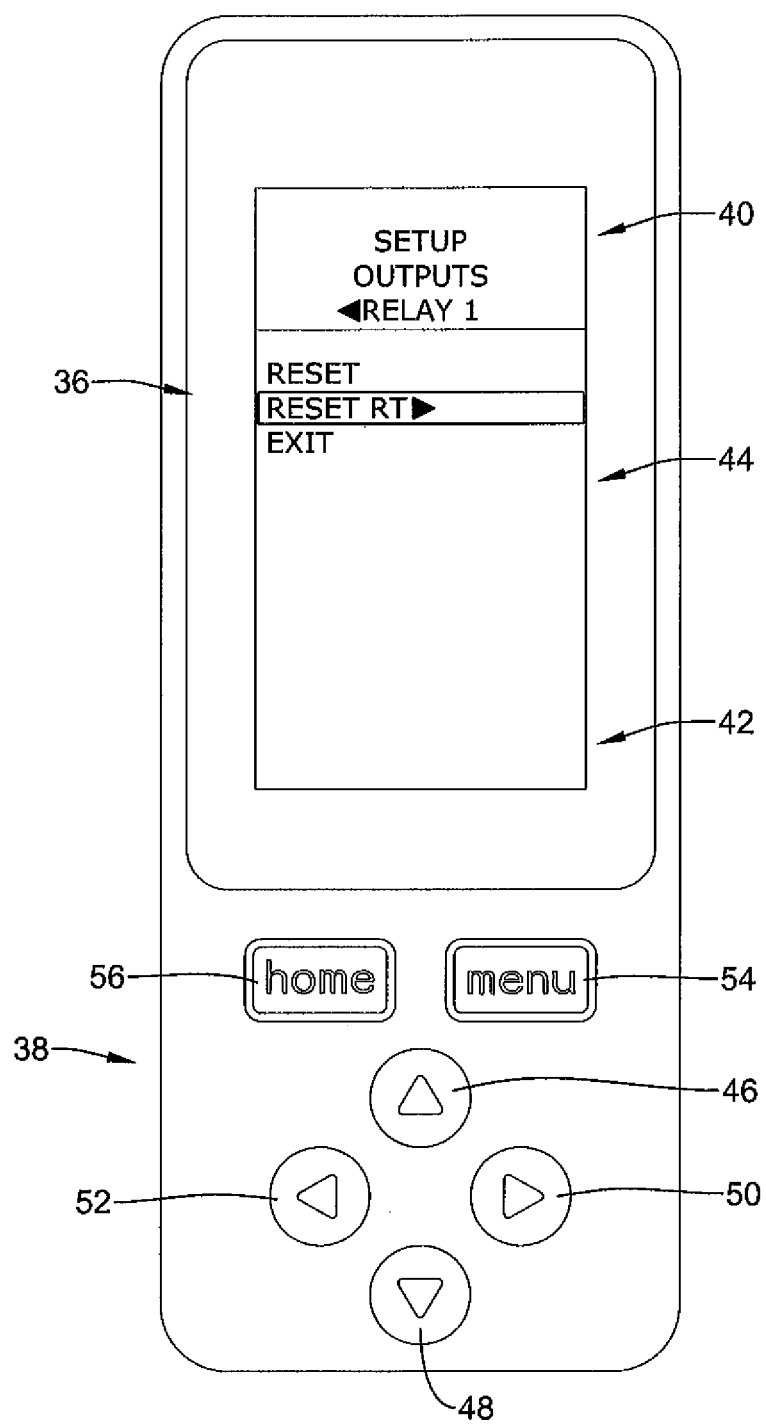

In some cases, the options displayed at a particular menu screen may depend on other equipment options, installations and the like. For example, FIG. 28 shows a menu screen similar to FIG. 26, as evidenced by the RELAY 1 breadcrumb displayed within upper portion 40 of display 36. However, the options provided within intermediate portion 44 of display 36 are different. In this case, the user is able to choose between RESET, RESET RT and EXIT. As evidenced by the right-facing arrow displayed next to RESET RT, the user is in the process of selecting RESET RT.

Figure 29:
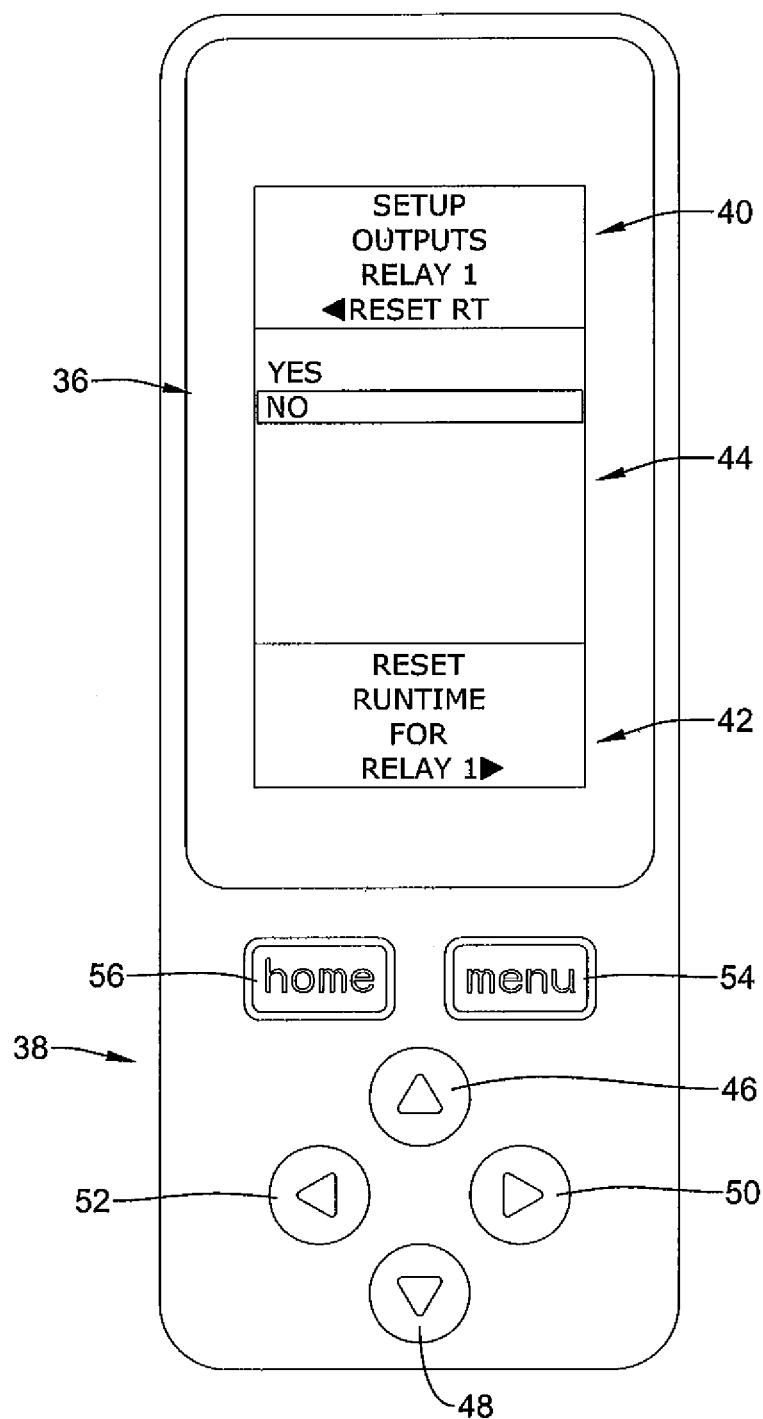

Moving to FIG. 29, the RESET RT breadcrumb displayed within upper portion 40 of display 36 confirms that the user selected the RESET RT option. Intermediate portion 44 of display 36 displays available selection options, which in this case, are limited to YES and NO. Lower portion 42 of display 36 provides the user with instructional information, which in this particular menu screen, instructs the user that they are to choose whether or not to reset the runtime counter or value for RELAY 1.

Figure 30:
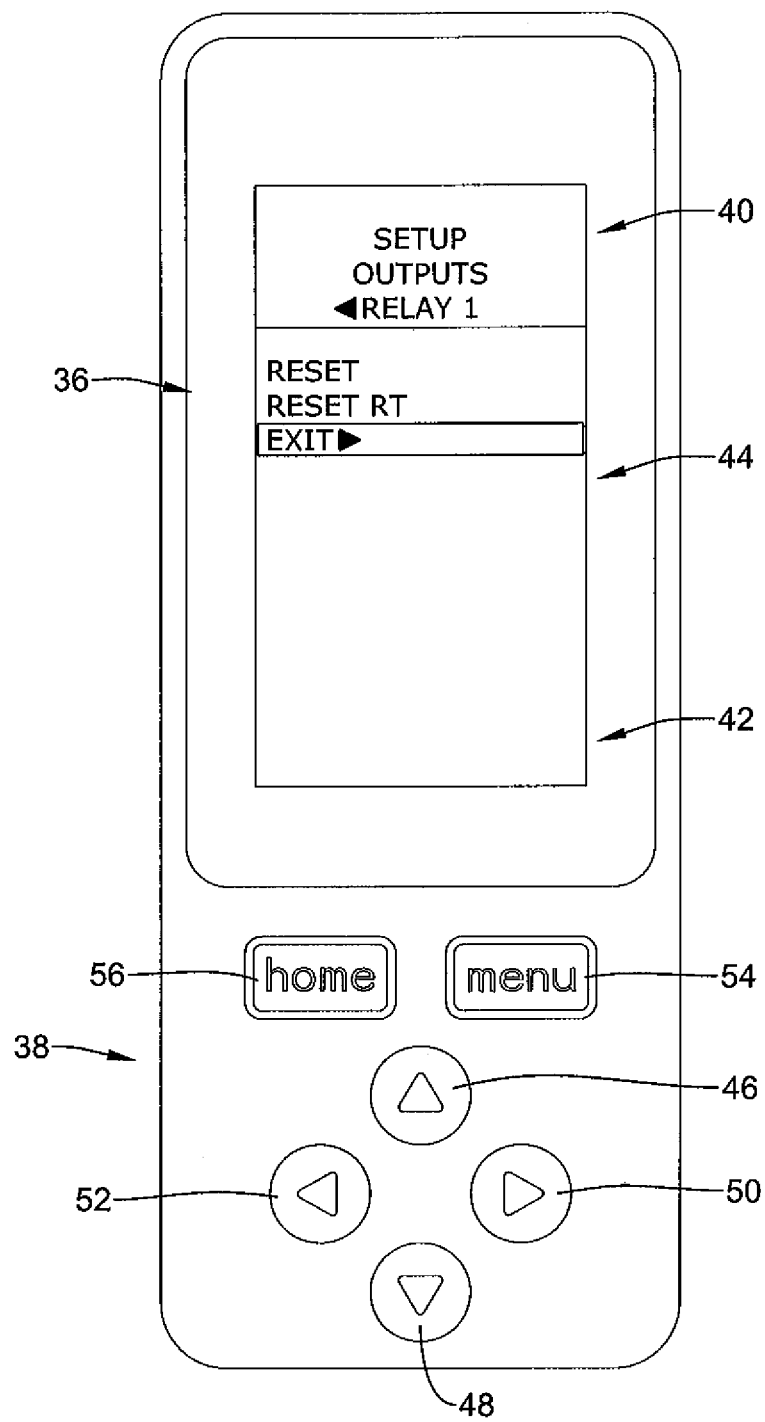

In FIG. 30, the user has returned to the menu screen shown in FIG. 28, as demonstrated by the RELAY 1 breadcrumb displayed within upper portion 40 of display 36. In this case, the user has toggled or scrolled down to the EXIT option, which, as evidenced by the right-facing arrow displayed next to the EXIT option, may be selected by pressing next button 50.

Figure 31:
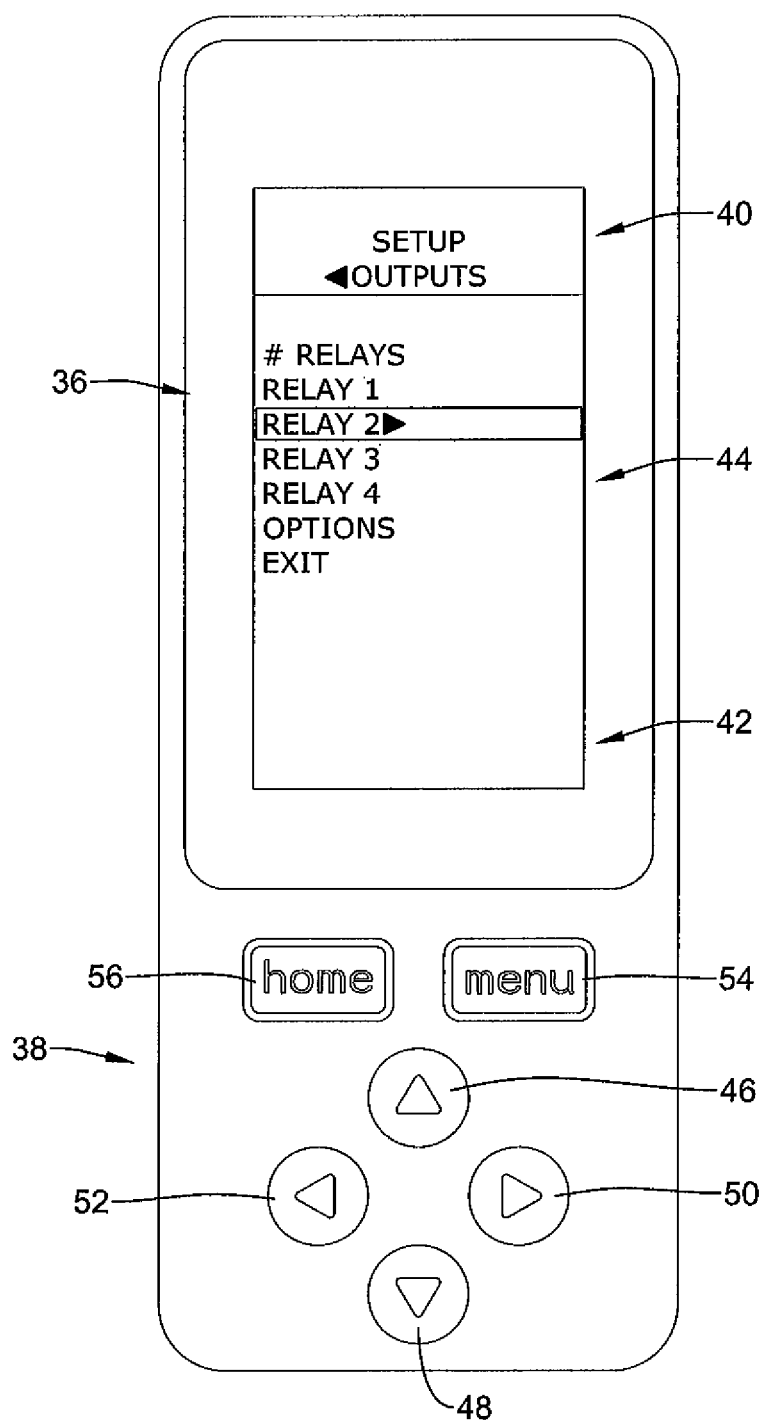

In FIG. 31, the user has returned to the menu screen shown in FIG. 25, as demonstrated by the OUTPUTS breadcrumb displayed within upper portion 40 of display 36. In this case, the user has toggled or scrolled down to the RELAY 2 option, which, as evidenced by the right-facing arrow displayed next to the RELAY 2 option, may be selected by pressing next button 50. The user may then, if desired, move through a variety of menu screens to set various options and/or parameters for RELAY 2, similar to that illustrated above for RELAY 1.

Figure 32:
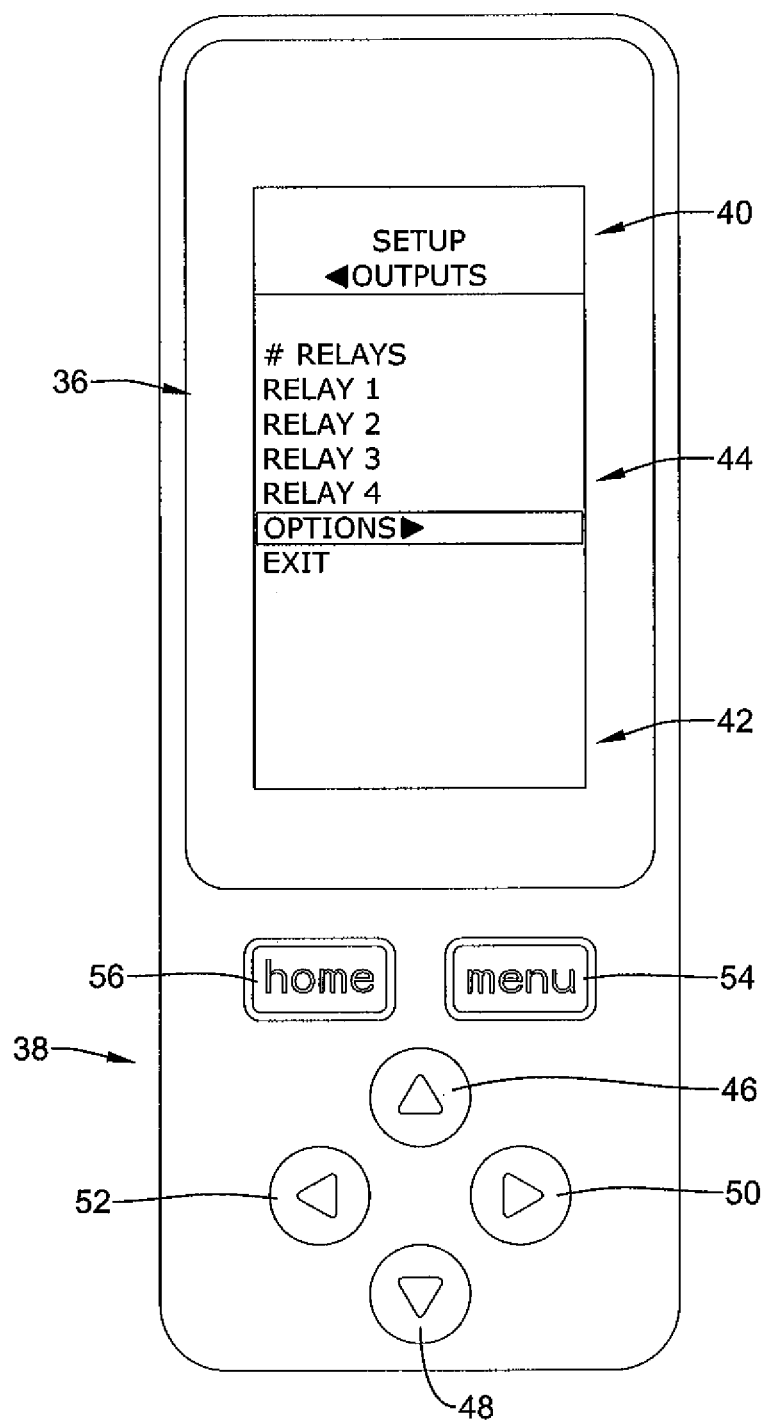

Moving to FIG. 32, the user has returned to the menu screen shown in FIG. 31, as demonstrated by the OUTPUTS breadcrumb displayed within upper portion 40 of display 36. In this case, the user has toggled or scrolled down to OPTIONS, which, as evidenced by the right-facing arrow displayed next to OPTIONS, may be selected by pressing next button 50.

Figure 33:
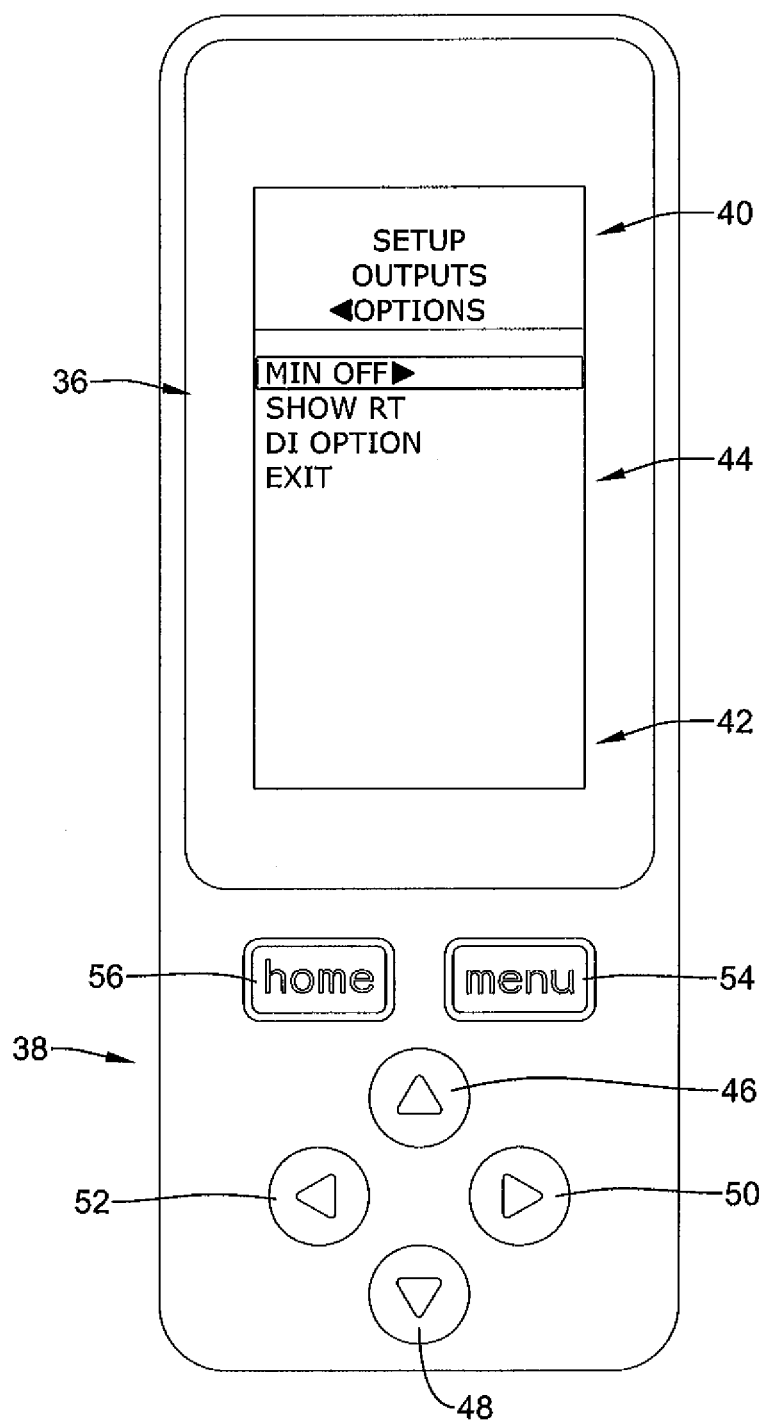

In FIG. 33, the OPTIONS breadcrumb displayed within upper portion 40 of display 36 confirms that the user selected OPTIONS. Controller 18 (FIG. 1) provides, within intermediate portion 44 of display 36, a list of available options. As illustrated, the user is choosing to configure the minimum off time for the relays.

Figure 34:
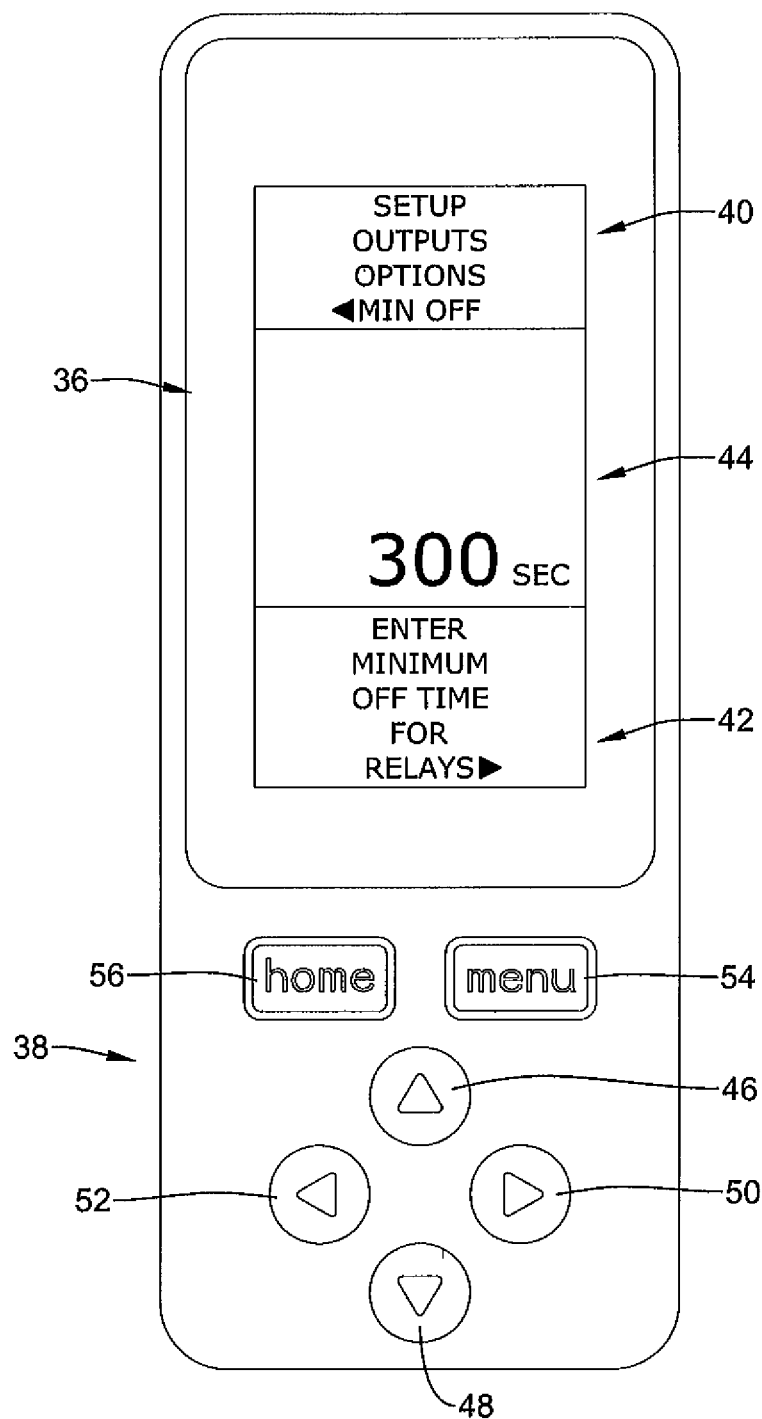

Moving to FIG. 34, the MIN OFF breadcrumb provided within upper portion 40 of display 36 confirms that the user selected the MIN OFF option in FIG. 33. Intermediate portion 44 of display 36 displays a value that can be increased or decreased using up button 46 and/or down button 48, as appropriate while lower portion 42 of display 36 provides instructional information asking the user to enter a minimum off time for the relays. Once the user has adjusted the value appropriate, it can be entered by pressing next button 50.

Figure 35:
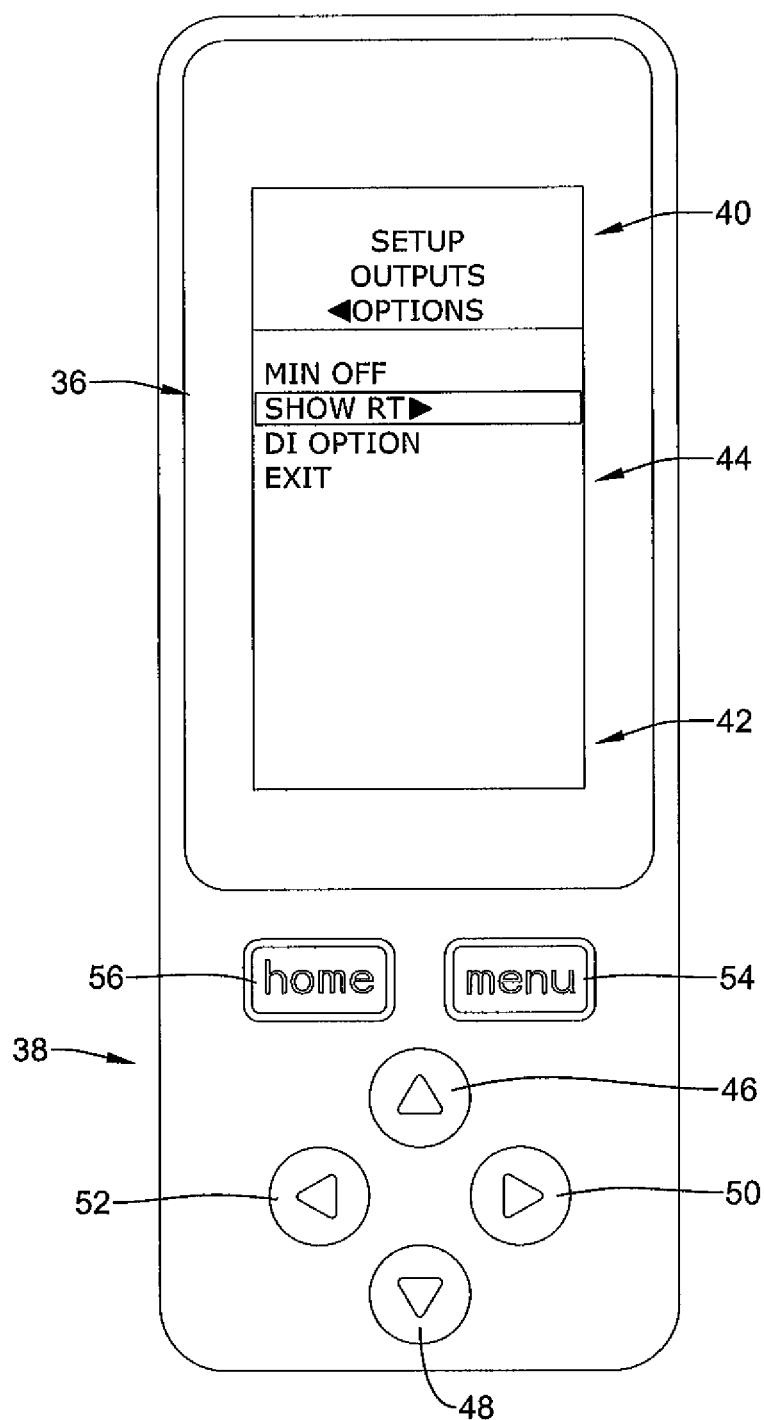

Moving to FIG. 35, the user has returned to the menu screen shown in FIG. 33, as demonstrated by the OPTIONS breadcrumb displayed within upper portion 40 of display 36. In this case, the user has toggled or scrolled down to the SHOW RT option, which, as evidenced by the right-facing arrow displayed next to the SHOW RT option, may be selected by pressing next button 50.

Figure 36:
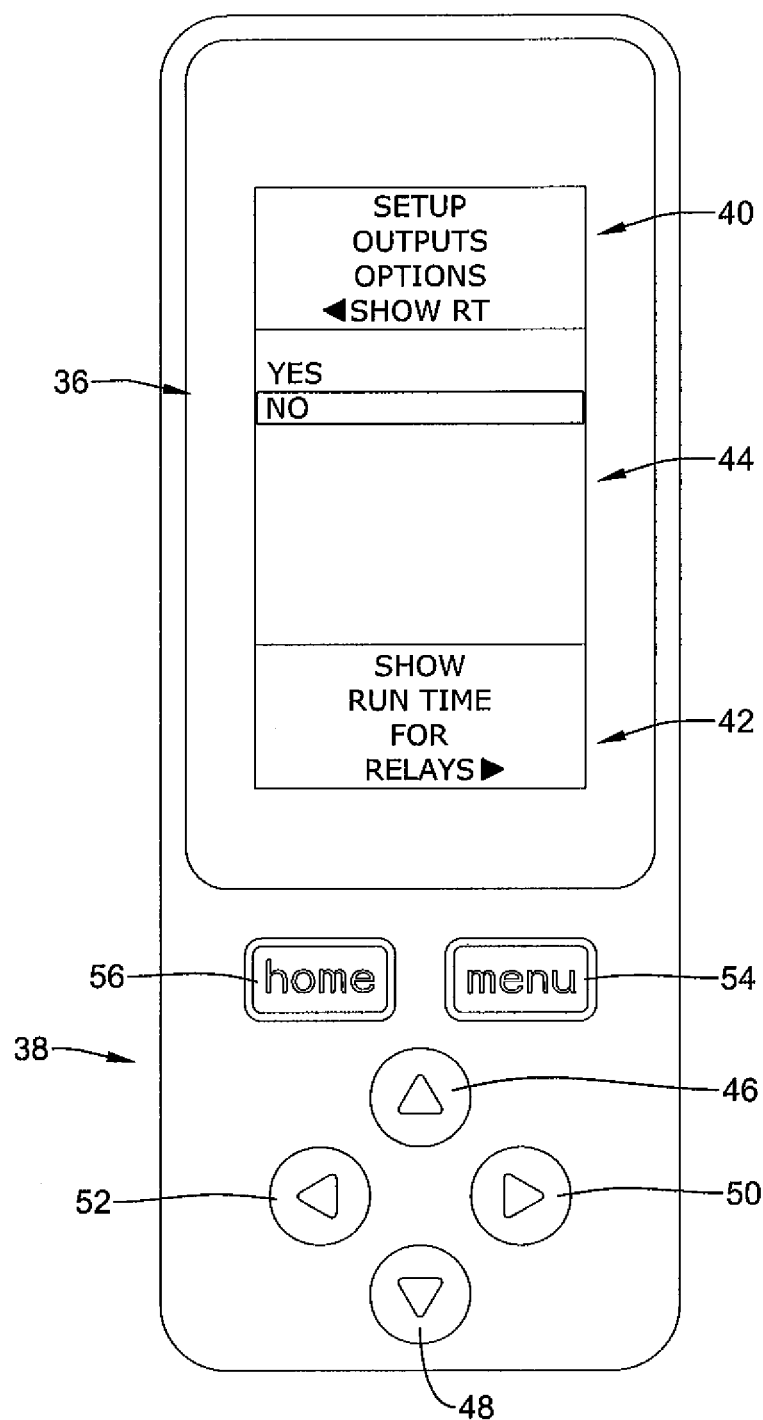

In FIG. 36, the SHOW RT breadcrumb displayed within upper portion 40 of display 36 confirms that the user has selected the SHOW RT option. Controller 18 (FIG. 1) provides, within intermediate portion 44 of display 36, a list of available options. As illustrated, the user is choosing to specify whether or not to show the run time for the relays, as explained by the instructional information displayed by controller 18 within lower portion 42 of display 36. The user can select NO, which is highlighted, by pressing next button 50. This is evidenced by the right-facing arrow displayed within lower portion 42 of display 36.

Figure 37:
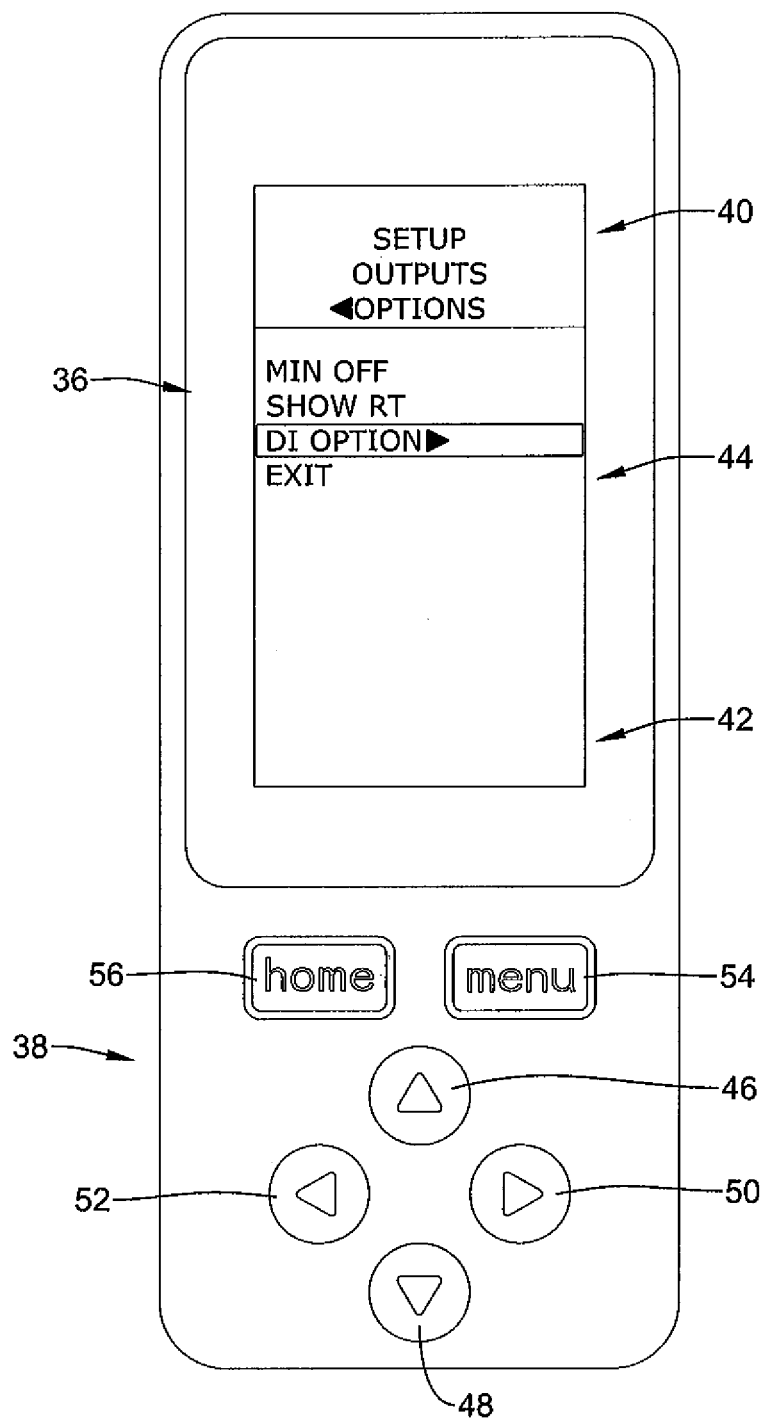

Moving to FIG. 37, the user has returned to the menu screen shown in FIG. 35, as demonstrated by the OPTIONS breadcrumb displayed within upper portion 40 of display 36. In this case, the user has toggled or scrolled down to DI OPTION, which, as evidenced by the right-facing arrow displayed next to DI OPTION, may be selected by pressing next button 50.

Figure 38:
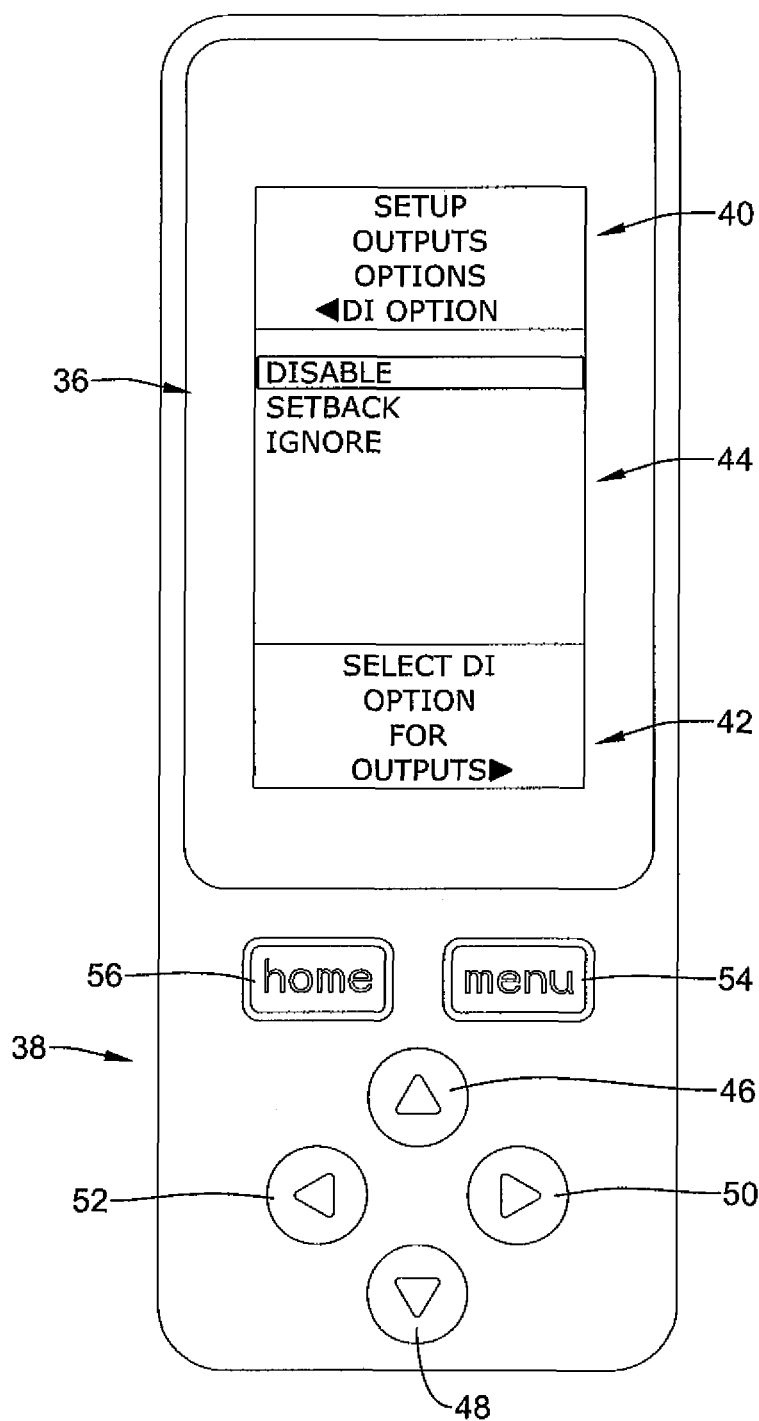

In FIG. 38, the DI OPTION breadcrumb displayed within upper portion 40 of display 36 confirms that the user selected DI OPTIONS. Controller 18 (FIG. 1) provides, within intermediate portion 44 of display 36, a list of available options. As illustrated, the user is asked to choose between DISABLE, SETBACK and IGNORE, as explained by the instructional information displayed by controller 18 within lower portion 42 of display 36. The user can select a desired option by toggling or scrolling through the displayed options using up button 46 and/or down button 48, as desired.

Figure 39:
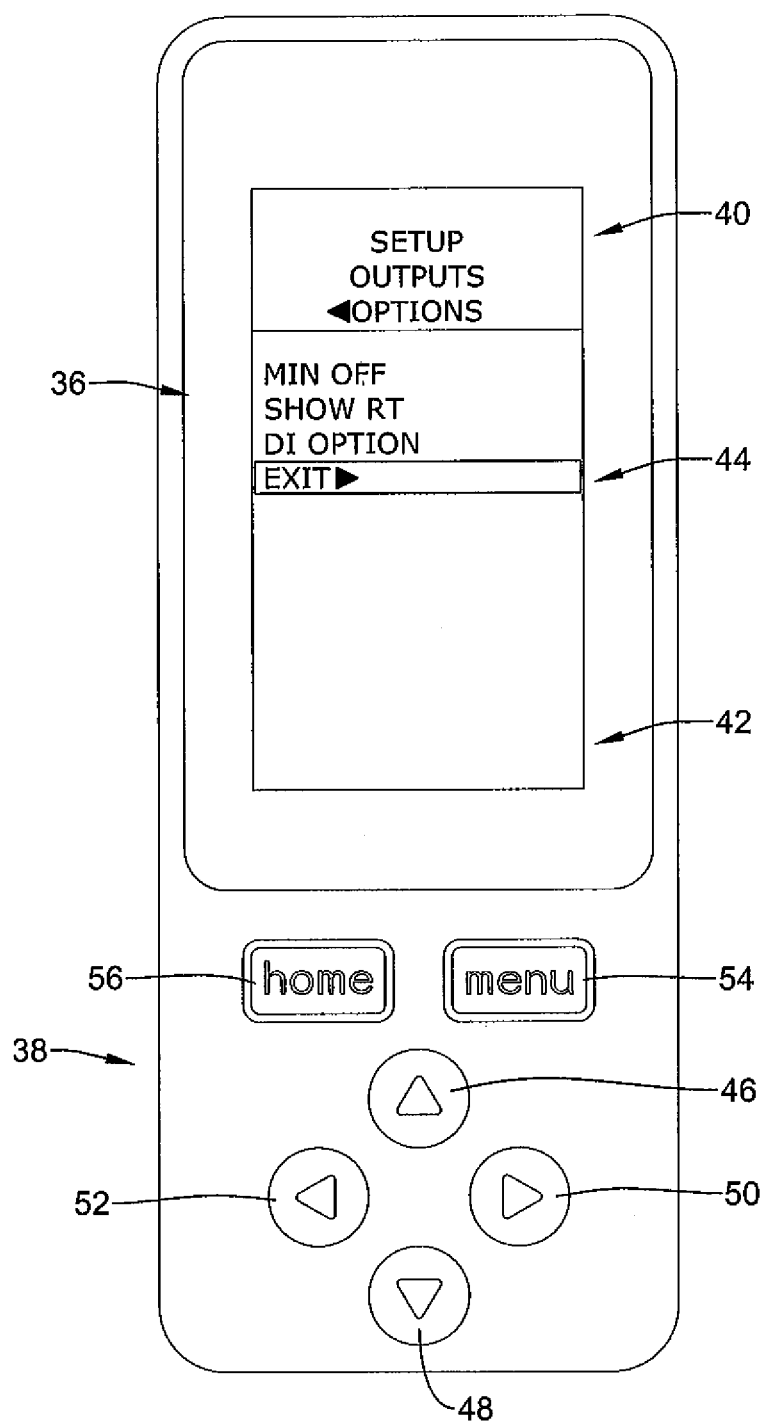

In FIG. 39, the user has returned to the menu screen shown in FIG. 35, as demonstrated by the OPTIONS breadcrumb displayed within upper portion 40 of display 36. In this case, the user has toggled or scrolled down to the EXIT option, which, as evidenced by the right-facing arrow displayed next to the EXIT option, may be selected by pressing next button 50.

Figure 40:
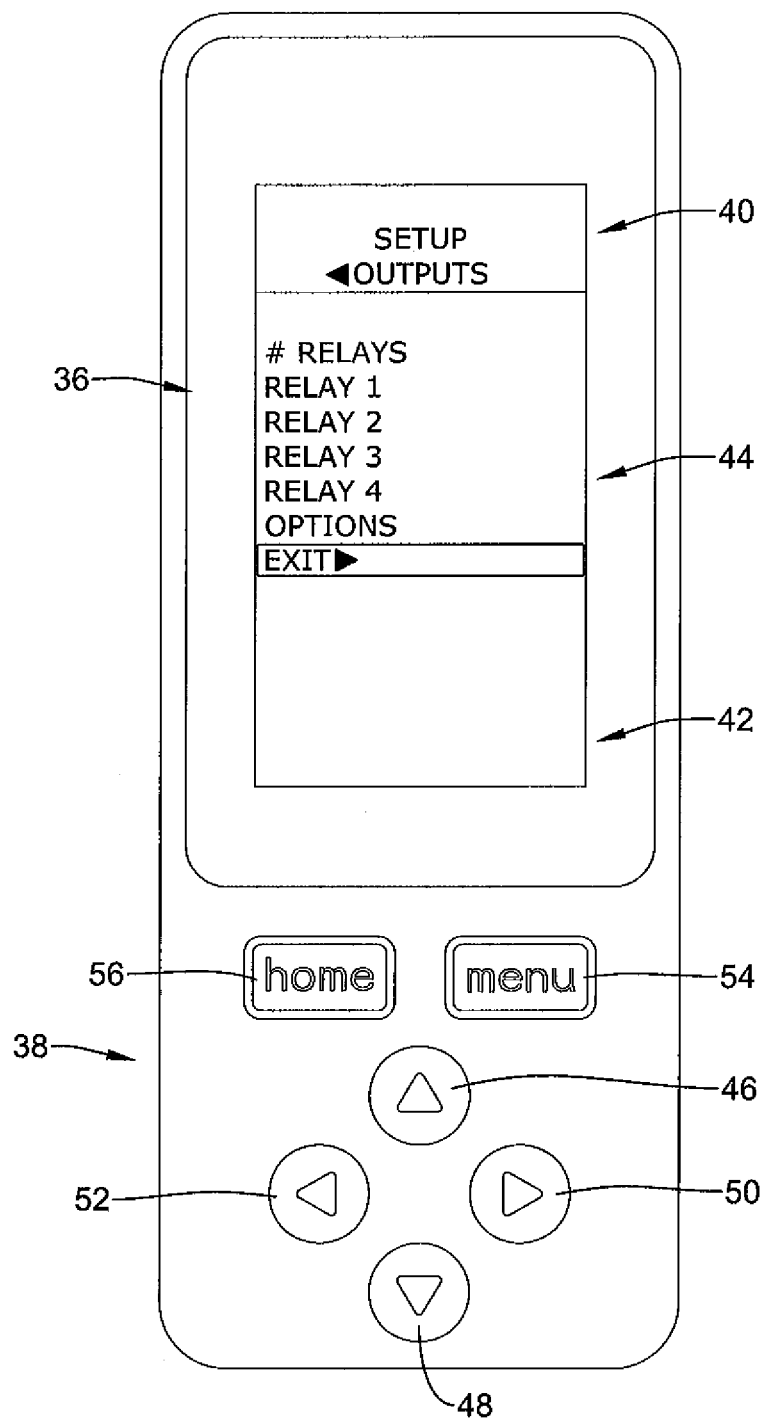

In FIG. 40, the user has returned to the menu screen shown in FIG. 32, as demonstrated by the OUTPUTS breadcrumb displayed within upper portion 40 of display 36. In this case, the user has toggled or scrolled down to the EXIT option, which, as evidenced by the right-facing arrow displayed next to the EXIT option, may be selected by pressing next button 50.

Figure 41:
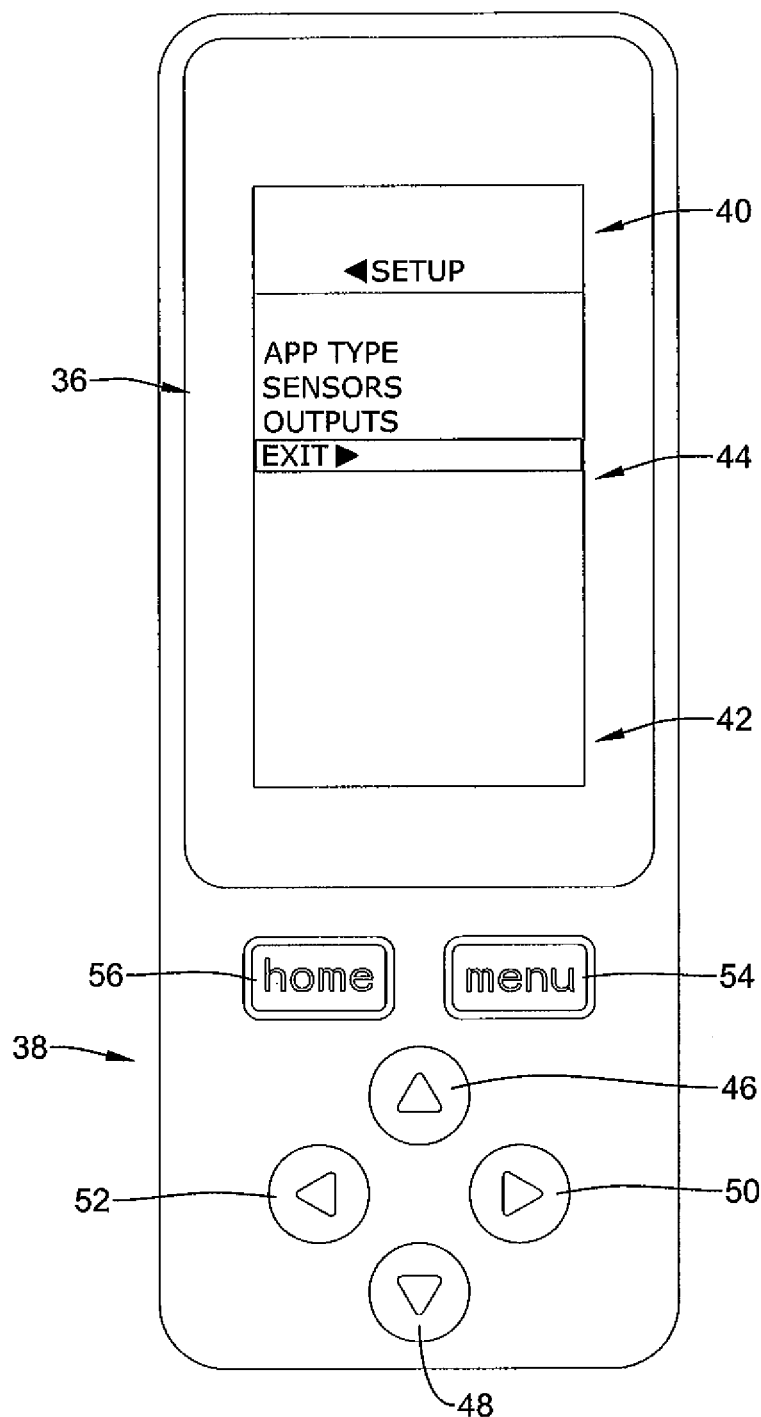

In FIG. 41, the user has returned to the menu screen shown in FIG. 9, as demonstrated by the SETUP breadcrumb displayed within upper portion 40 of display 36. In this case, the user has toggled or scrolled down to the EXIT option, which, as evidenced by the right-facing arrow displayed next to the EXIT option, may be selected by pressing next button 50.

Figure 42:
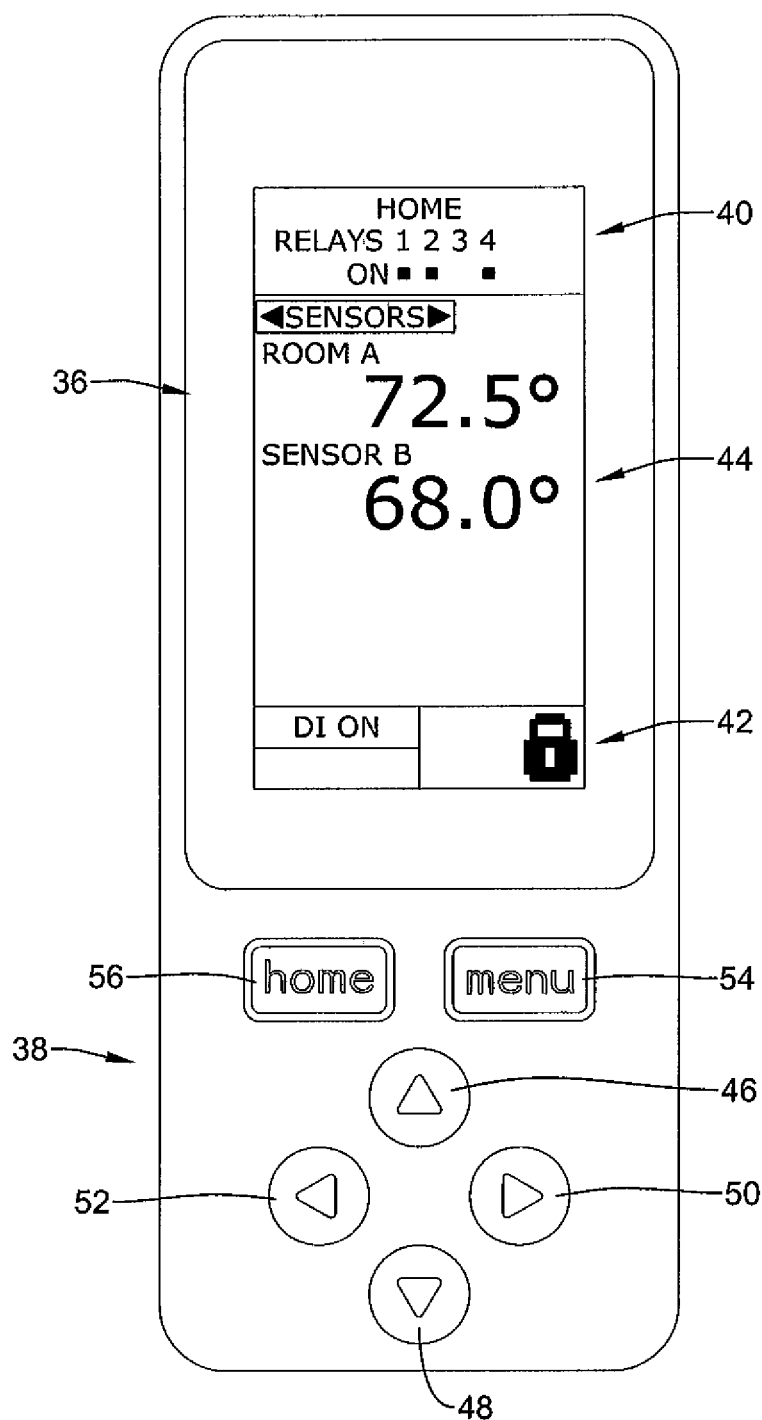

FIG. 42 illustrates a home page in which relays 1, 2 and 4 are on, and in which the user has toggled through home page options to reach a screen displaying sensor information. A sensor or other information source labeled ROOM A is returning a sensed value of 72.5° Fahrenheit, while SENSOR B is returning a sensed value of 68.0° Fahrenheit. In some cases, a sensor may retain a label such as SENSOR A, SENSOR B, and the like. Alternatively, a particular sensor may be labeled in accordance with its location, such as ROOM A, BOILER, and the like. Some example labels are shown in FIG. 18.

The previous Figures have provided illustrative but non-limiting examples of menu screens that may be encountered while engaged in setup of environmental control device 10 (FIG. 1). In some cases, environmental control device 10 may also accommodate a variety of menu or programming menu screens, as shown in the ensuing Figures.

Figure 43:
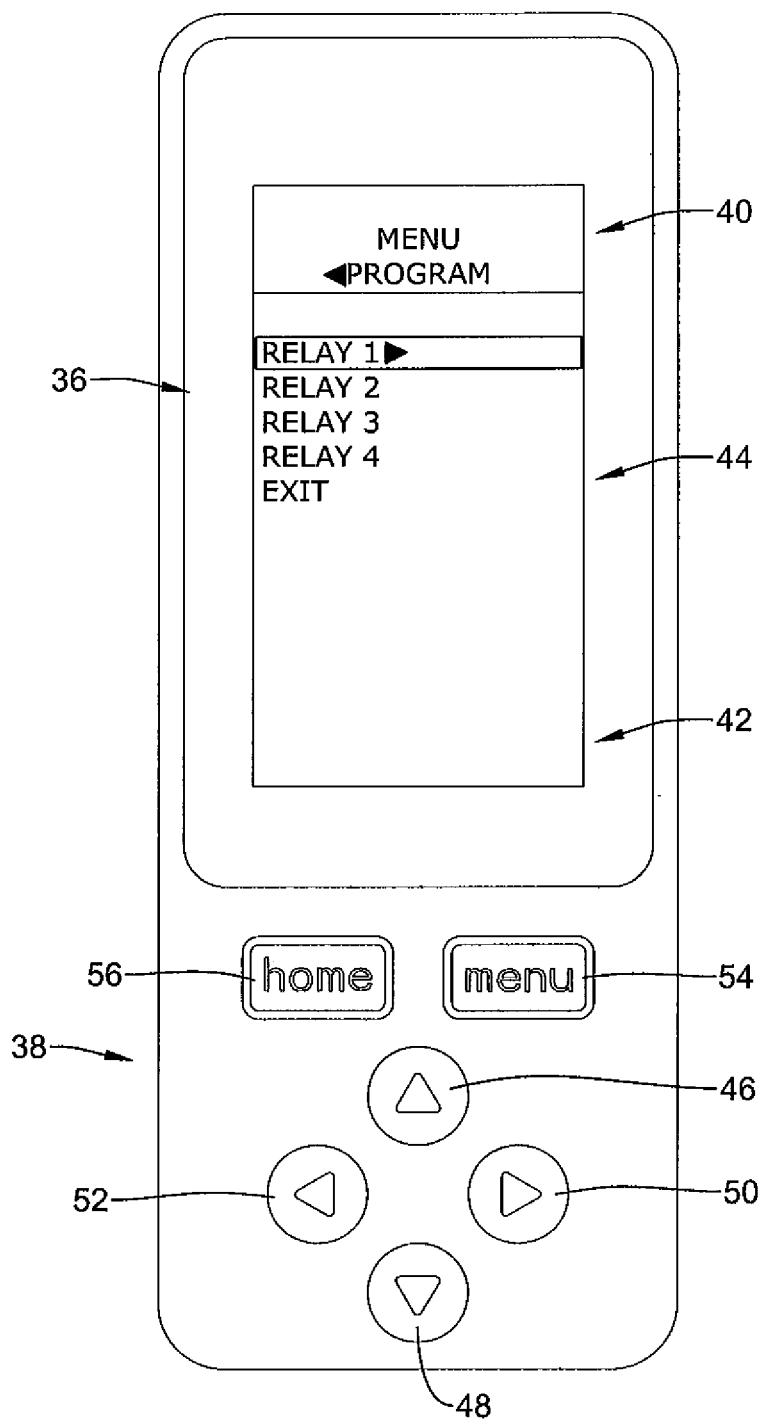

In FIG. 43, the MENU/PROGRAM breadcrumb information displayed within upper portion 40 of display 36 indicates that the user has selected a PROGRAM option from a menu level within the hierarchical menu structure. The left-facing arrow displayed next to the PROGRAM breadcrumb indicates that pressing back button 52 would permit the user to return to the MENU level. Intermediate portion 44 of display 36 provides the user with a list of available options. In this particular menu screen, the user is able to select from a list of relays.

Figure 44:
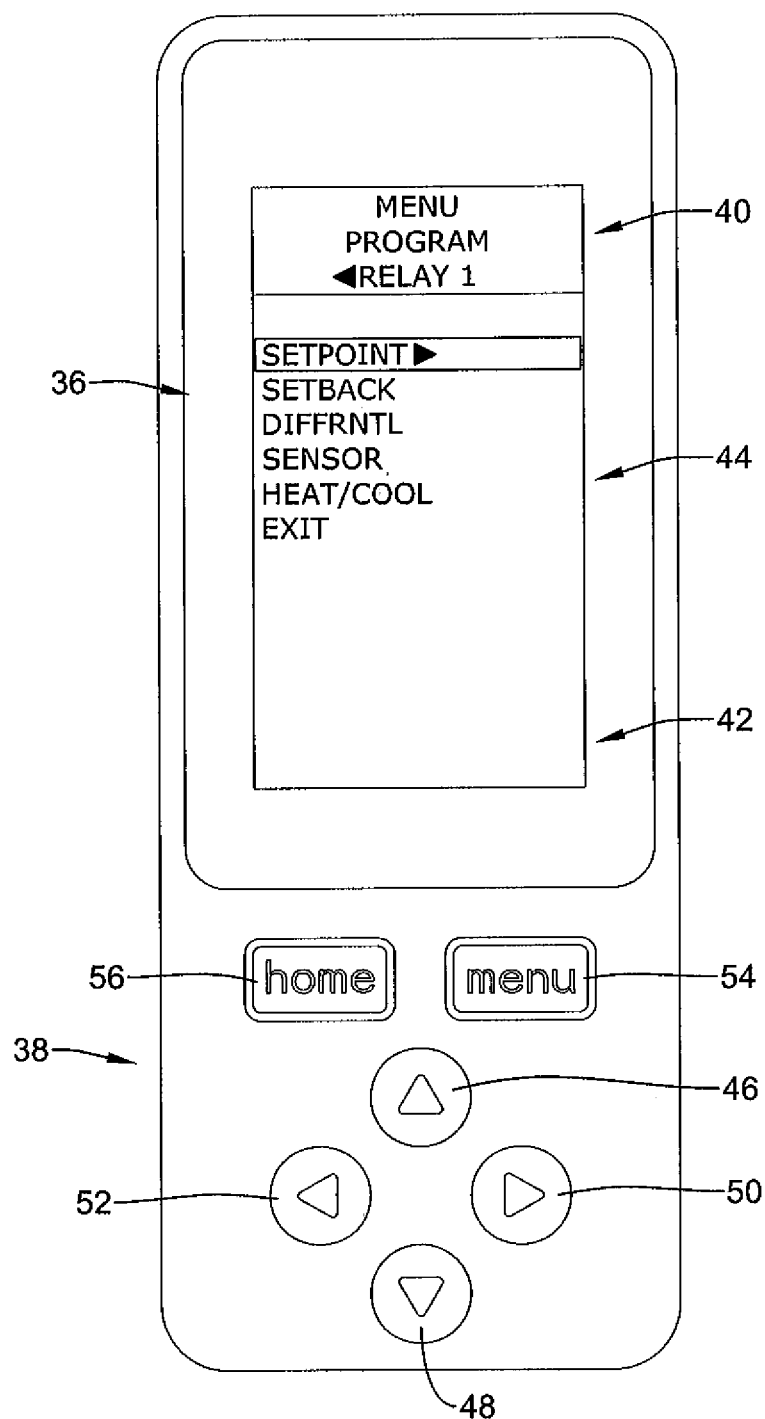
Figure 45:
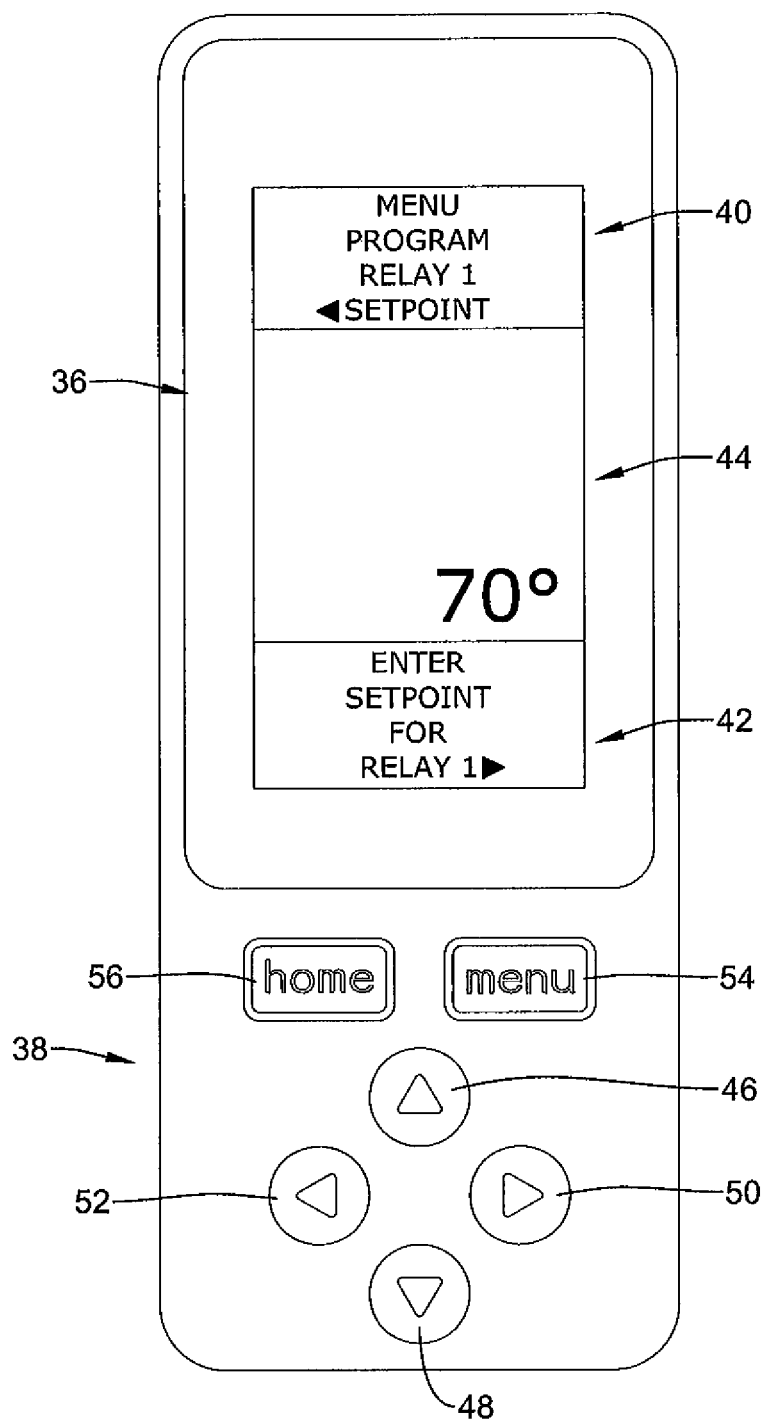

Moving to FIG. 44, the RELAY 1 breadcrumb displayed within upper portion 40 of display 36 confirms that the user selected RELAY 1 in FIG. 43. In FIG. 44, the user is provided with a list of options pertaining to relay 1. In FIG. 45, it can be see via the SETPOINT breadcrumb provided within upper portion 40 of display 36 that the user selected the SETPOINT option in FIG. 44. Controller 18 (FIG. 1) provides, via intermediate portion 44 of display 36, a setpoint value to adjust. Lower portion 42 of display 36 displays, courtesy of controller 18, instructional information asking the user to enter a setpoint value for relay 1. The setpoint value for relay 1 can be increased or decreased using up button 46 and/or down button 48, as appropriate. Pressing next button 50 will enter the value, as indicated by the right-facing arrow disposed next to the instructional information.

Figure 46:
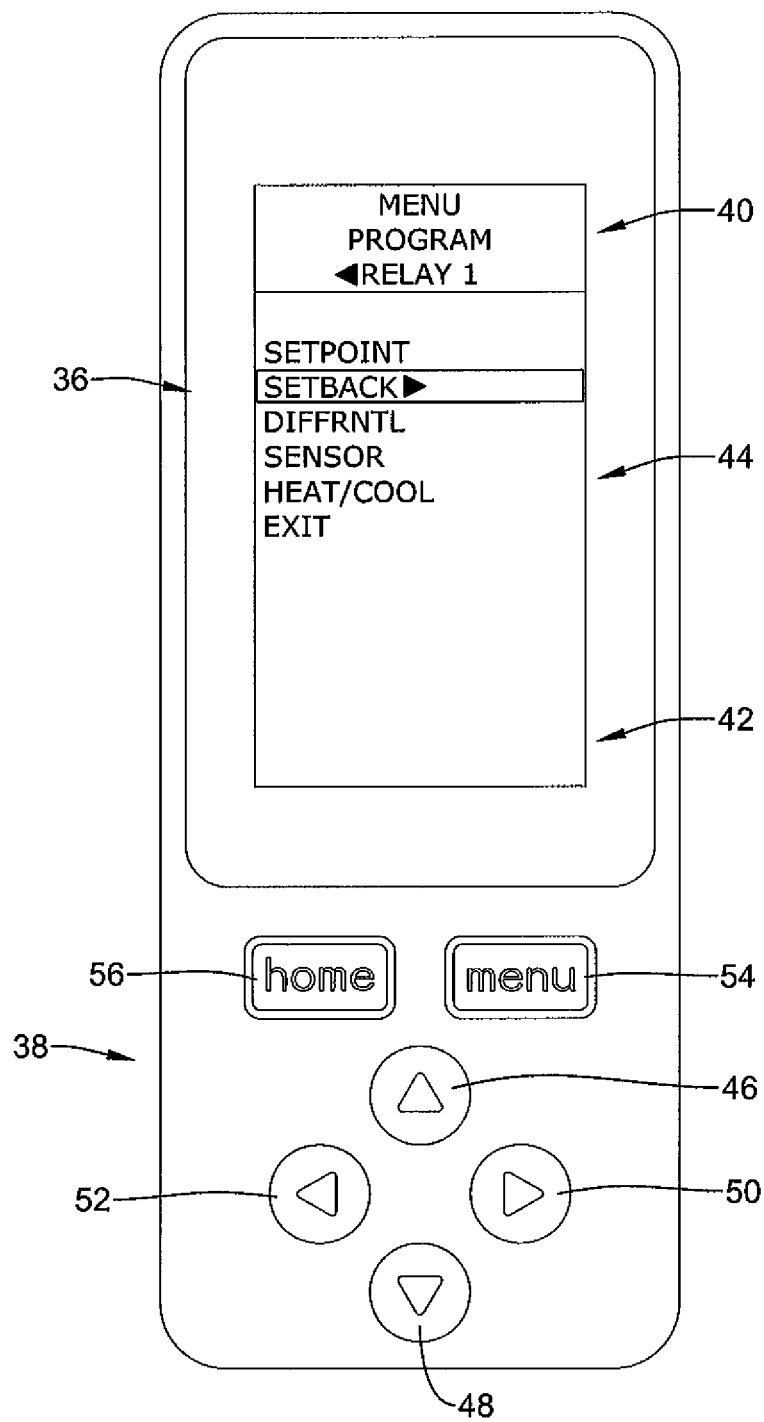

In FIG. 46, the user has returned to the menu screen shown in FIG. 44, as demonstrated by the RELAY 1 breadcrumb displayed within upper portion 40 of display 36. In this case, the user has toggled or scrolled down to the SETBACK option, which, as evidenced by the right-facing arrow displayed next to the SETBACK option, may be selected by pressing next button 50.

Figure 47:
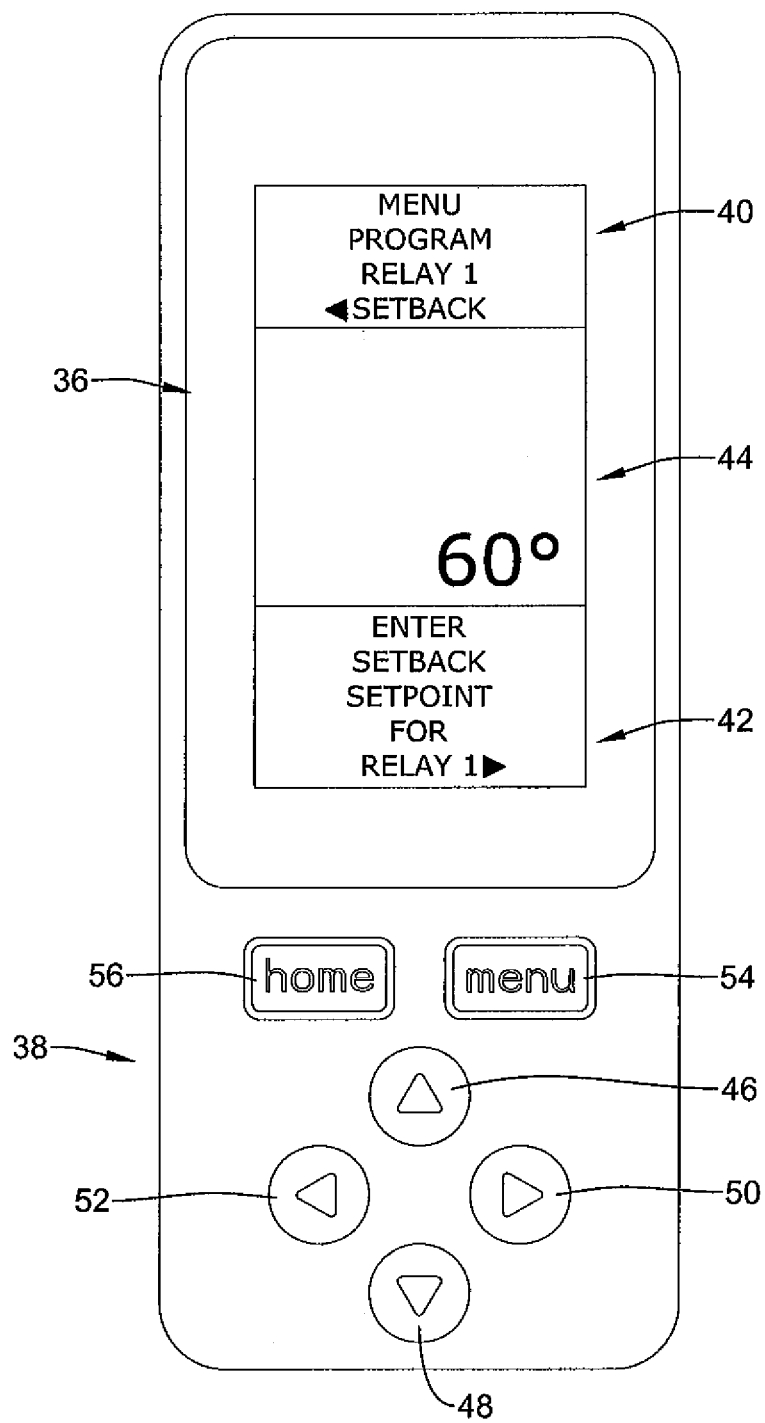

Moving to FIG. 47, the SETBACK breadcrumb displayed within upper portion 40 of display 36 confirms that the user selected the SETBACK option in FIG. 46. Controller 18

(FIG. 1) provides, via intermediate portion 44 of display 36, a setback setpoint value to adjust. Lower portion 42 of display 36 displays, courtesy of controller 18, instructional information asking the user to enter a setback setpoint value for relay 1. The setback setpoint value for relay 1 can be increased or decreased using up button 46 and/or down button 48, as appropriate. Pressing next button 50 will enter the value, as indicated by the right-facing arrow disposed next to the instructional information.

Figure 48:
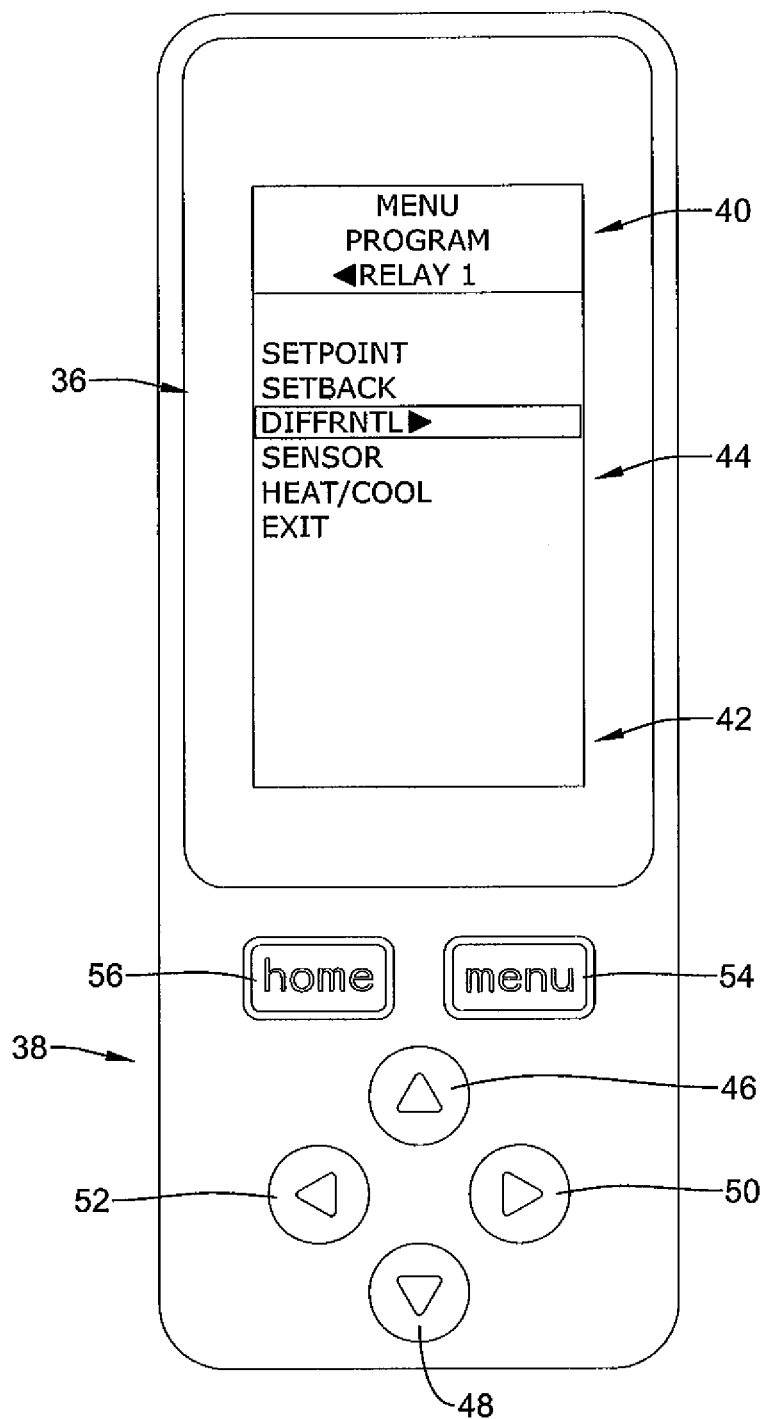

In FIG. 48, the user has returned to the menu screen shown in FIG. 44, as demonstrated by the RELAY 1 breadcrumb displayed within upper portion 40 of display 36. In this case, the user has toggled or scrolled down to the DIFFRNTL option, which, as evidenced by the right-facing arrow displayed next to the DIFFRNTL option, may be selected by pressing next button 50.

Figure 49:
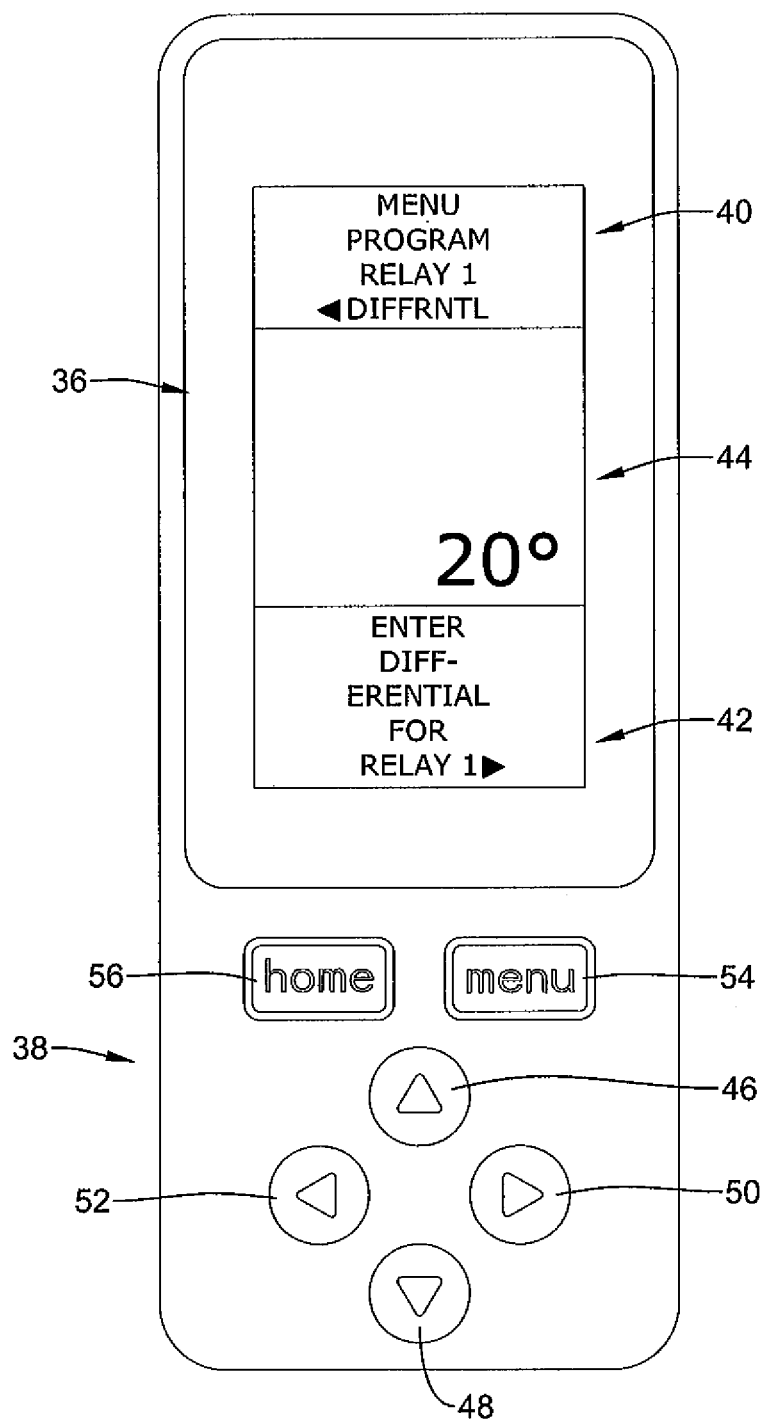

Moving to FIG. 49, the DIFFRNTL breadcrumb displayed within upper portion 40 of display 36 confirms that the user selected the DIFFRNTL option in FIG. 48. Controller 18 (FIG. 1) provides, via intermediate portion 44 of display 36, a differential value to adjust. Lower portion 42 of display 36 displays, courtesy of controller 18, instructional information asking the user to enter a differential value for relay 1. The differential value for relay 1 can be increased or decreased using up button 46 and/or down button 48, as appropriate. Pressing next button 50 will enter the value, as indicated by the right-facing arrow disposed next to the instructional information.

Figure 50:
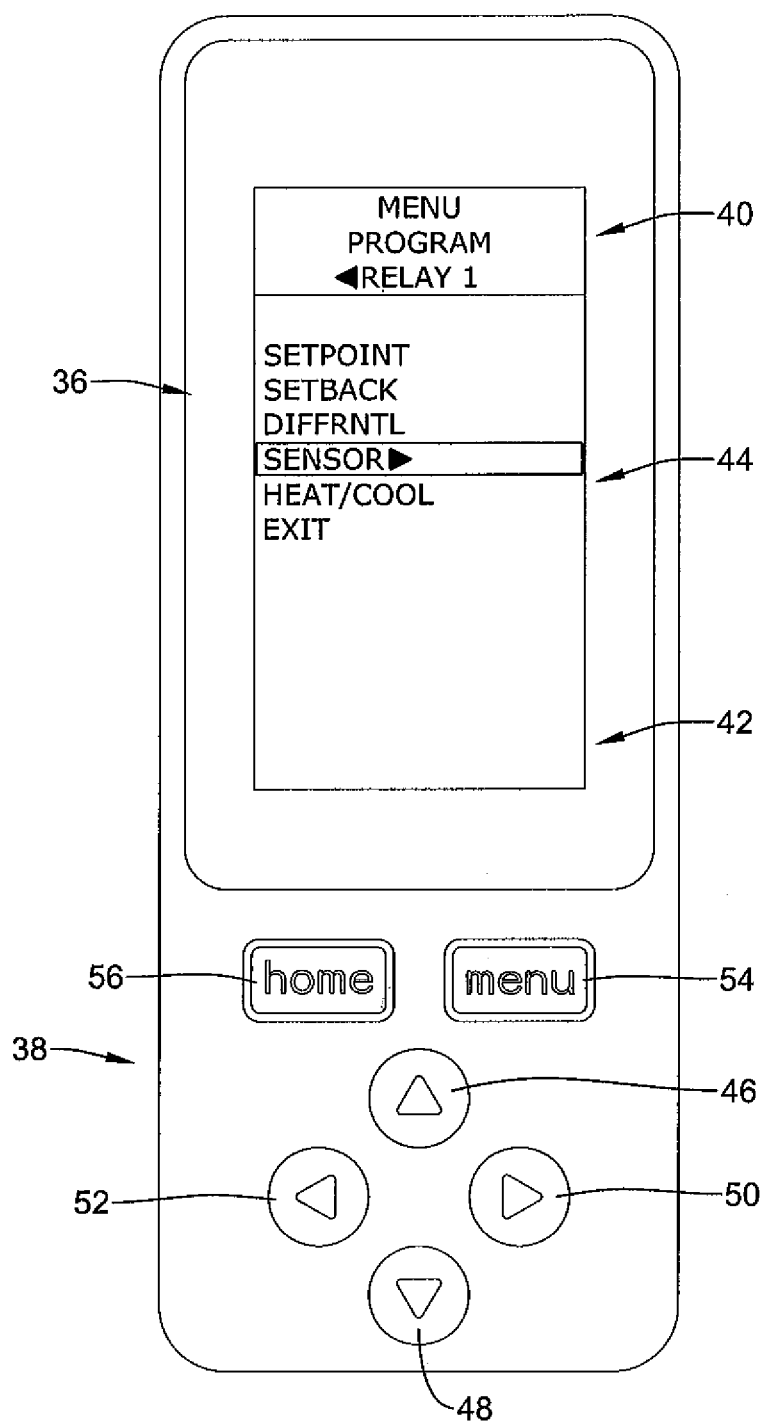

In FIG. 50, the user has returned to the menu screen shown in FIG. 44, as demonstrated by the RELAY 1 breadcrumb displayed within upper portion 40 of display 36. In this case, the user has toggled or scrolled down to the SENSOR option, which, as evidenced by the right-facing arrow displayed next to the SENSOR option, may be selected by pressing next button 50.

Figure 51:
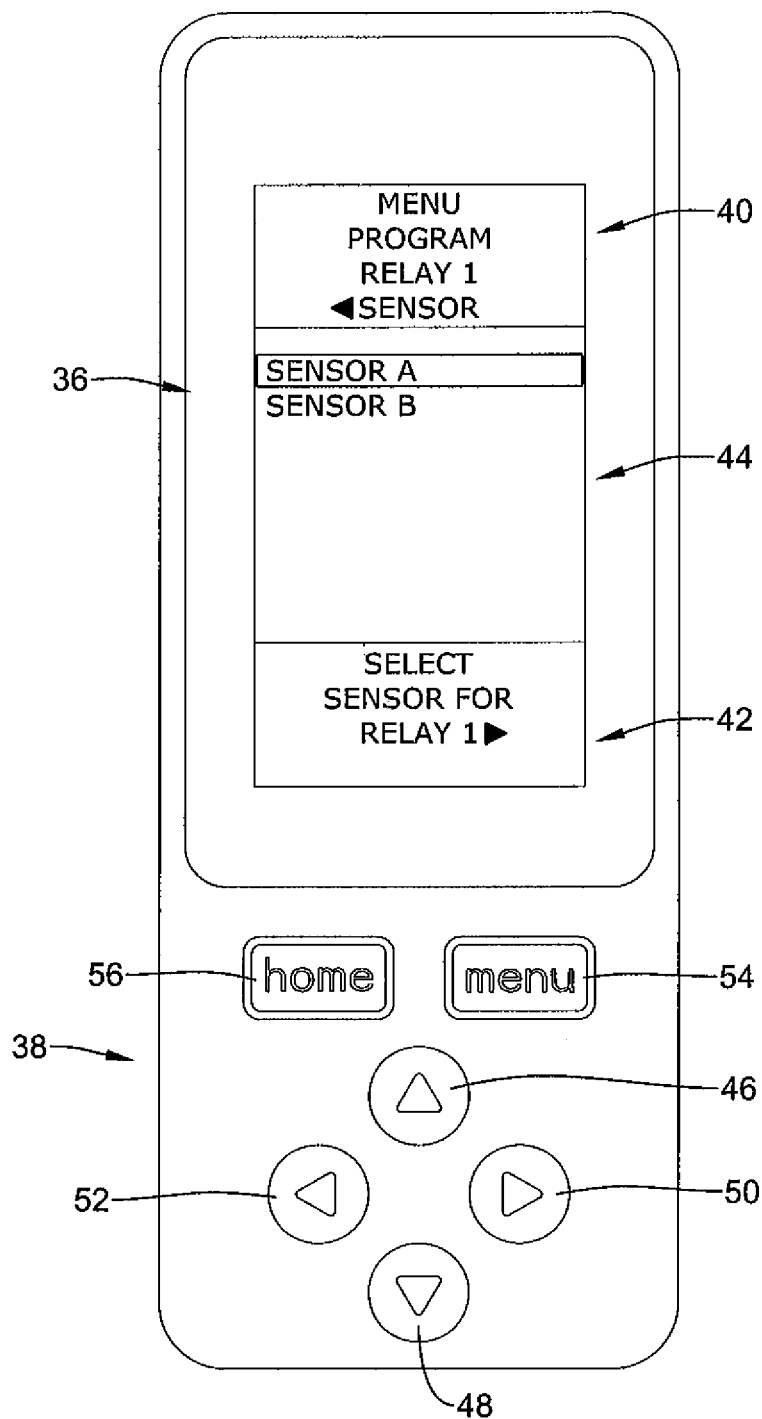

Moving to FIG. 51, the SENSOR breadcrumb displayed within upper portion 40 of display 36 confirms that the user selected the SENSOR option in FIG. 50. Intermediate portion 44 of display 36 provides a list of available options. In this particular screen, the user is able to select between SENSOR A and SENSOR B. In other instances, depending on equipment setup, there may be additional options to choose from. Lower portion 42 of display 36 provides instructional information asking the user to select a sensor for relay 1. The user may toggle between the displayed options by pressing up button 46 and/or down button 48, as appropriate. Pressing next button 50 will enter the selection, as indicated by the right-facing arrow disposed next to the instructional information.

Figure 52:
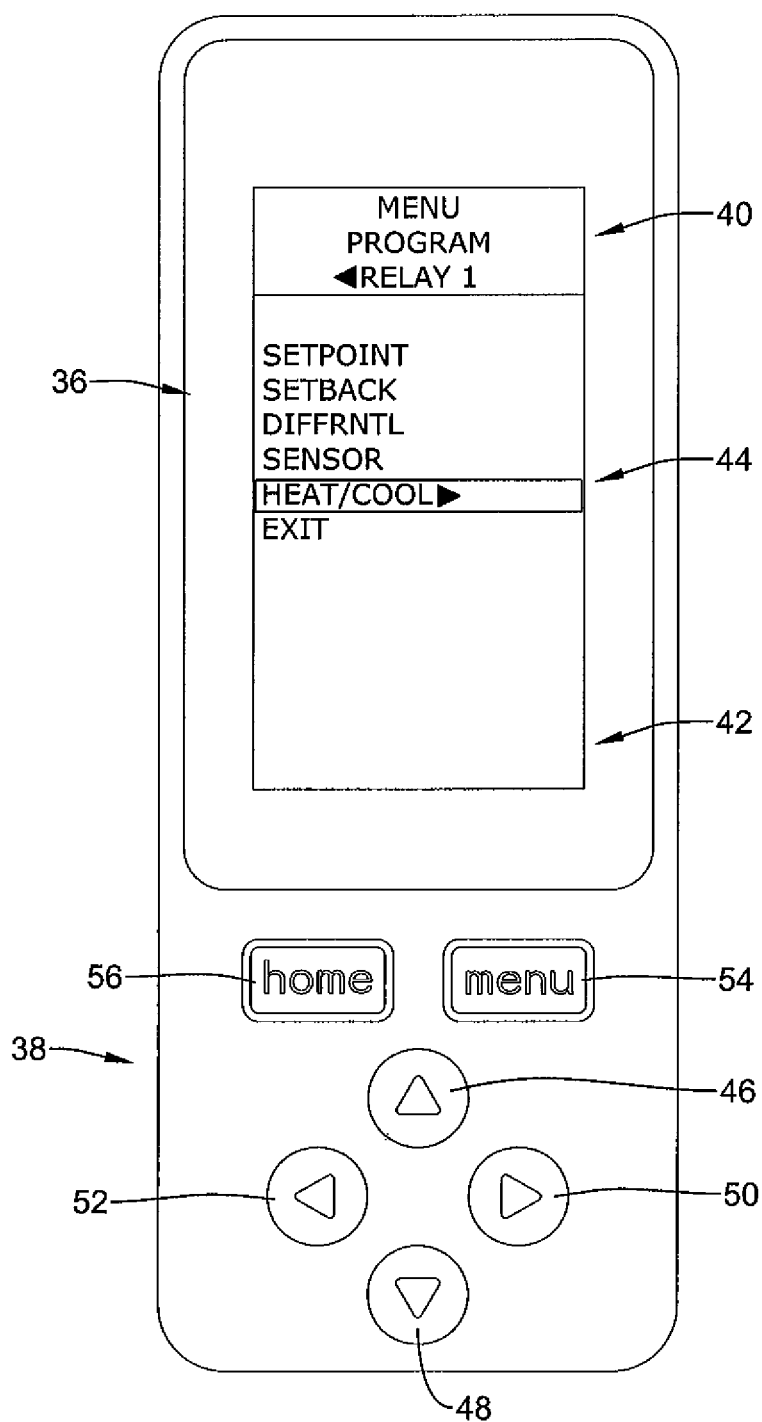

In FIG. 52, the user has returned to the menu screen shown in FIG. 44, as demonstrated by the RELAY 1 breadcrumb information displayed within upper portion 40 of display 36. In this case, the user has toggled or scrolled down to the HEAT/COOL option, which, as evidenced by the right-facing arrow displayed next to the HEAT/COOL option, may be selected by pressing next button 50.

Figure 53:
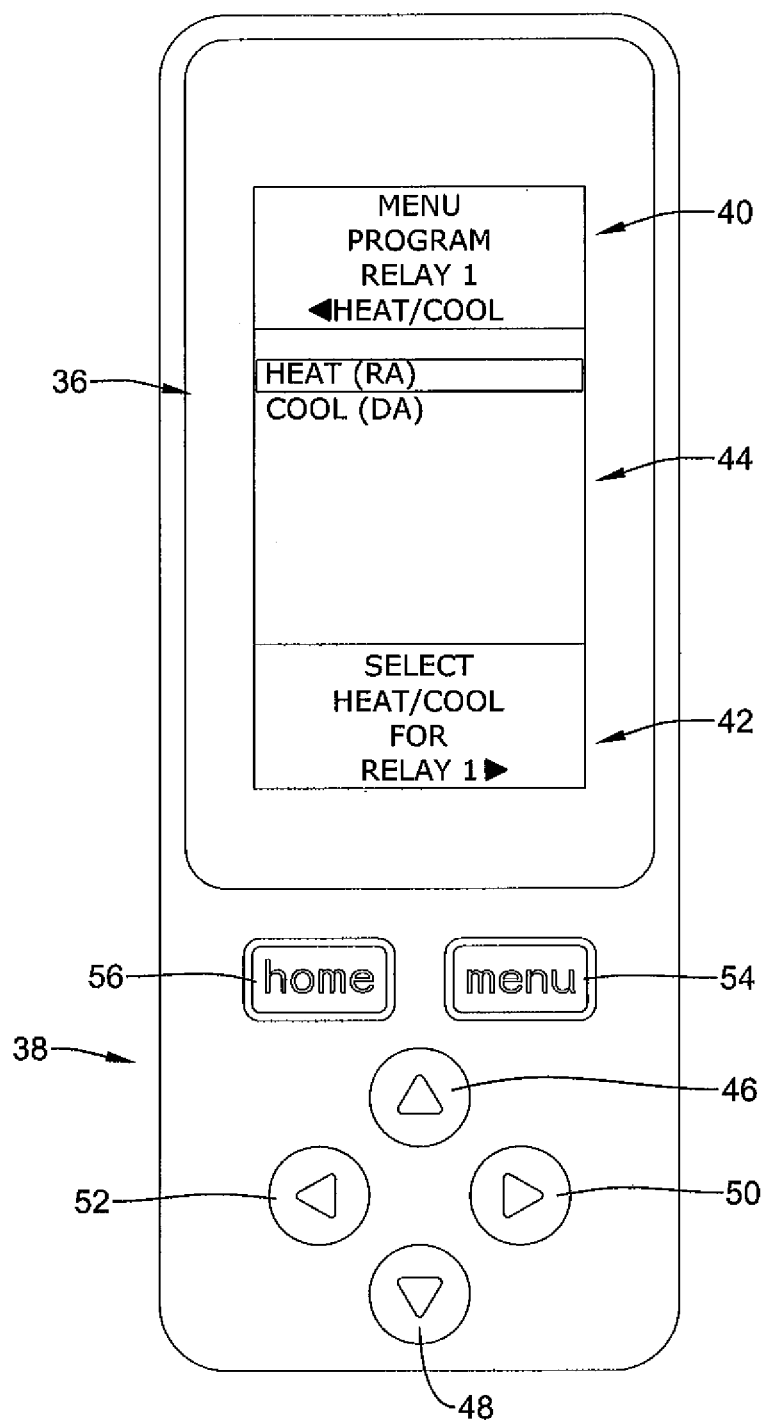

Moving to FIG. 53, the HEAT/COOL breadcrumb displayed within upper portion 40 of display 36 confirms that the user selected the HEAT/COOL option in FIG. 52. Intermediate portion 44 of display 36 provides a list of available options. In this particular screen, the user is able to select between HEAT (RA) and COOL (DA). Lower portion 42 of display 36 provides instructional information telling the user to select Heat or Cool for relay 1. The user may toggle between the displayed options by pressing up button 46 and/or down button 48, as appropriate. Pressing next button 50 will enter the selection, as indicated by the right-facing arrow disposed next to the instructional information.

Figure 54:
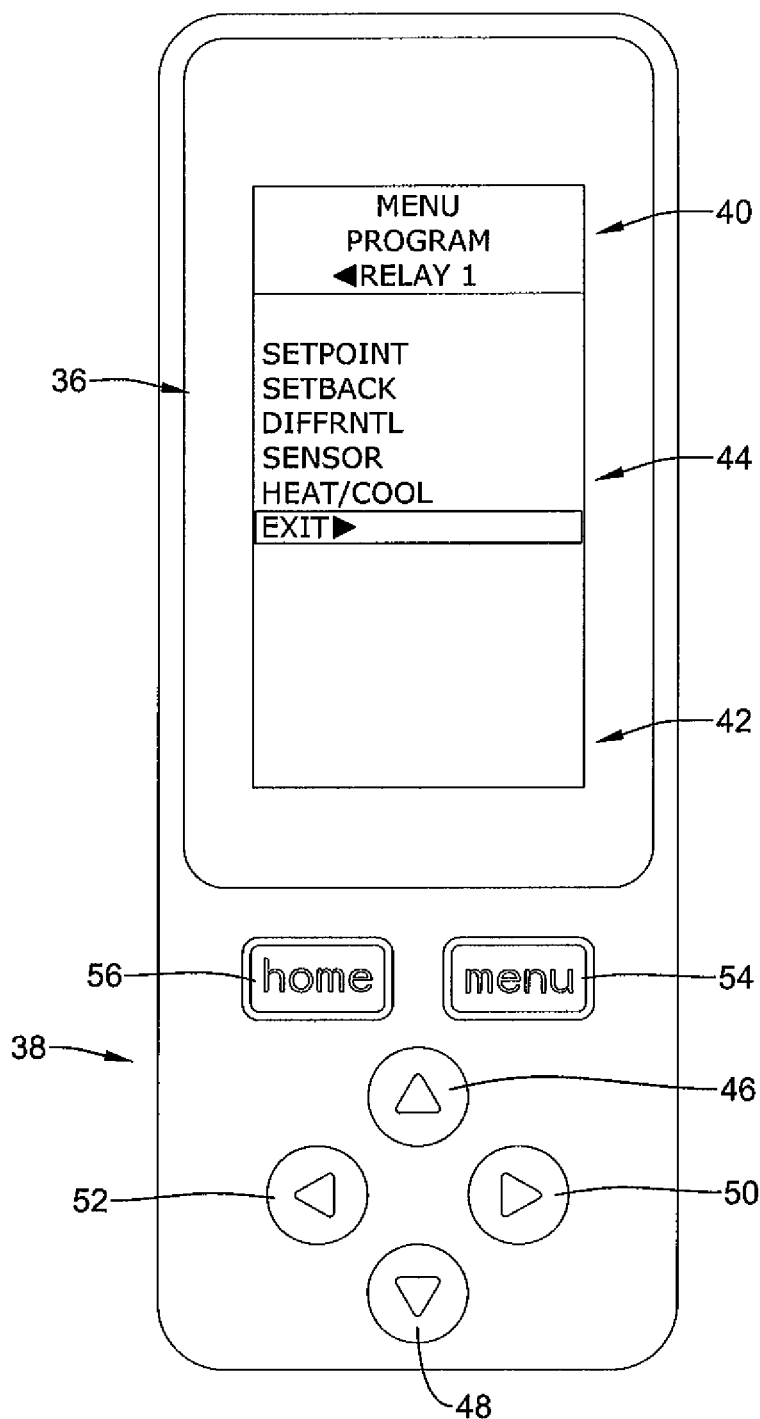

In FIG. 54, the user has returned to the menu screen shown in FIG. 44, as demonstrated by the RELAY 1 breadcrumb displayed within upper portion 40 of display 36. In this case, the user has toggled or scrolled down to the EXIT option, which, as evidenced by the right-facing arrow displayed next to the EXIT option, may be selected by pressing next button 50.

Figure 55:
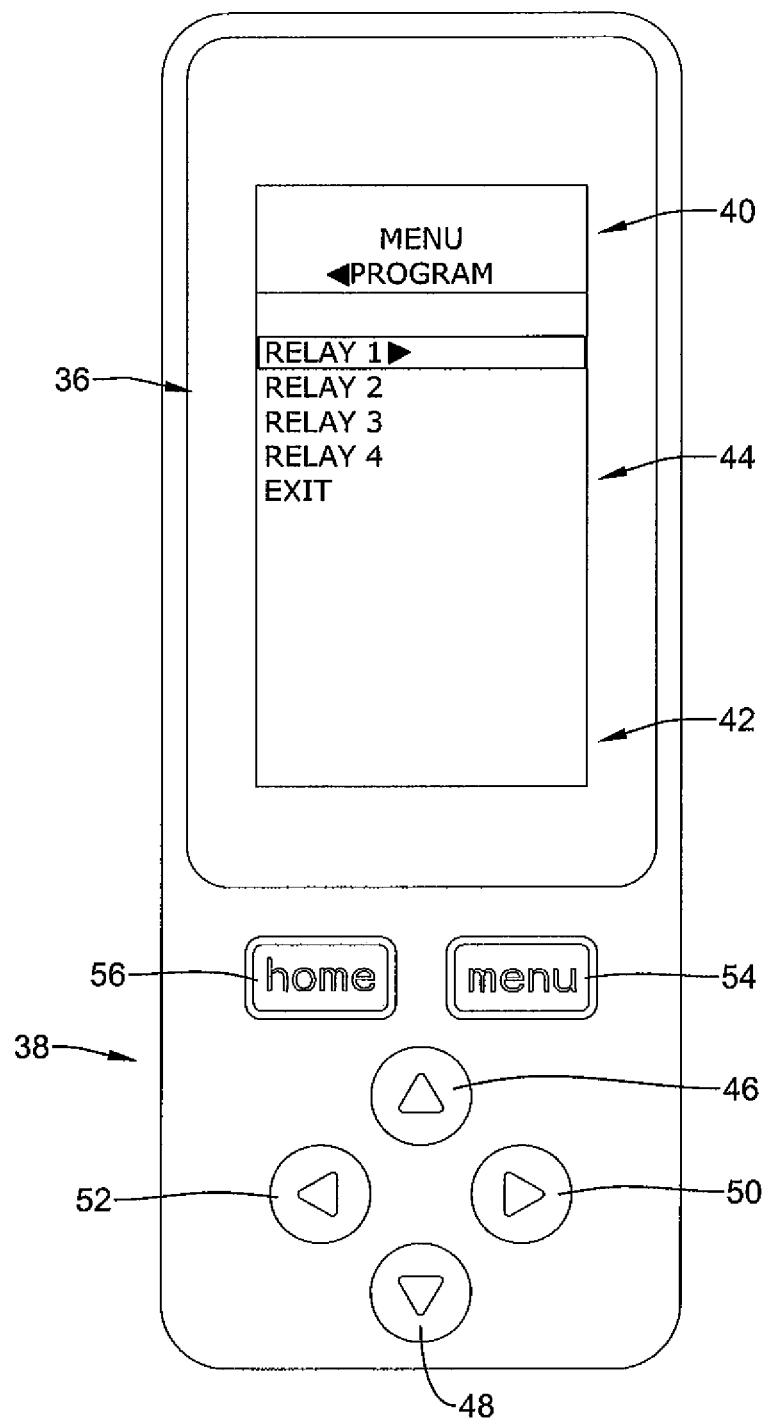

In some cases, the options displayed at a particular menu screen may depend on other equipment options, installations and the like. For example, FIG. 55 shows a menu screen similar to FIG. 43, as evidenced by the PROGRAM breadcrumb displayed within upper portion 40 of display 36. Similarly, FIG. 56 has RELAY 1 breadcrumb information similar to that of FIG. 44.

In FIG. 56, however, the options provided within intermediate portion 44 of display 36 are different that shown in FIG. 44. In this case, the user is provided a different list of available options for relay 1. As before, the user may toggle or scroll through the list of available options using up button 46 and/or down button 48, as desired.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. An equipment controller, comprising:
   a housing;
   a controller situated in the housing, the controller having a control algorithm for controlling one or more pieces of equipment;
   two or more dedicated output terminals accessible from outside of the housing, each of the dedicated output terminals configured to accept a wire for connection to one or more pieces of equipment that are to be controlled by the equipment controller;
   two or more dedicated input terminals accessible from outside of the housing, each of the dedicated input terminals configured to accept a wire for connection to one or more sensors, the control algorithm using one or more signals received by one or more of the dedicated input terminals;
   four relays situated in the housing, wherein each of the relays is operatively coupled to a corresponding one of the dedicated output terminals;
   the controller is configured to control each of the relays in accordance with the control algorithm to selectively activate the corresponding dedicated output terminals;
   a user interface housed by the housing and accessible by a user from outside of the housing, the user interface operatively coupled to the controller, the user interface comprising a display;
   the controller is configured to concurrently display on the display of the user interface an activation status for each and every one of the relays situated in the housing that is operatively coupled to a corresponding one of the dedicated output terminals, the activation status representing whether the corresponding relay is currently activated or deactivated by the controller;
   the controller is configured to allow a user to select a particular relay via the user interface, and in response, display one or more control algorithm parameter values used by the control algorithm when controlling the selected relay;

the controller is further configured to concurrently display:

the activation status of each and every one of the relays situated in the housing that is operatively coupled to a corresponding one of the dedicated output terminals on a first portion of the display; and the one or more control algorithm parameter values used by the control algorithm when controlling the selected relay on a second portion of the display.

2. The equipment controller of claim 1 configured to control one or more of traffic light equipment, factory equipment, process equipment, HVAC equipment, swimming pool heating equipment, security system equipment, and lighting equipment.

3. The equipment controller of claim 1, wherein the controller is configured to display the one or more control algorithm parameter values used by the control algorithm for the selected relay on the second portion of the display while not displaying the one or more control algorithm parameter values used by the control algorithm for unselected relays.

4. The equipment controller of claim 3, wherein after displaying the one or more control algorithm parameter values used by the control algorithm for the selected relay on the second portion of the display, the controller is configured to allow a user to select another relay via the user interface, and in response, display the one or more control algorithm parameter values used by the control algorithm when controlling the newly selected relay, while still displaying the activation status of each and every one of the relays situated in the housing that is operatively coupled to a corresponding one of the dedicated output terminals on the first portion of the display.

5. The equipment controller of claim 3, wherein the one or more control algorithm parameter values comprises a temperature setpoint value.

6. The equipment controller of claim 3, wherein the one or more control algorithm parameter values comprises a current sensed temperature.

7. The equipment controller of claim 3, wherein the controller is further configured to allow the user to program different control algorithm parameter values for each relay via the user interface.

8. The equipment controller of claim 1, wherein the controller is configured activate an HVAC heating component via a first one of the relays and to activate an HVAC cooling component via a second one of the relays.

9. The equipment controller of claim 1, wherein the controller is further configured to display a current run time for the selected relay.

10. The equipment controller of claim 1, wherein the controller is configured to allow a user to select via the user interface a control algorithm type from two or more predetermined control algorithm types, depending on a particular application of the equipment controller in the field.

11. The equipment controller of claim 10, wherein the two or more predetermined control algorithm types comprise a sequencer control algorithm type and a standard control algorithm type.

12. The equipment controller of claim 1, wherein the controller is configured to allow a user to select one or more of the dedicated input terminals for use by the control algorithm when controlling a particular relay.

13. An equipment controller, comprising:

a housing;

a controller situated in the housing, the controller having a control algorithm for controlling one or more pieces of equipment;

two or more dedicated output terminals accessible from outside of the housing, each of the dedicated output terminals configured to accept a wire for connection to one or more pieces of equipment that are to be controlled by the equipment controller;

two or more dedicated input terminals accessible from outside of the housing, each of the dedicated input terminals configured to accept a wire for connection to one or more sensors, the control algorithm using one or more signals received by one or more of the dedicated input terminals;

four relays situated in the housing, wherein each of the relays is operatively coupled to a corresponding one of the dedicated output terminals;

the controller is configured to control the relays in accordance with the control algorithm to selectively activate the corresponding dedicated output terminals;

a user interface housed by the housing and accessible by a user from outside of the housing, the user interface operatively coupled to the controller, the user interface comprising a display;

the controller is configured to allow a user to select a control algorithm type from two or more predetermined control algorithm types stored in the equipment controller via the user interface, depending on the particular application of the equipment controller in the field, wherein the two or more predetermined control algorithm types are each tailored to control a different type of equipment in the field and the selected control algorithm type is used by the controller to control each and every one of the relays situated in the housing of the equipment controller; and the controller is configured to concurrently display on the display of the user interface an activation status for each and every one of the relays situated in the housing that is operatively coupled to a corresponding one of the dedicated output terminals, regardless of whether the relay is turned on or off or is not connected to a corresponding wire.

14. The equipment controller of claim 13, wherein the two or more predetermined control algorithm types comprise a sequencer control algorithm type and a standard control algorithm type.

15. The equipment controller of claim 13, wherein the controller is configured to concurrently display the activation status for each and every one of the relays situated in the housing that is operatively coupled to a corresponding one of the dedicated output terminals, the activation status representing whether the relay is currently activated or deactivated by the controller.

16. The equipment controller of claim 13, wherein the controller is configured to allow a user to select a particular relay via the user interface, and in response, display one or more control algorithm parameter values used by the control algorithm when controlling the selected relay while still displaying the activation status of each and every one of the relays situated in the housing that is operatively coupled to a corresponding one of the dedicated output terminals on the display.

17. The equipment controller of claim 13, wherein the controller is configured to allow a user to select one or more of the dedicated input terminals for use by the control algorithm when controlling a particular relay.

18. An equipment controller, comprising:
a housing;
a controller situated in the housing, the controller having a control algorithm for controlling one or more pieces of equipment;
two or more dedicated output terminals accessible from outside of the housing, each of the dedicated output terminals configured to accept a wire for connection to one or more pieces of equipment that are to be controlled by the equipment controller;
two or more dedicated input terminals accessible from outside of the housing, each of the dedicated input terminals configured to accept a wire for connection to one or more sensors, the control algorithm using one or more signals received by one or more of the dedicated input terminals;
four relays situated in the housing, wherein each of the relays is operatively coupled to a corresponding one of the dedicated output terminals;
the controller is configured to control the relays in accordance with the control algorithm to selectively activate the corresponding dedicated output terminals;
a user interface housed by the housing and accessible by a user from outside of the housing, the user interface operatively coupled to the controller, the user interface comprising a display;
the controller is configured to allow a user to select a control algorithm type from two or more predetermined control algorithm types stored in the equipment controller via the user interface, wherein the two or more predetermined control algorithm types are each tailored to control a different type of equipment in the field;
the controller is further configured to allow a user to select one or more of the dedicated input terminals for use by the selected control algorithm when controlling a particular relay;
the controller is further configured to concurrently display on the display of the user interface an activation status for each and every one of the relays situated in the housing that is operatively coupled to a corresponding one of the dedicated output terminals, wherein the controller does not distinguish between a relay being turned off and a relay not being connected to a piece of equipment via a corresponding wire;
the controller is further configured to allow a user to select a particular relay via the user interface, and in response, display one or more control algorithm parameter values used by the control algorithm when controlling the selected relay, wherein the control algorithm is configured to compare one or more of the displayed control algorithm parameter values to one or more signals from one or more of the sensors via one or more of the dedicated input terminals; and
the controller is further configured to concurrently display:
the activation status of each and every one of the relays situated in the housing that is operatively coupled to a corresponding one of the output terminals; and
the one or more control algorithm parameter values used by the control algorithm when controlling the selected relay.

* * * * *